United States Patent [19]
Hagimori et al.

[11] Patent Number: 5,786,944
[45] Date of Patent: Jul. 28, 1998

[54] ZOOM LENS SYSTEM

[75] Inventors: Hitoshi Hagimori, Nara-Ken; Mitsuaki Shimo, Osaka, both of Japan

[73] Assignee: Minolta Co., Ltd., Osaka, Japan

[21] Appl. No.: 675,819

[22] Filed: Jul. 5, 1996

[30] Foreign Application Priority Data

Jul. 6, 1995 [JP] Japan .................. 7-170592

[51] Int. Cl.⁶ .................. G02B 15/16
[52] U.S. Cl. .................. 359/689; 359/713; 359/791
[58] Field of Search .................. 359/689, 713, 359/745, 746, 763, 767, 791

[56] References Cited

U.S. PATENT DOCUMENTS

| | | | |
|---|---|---|---|
| 4,185,893 | 1/1980 | Ogawa et al. | 359/681 |
| 5,216,547 | 6/1993 | Ogata | 359/689 |
| 5,260,833 | 11/1993 | Ito et al. | 359/689 |
| 5,325,235 | 6/1994 | Takashima et al. | |
| 5,343,329 | 8/1994 | Ito | |
| 5,353,159 | 10/1994 | Morooka | |

FOREIGN PATENT DOCUMENTS

| | | | |
|---|---|---|---|
| 2135312 | 5/1990 | Japan | |
| 5173069 | 7/1993 | Japan | 359/689 |

Primary Examiner—Hoa Q. Pham
Attorney, Agent, or Firm—Price, Gess & Ubell

[57] ABSTRACT

A zoom lens system comprises, from the object side, a first lens unit having a positive refractive power, a second lens unit having a positive refractive power and a third lens unit having a negative refractive power. During zooming, the sizes of the first area of empty space between the first lens unit and the second lens unit and the second area of empty space between the second lens unit and the third lens unit change.

19 Claims, 54 Drawing Sheets

(WIDE)

SPHERICAL ABERRATION
SINE CONDITION (WIDE)

ASTIGMATISM (WIDE)

DISTORTION

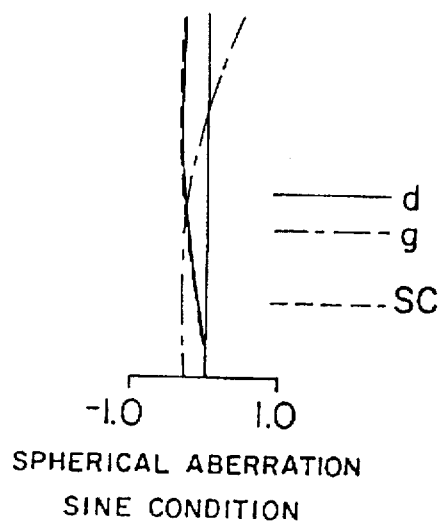
FIG. 2d (MIDDLE)
SPHERICAL ABERRATION
SINE CONDITION
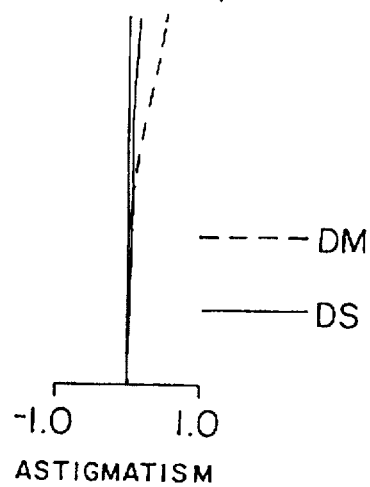
FIG. 2e (MIDDLE)
ASTIGMATISM
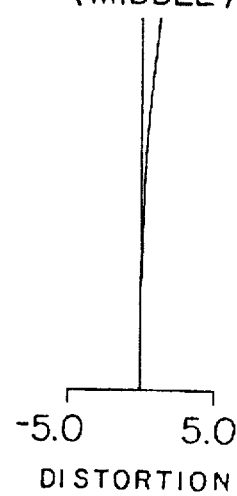
FIG. 2f (MIDDLE)
DISTORTION
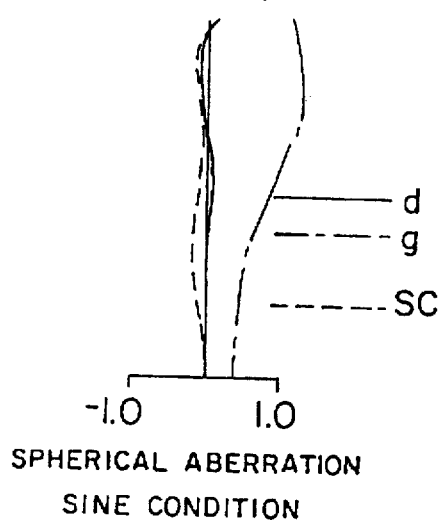
FIG. 2g (TELE)
SPHERICAL ABERRATION
SINE CONDITION
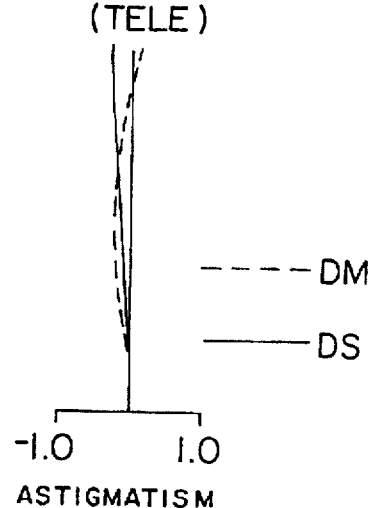
FIG. 2h (TELE)
ASTIGMATISM
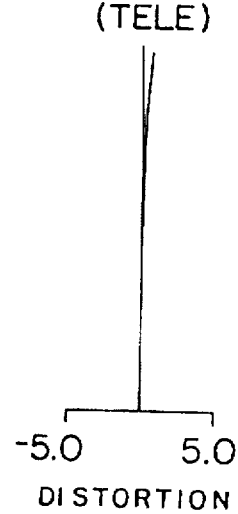
FIG. 2i (TELE)
DISTORTION (WIDE)

SPHERICAL ABERRATION
SINE CONDITION (WIDE)

ASTIGMATISM (WIDE)

DISTORTION (MIDDLE)
SPHERICAL ABERRATION
SINE CONDITION (MIDDLE)
ASTIGMATISM (MIDDLE)
DISTORTION (TELE)
SPHERICAL ABERRATION
SINE CONDITION (TELE)
ASTIGMATISM (TELE)
DISTORTION (WIDE)

SPHERICAL ABERRATION
SINE CONDITION (WIDE)

ASTIGMATISM (WIDE)

DISTORTION (MIDDLE)

―― d
―·― g
---- SC

SPHERICAL ABERRATION
SINE CONDITION (MIDDLE)

---- DM
―― DS

ASTIGMATISM (MIDDLE)

DISTORTION (TELE)

―― d
―·― g
---- SC

SPHERICAL ABERRATION
SINE CONDITION (TELE)

---- DM
―― DS

ASTIGMATISM (TELE)

DISTORTION

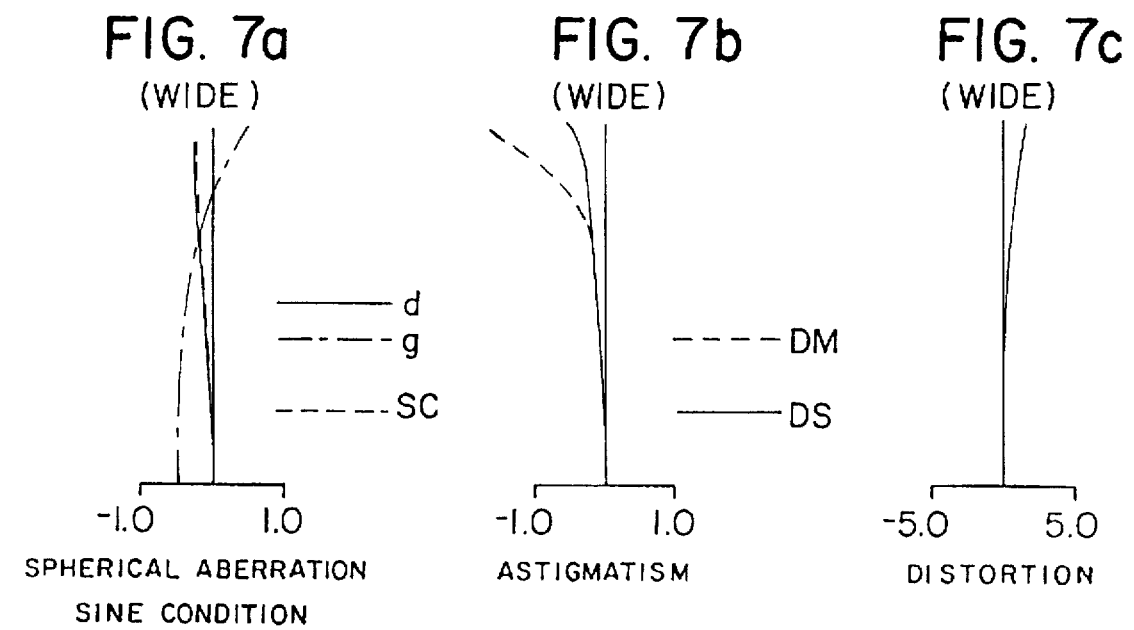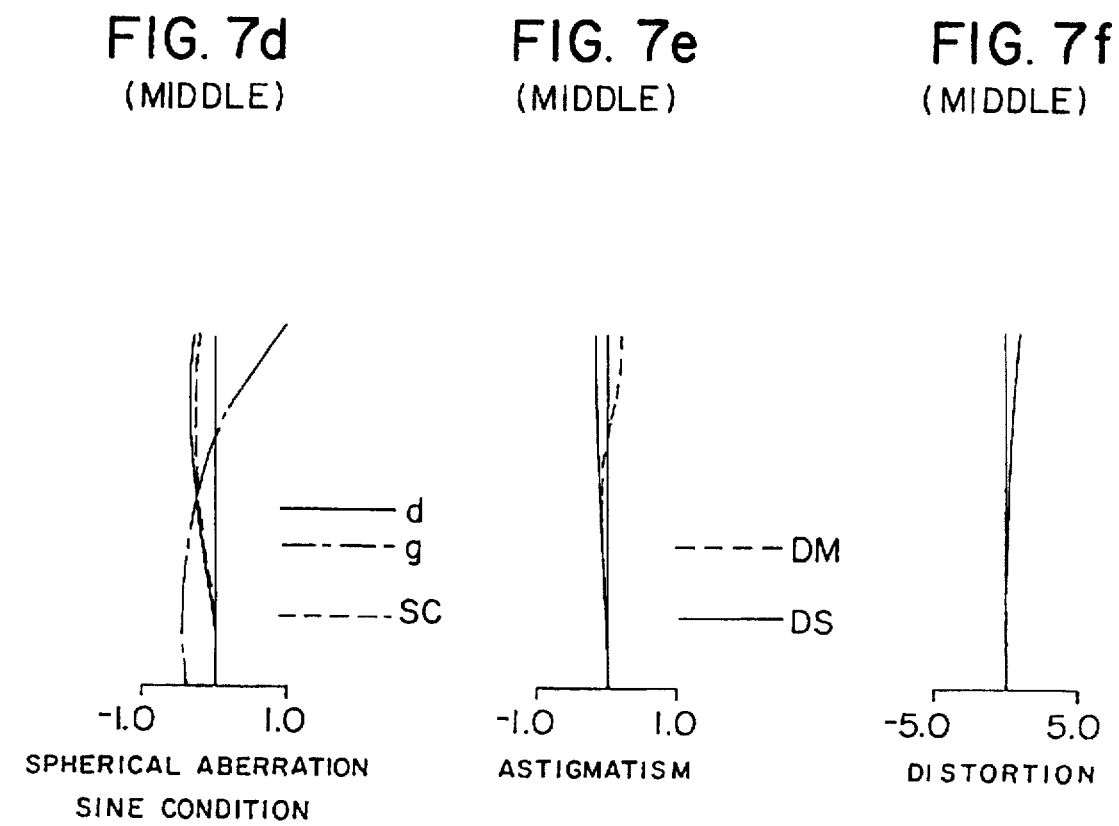

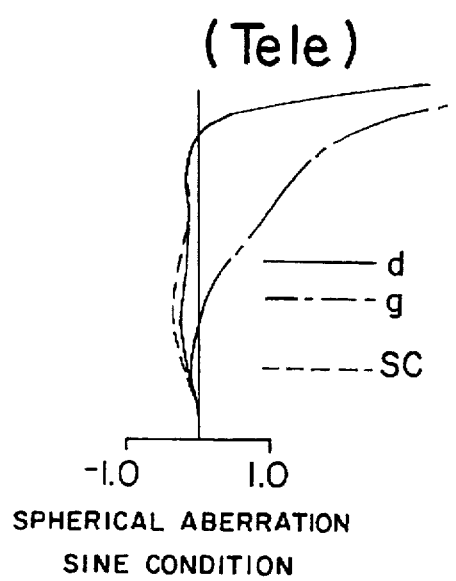
FIG. 7g (Tele)
SPHERICAL ABERRATION
SINE CONDITION
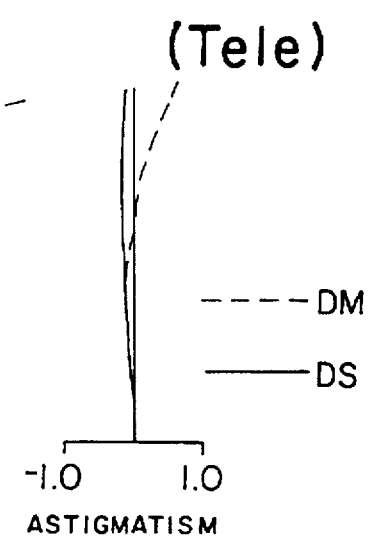
FIG. 7h (Tele)
ASTIGMATISM
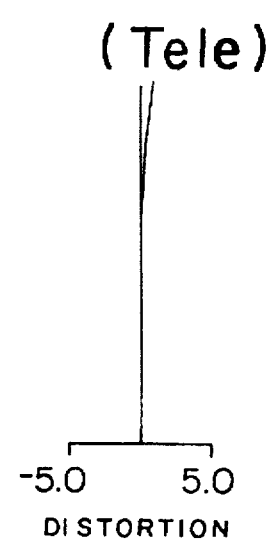
FIG. 7i (Tele)
DISTORTION (WIDE)

SPHERICAL ABERRATION
SINE CONDITION

— d
—·— g
---- SC (WIDE)

ASTIGMATISM

---- DM
—— DS (WIDE)

DISTORTION (MIDDLE)

SPHERICAL ABERRATION
SINE CONDITION (MIDDLE)

ASTIGMATISM (MIDDLE)

DISTORTION (TELE)

SPHERICAL ABERRATION
SINE CONDITION (TELE)

ASTIGMATISM (TELE)

DISTORTION (WIDE)

-1.0    1.0
SPHERICAL ABERRATION
SINE CONDITION

— d
—·— g
----- SC (WIDE)

----- DM
——— DS

-1.0    1.0
ASTIGMATISM (WIDE)

-5.0    5.0
DISTORTION (MIDDLE)
SPHERICAL ABERRATION
SINE CONDITION (MIDDLE)
ASTIGMATISM (MIDDLE)
DISTORTION (TELE)
SPHERICAL ABERRATION
SINE CONDITION (TELE)
ASTIGMATISM (TELE)
DISTORTION (WIDE)

—— d
----- SC

-1.0   1.0
SPHERICAL ABERRATION
SINE CONDITION (WIDE)

---- DM
—— DS

-1.0   1.0
ASTIGMATISM (WIDE)

-5.0   5.0
DISTORTION

FIG. 13d (MIDDLE)
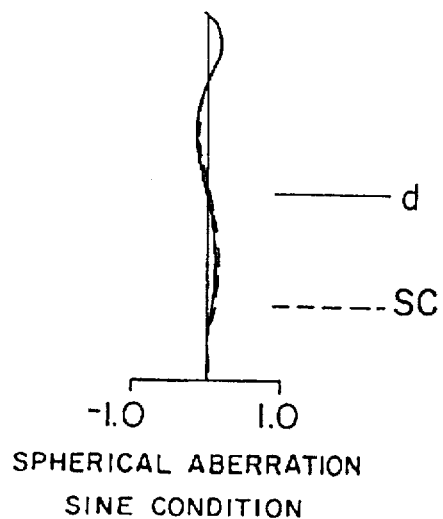
SPHERICAL ABERRATION
SINE CONDITION
— d
---- SC
FIG. 13e (MIDDLE)
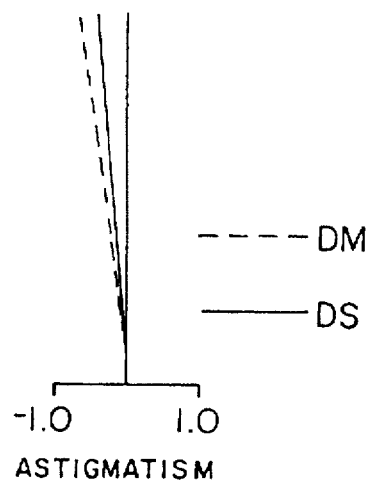
ASTIGMATISM
---- DM
— DS
FIG. 13f (MIDDLE)
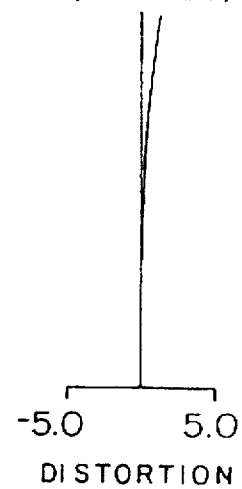
DISTORTION
FIG. 13g (TELE)
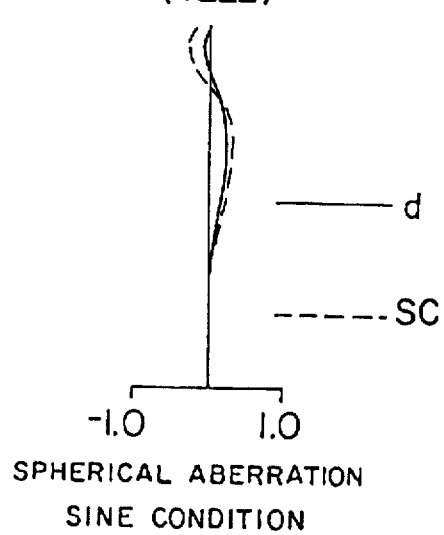
SPHERICAL ABERRATION
SINE CONDITION
— d
---- SC
FIG. 13h (TELE)
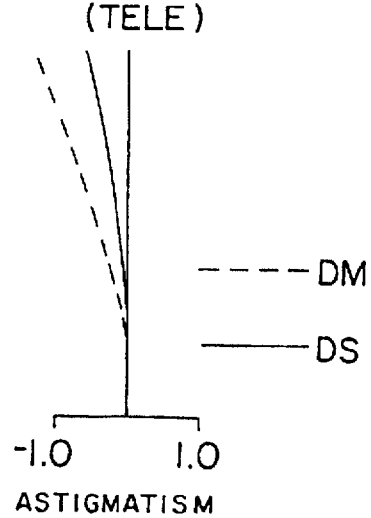
ASTIGMATISM
---- DM
— DS
FIG. 13i (TELE)
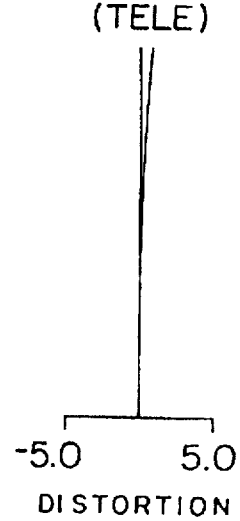
DISTORTION (WIDE)

SPHERICAL ABERRATION
SINE CONDITION (WIDE)

ASTIGMATISM (WIDE)

DISTORTION

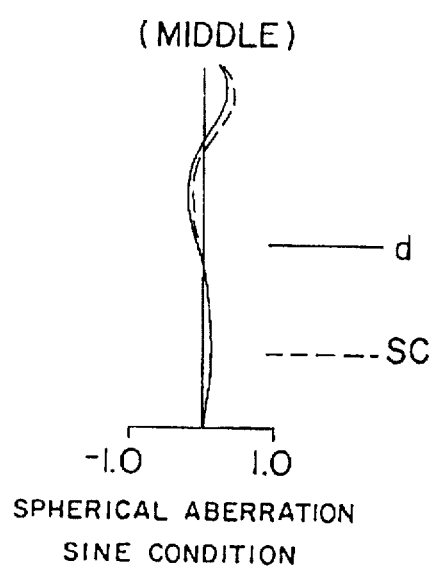
FIG. 15d (MIDDLE)
SPHERICAL ABERRATION
SINE CONDITION
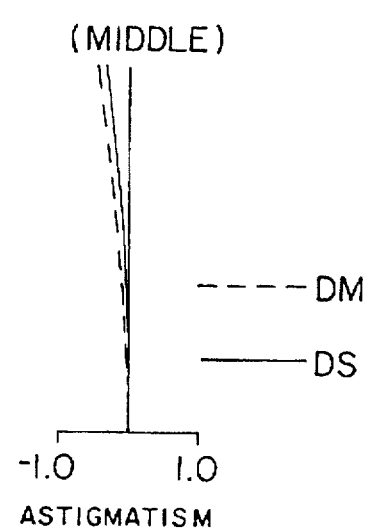
FIG. 15e (MIDDLE)
ASTIGMATISM
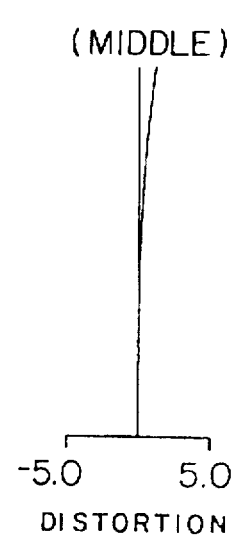
FIG. 15f (MIDDLE)
DISTORTION
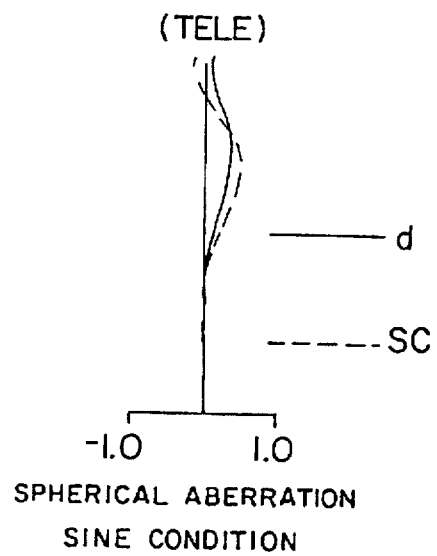
FIG. 15g (TELE)
SPHERICAL ABERRATION
SINE CONDITION
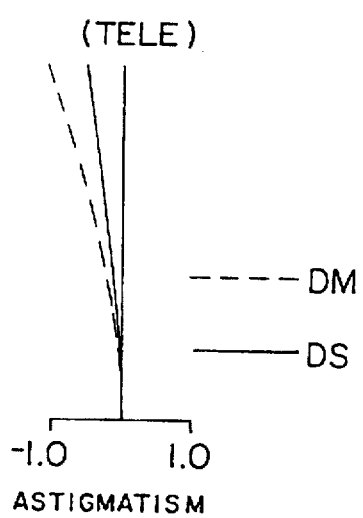
FIG. 15h (TELE)
ASTIGMATISM
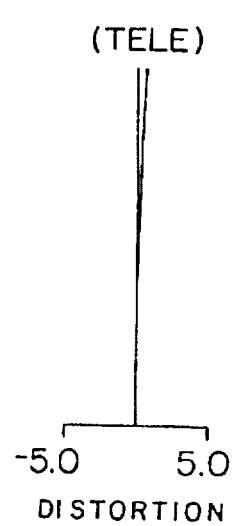
FIG. 15i (TELE)
DISTORTION (WIDE)

—— d
---- SC

SPHERICAL ABERRATION
SINE CONDITION (WIDE)

---- DM
—— DS

ASTIGMATISM (WIDE)

DISTORTION (MIDDLE)
SPHERICAL ABERRATION
SINE CONDITION (MIDDLE)
ASTIGMATISM (MIDDLE)
DISTORTION (TELE)
SPHERICAL ABERRATION
SINE CONDITION (TELE)
ASTIGMATISM (TELE)
DISTORTION (WIDE)

SPHERICAL ABERRATION
SINE CONDITION (WIDE)

ASTIGMATISM (WIDE)

DISTORTION

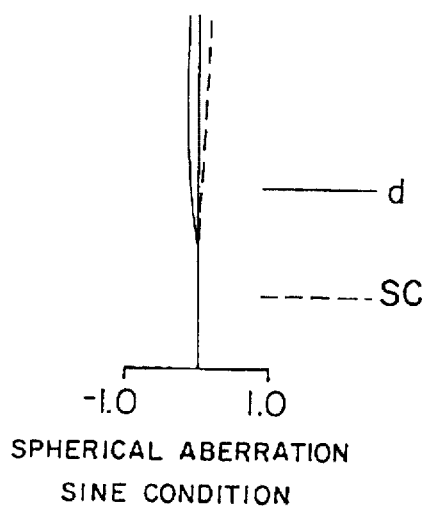
FIG. 19d (MIDDLE)
SPHERICAL ABERRATION
SINE CONDITION
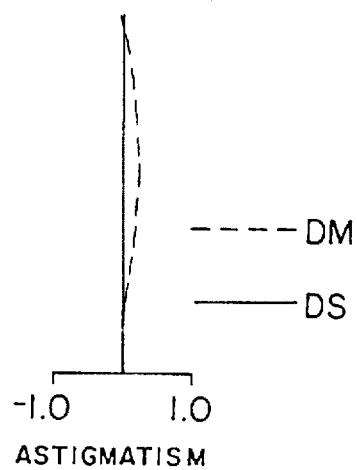
FIG. 19e (MIDDLE)
ASTIGMATISM
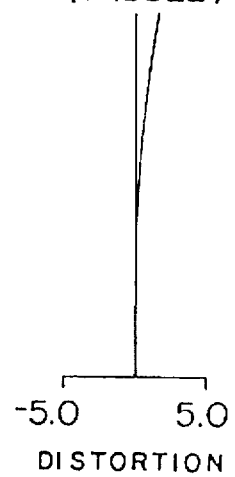
FIG. 19f (MIDDLE)
DISTORTION
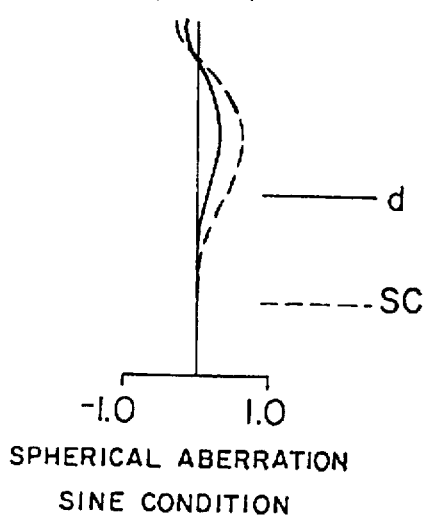
FIG. 19g (TELE)
SPHERICAL ABERRATION
SINE CONDITION
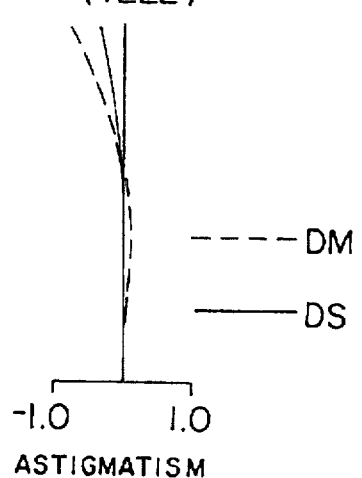
FIG. 19h (TELE)
ASTIGMATISM
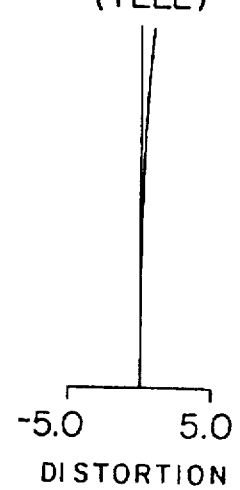
FIG. 19i (TELE)
DISTORTION

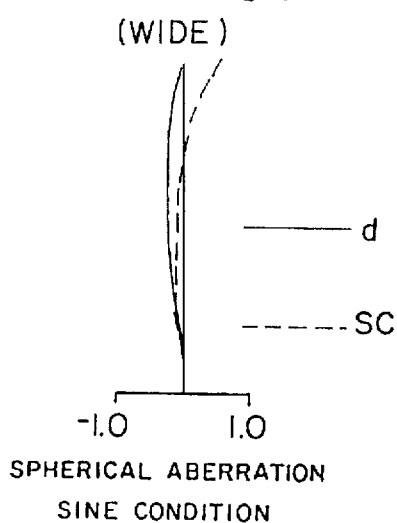
FIG. 20a (WIDE)
SPHERICAL ABERRATION
SINE CONDITION
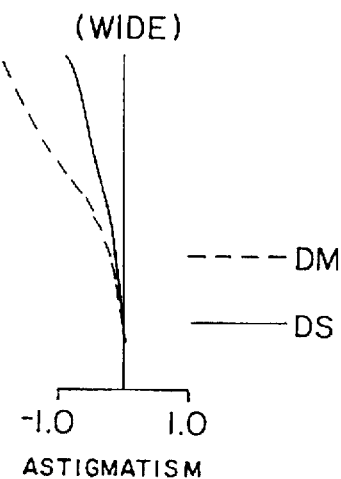
FIG. 20b (WIDE)
ASTIGMATISM
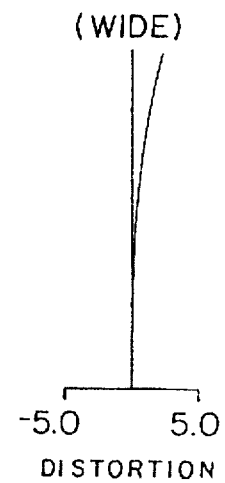
FIG. 20c (WIDE)
DISTORTION
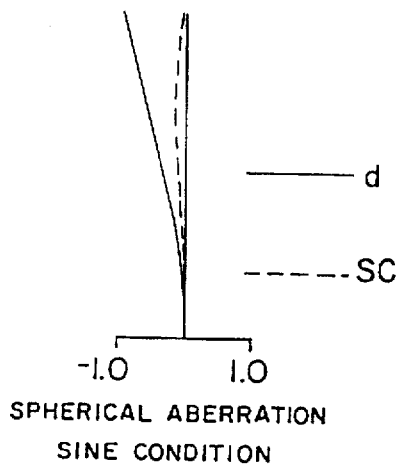
FIG. 20d (MIDDLE)
SPHERICAL ABERRATION
SINE CONDITION
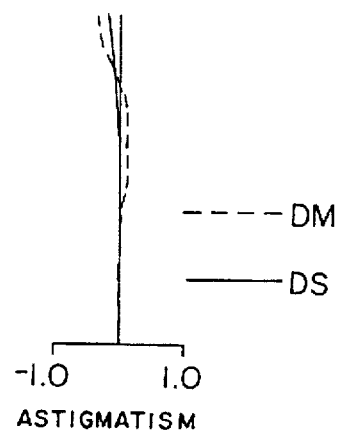
FIG. 20e (MIDDLE)
ASTIGMATISM
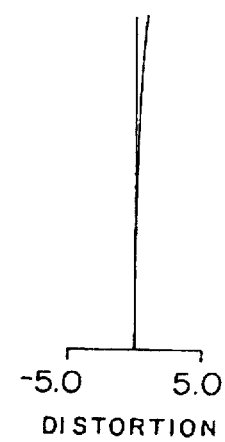
FIG. 20f (MIDDLE)
DISTORTION

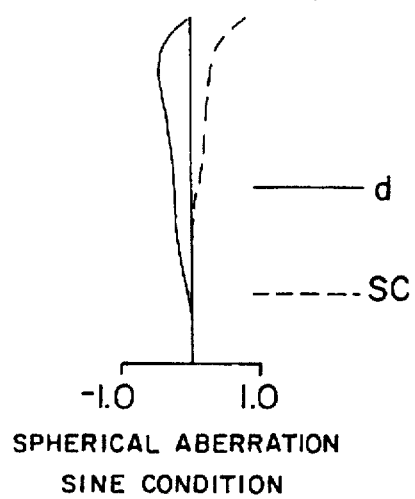
FIG. 20g (Tele)
—— d
---- SC
SPHERICAL ABERRATION
SINE CONDITION
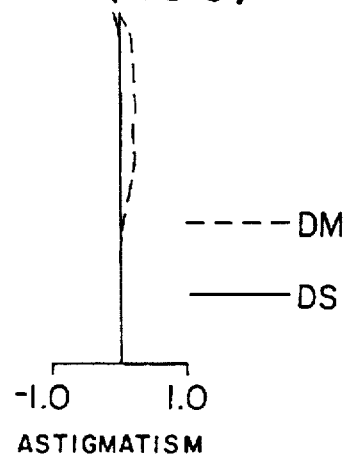
FIG. 20h (Tele)
---- DM
—— DS
ASTIGMATISM
FIG. 20i (Tele)
DISTORTION (WIDE)

SPHERICAL ABERRATION
SINE CONDITION (WIDE)

ASTIGMATISM (WIDE)

DISTORTION

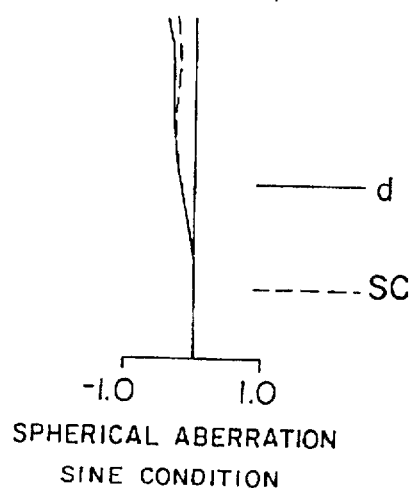
FIG. 22d (MIDDLE)
SPHERICAL ABERRATION
SINE CONDITION
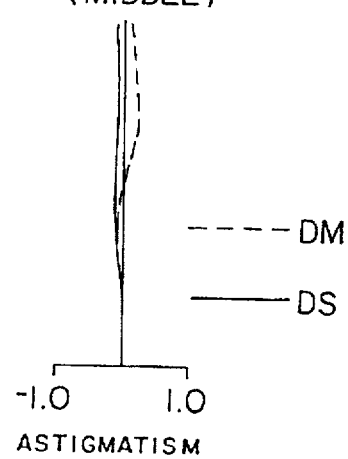
FIG. 22e (MIDDLE)
ASTIGMATISM
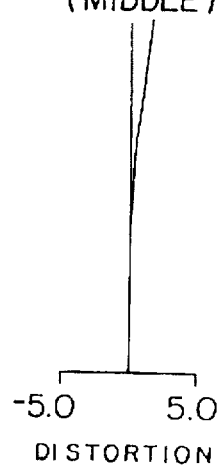
FIG. 22f (MIDDLE)
DISTORTION
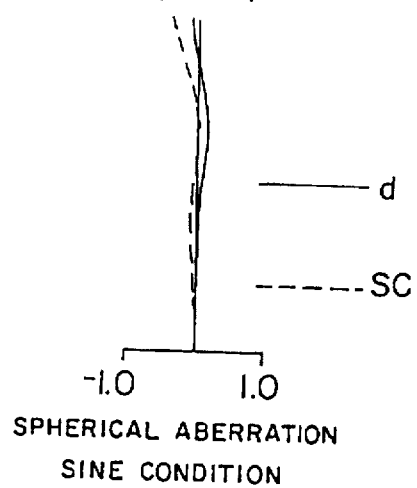
FIG. 22g (TELE)
SPHERICAL ABERRATION
SINE CONDITION
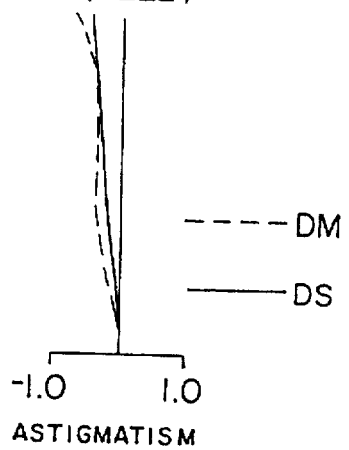
FIG. 22h (TELE)
ASTIGMATISM
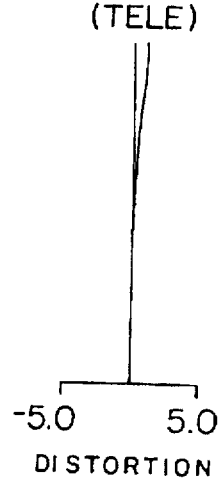
FIG. 22i (TELE)
DISTORTION (WIDE)

SPHERICAL ABERRATION
SINE CONDITION (WIDE)

ASTIGMATISM (WIDE)

DISTORTION

FIG. 24d (MIDDLE)
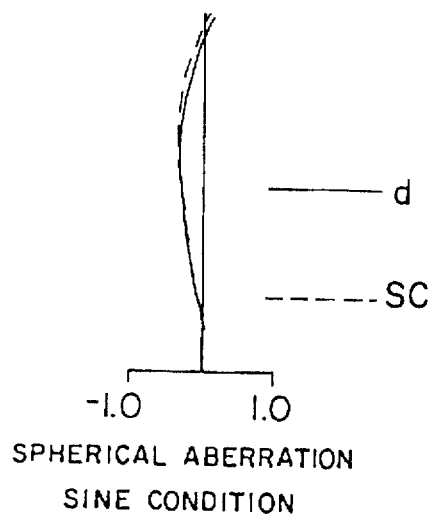
SPHERICAL ABERRATION
SINE CONDITION
FIG. 24e (MIDDLE)
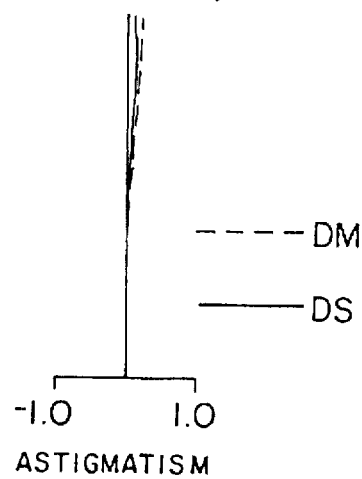
ASTIGMATISM
FIG. 24f (MIDDLE)
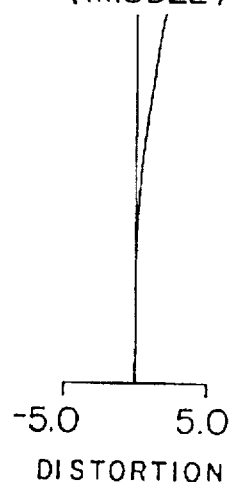
DISTORTION
FIG. 24g (TELE)
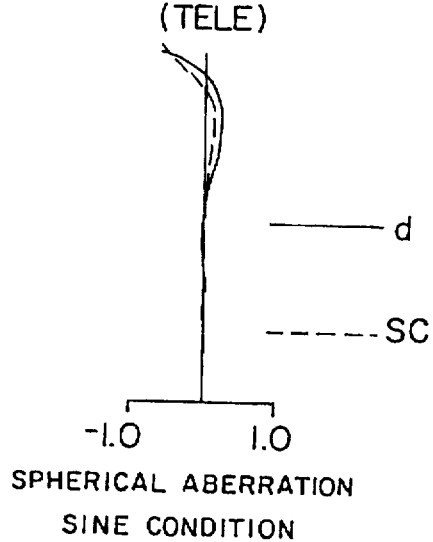
SPHERICAL ABERRATION
SINE CONDITION
FIG. 24h (TELE)
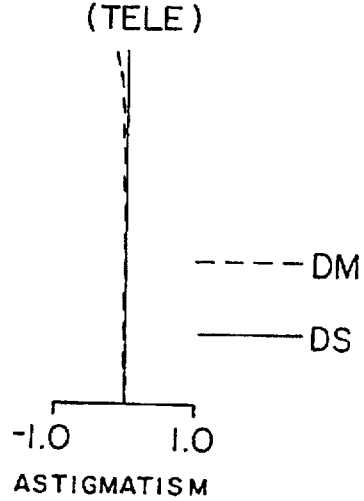
ASTIGMATISM
FIG. 24i (TELE)
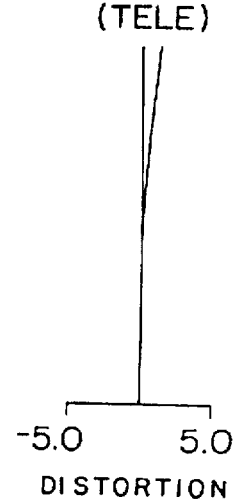
DISTORTION (WIDE)

-1.0    1.0
SPHERICAL ABERRATION
SINE CONDITION

—— d
---- SC (WIDE)

-1.0    1.0
ASTIGMATISM

---- DM
—— DS (WIDE)

-5.0    5.0
DISTORTION (MIDDLE)

—— d
----- SC

-1.0    1.0
SPHERICAL ABERRATION
SINE CONDITION (MIDDLE)

----- DM
—— DS

-1.0    1.0
ASTIGMATISM (MIDDLE)

-5.0    5.0
DISTORTION (TELE)

—— d
----- SC

-1.0    1.0
SPHERICAL ABERRATION
SINE CONDITION (TELE)

----- DM
—— DS

-1.0    1.0
ASTIGMATISM (TELE)

-5.0    5.0
DISTORTION

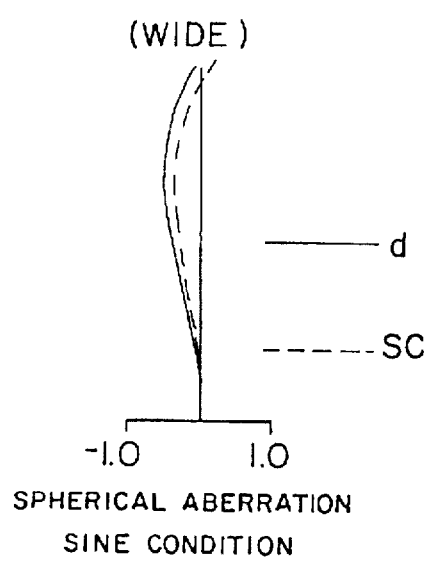
FIG. 27a (WIDE)
SPHERICAL ABERRATION
SINE CONDITION
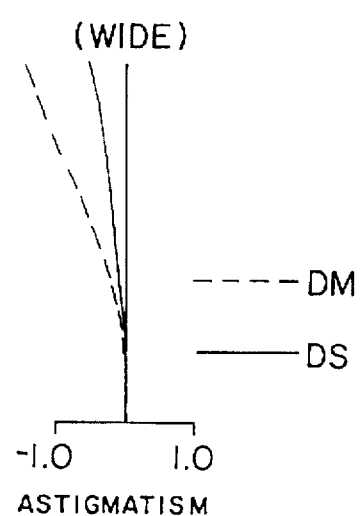
FIG. 27b (WIDE)
ASTIGMATISM
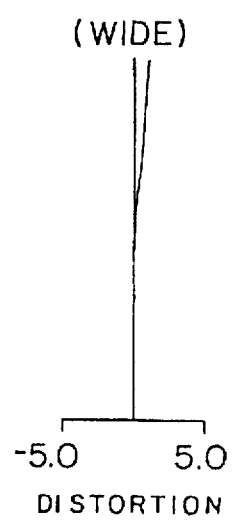
FIG. 27c (WIDE)
DISTORTION
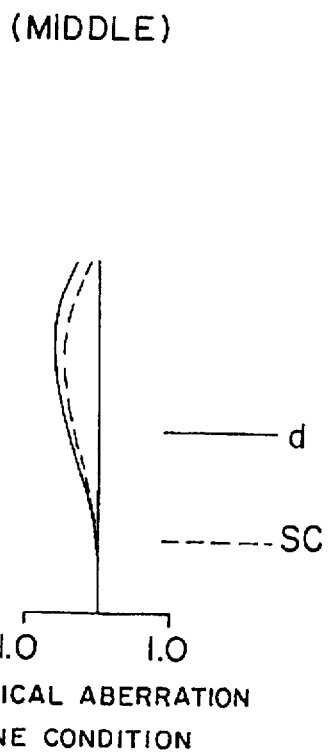
FIG. 27d (MIDDLE)
SPHERICAL ABERRATION
SINE CONDITION
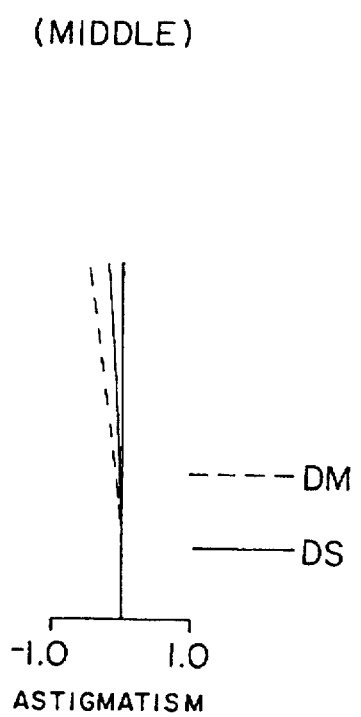
FIG. 27e (MIDDLE)
ASTIGMATISM
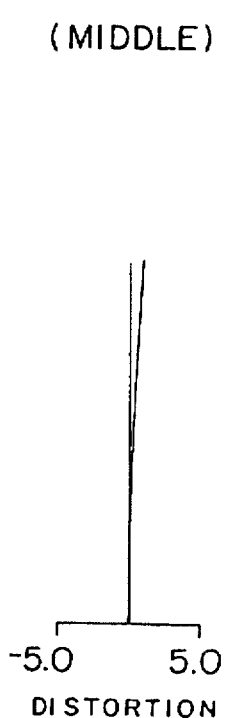
FIG. 27f (MIDDLE)
DISTORTION FIG. 27g (Tele)
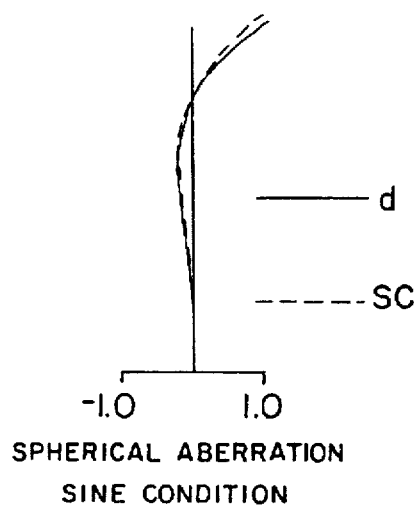
SPHERICAL ABERRATION
SINE CONDITION
FIG. 27h (Tele)
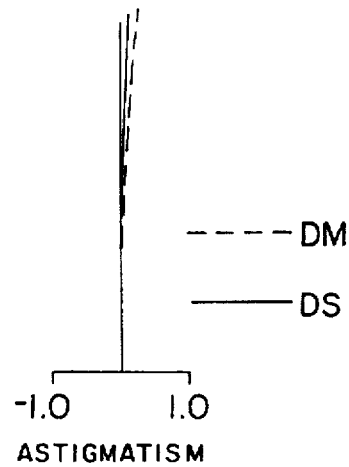
ASTIGMATISM
FIG. 27i (Tele)
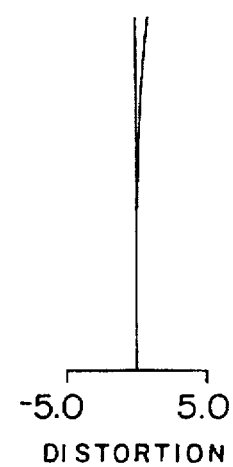
DISTORTION (WIDE)

SPHERICAL ABERRATION
SINE CONDITION (WIDE)

ASTIGMATISM (WIDE)

DISTORTION (MIDDLE)
SPHERICAL ABERRATION
SINE CONDITION (MIDDLE)
ASTIGMATISM (MIDDLE)
DISTORTION (TELE)
SPHERICAL ABERRATION
SINE CONDITION (TELE)
ASTIGMATISM (TELE)
DISTORTION (WIDE)

SPHERICAL ABERRATION
SINE CONDITION (WIDE)

ASTIGMATISM (WIDE)

DISTORTION (MIDDLE)

SPHERICAL ABERRATION
SINE CONDITION (MIDDLE)

ASTIGMATISM (MIDDLE)

DISTORTION (TELE)

SPHERICAL ABERRATION
SINE CONDITION (TELE)

ASTIGMATISM (TELE)

DISTORTION (WIDE)

SPHERICAL ABERRATION
SINE CONDITION (WIDE)

ASTIGMATISM (WIDE)

DISTORTION (MIDDLE)

—— d
----- SC

SPHERICAL ABERRATION
SINE CONDITION (MIDDLE)

----- DM
—— DS

ASTIGMATISM (MIDDLE)

DISTORTION (TELE)

—— d
----- SC

SPHERICAL ABERRATION
SINE CONDITION (TELE)

----- DM
—— DS

ASTIGMATISM (TELE)

DISTORTION (WIDE)

SPHERICAL ABERRATION
SINE CONDITION (WIDE)

ASTIGMATISM (WIDE)

DISTORTION (MIDDLE)

SPHERICAL ABERRATION
SINE CONDITION (MIDDLE)

ASTIGMATISM (MIDDLE)

DISTORTION (TELE)

SPHERICAL ABERRATION
SINE CONDITION (TELE)

ASTIGMATISM (TELE)

DISTORTION (WIDE)

SPHERICAL ABERRATION
SINE CONDITION (WIDE)

ASTIGMATISM (WIDE)

DISTORTION

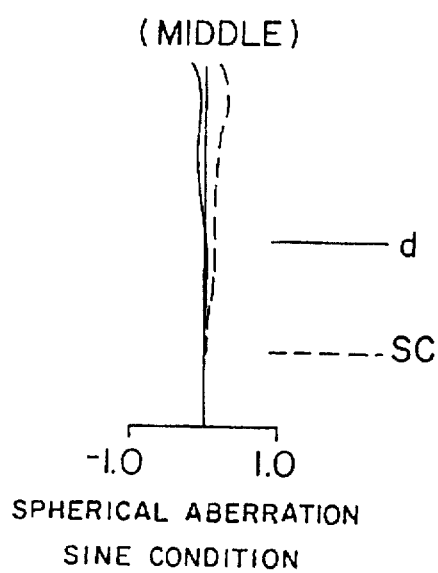
FIG. 37d (MIDDLE)
SPHERICAL ABERRATION
SINE CONDITION
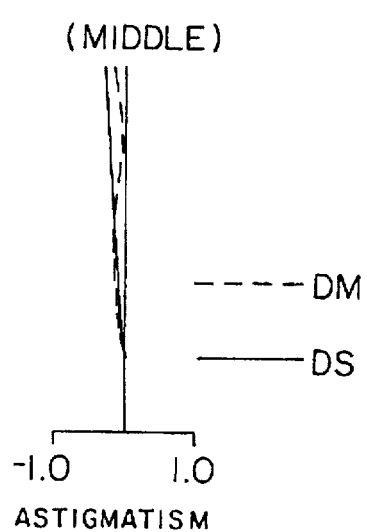
FIG. 37e (MIDDLE)
ASTIGMATISM
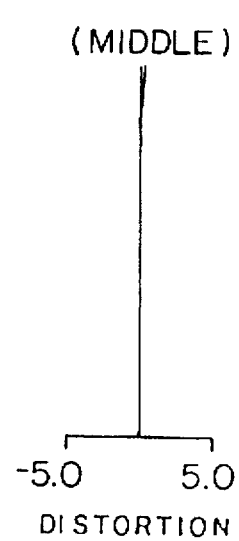
FIG. 37f (MIDDLE)
DISTORTION
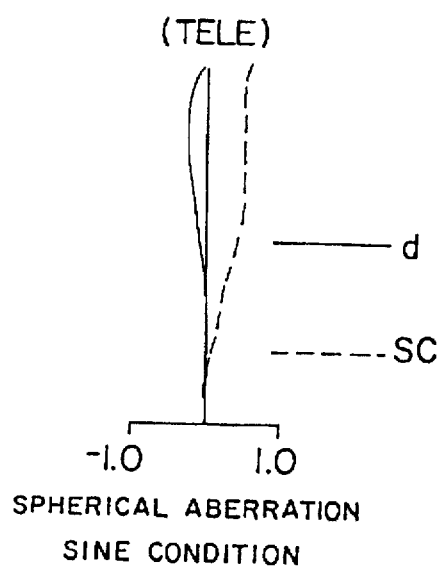
FIG. 37g (TELE)
SPHERICAL ABERRATION
SINE CONDITION
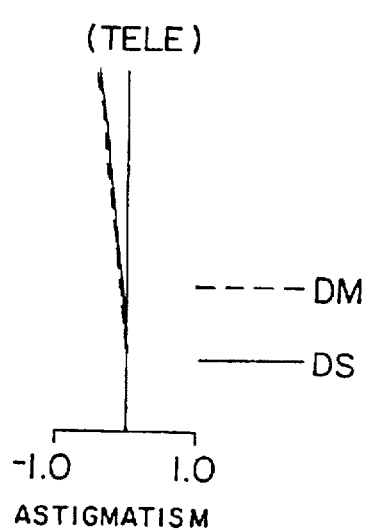
FIG. 37h (TELE)
ASTIGMATISM
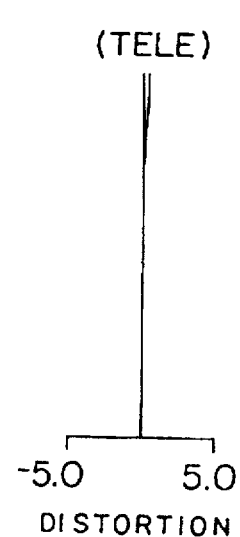
FIG. 37i (TELE)
DISTORTION (WIDE)

-1.0   1.0
SPHERICAL ABERRATION
SINE CONDITION (WIDE)

-1.0   1.0
ASTIGMATISM (WIDE)

-5.0   5.0
DISTORTION

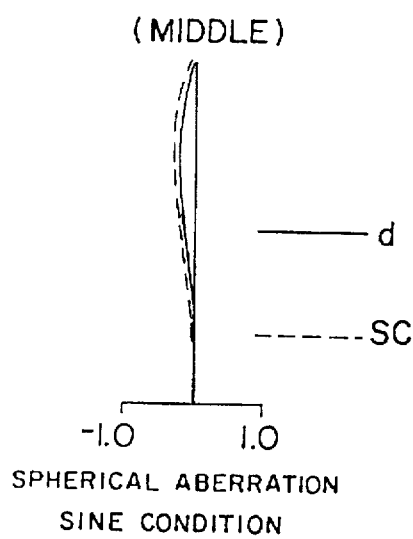
FIG. 39d (MIDDLE)
SPHERICAL ABERRATION
SINE CONDITION
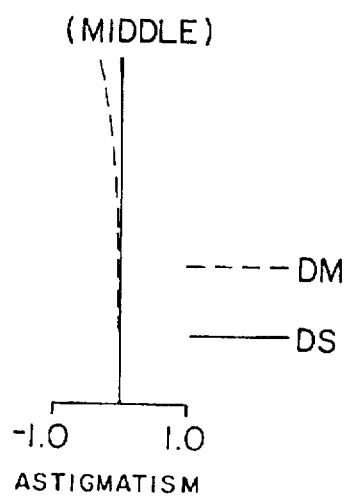
FIG. 39e (MIDDLE)
ASTIGMATISM
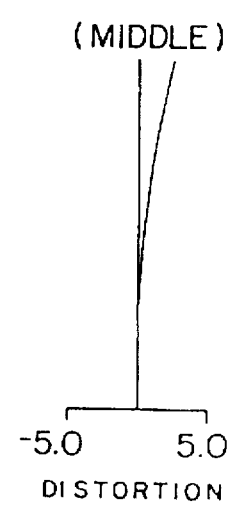
FIG. 39f (MIDDLE)
DISTORTION
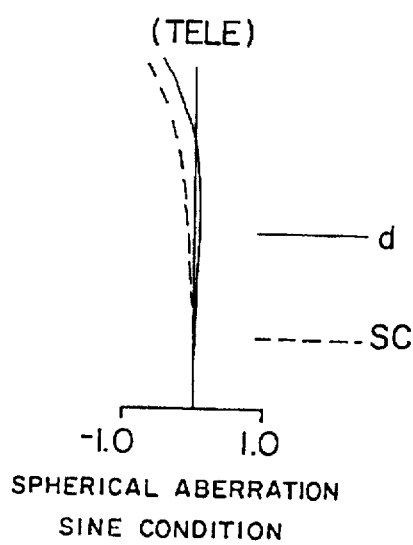
FIG. 39g (TELE)
SPHERICAL ABERRATION
SINE CONDITION
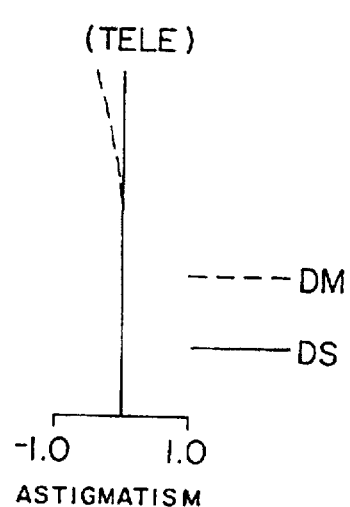
FIG. 39h (TELE)
ASTIGMATISM
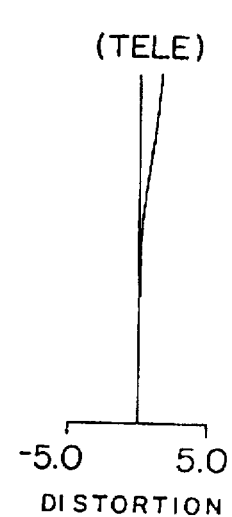
FIG. 39i (TELE)
DISTORTION (WIDE)

—— d
----- SC

-1.0   1.0
SPHERICAL ABERRATION
SINE CONDITION (WIDE)

---- DM
—— DS

-1.0   1.0
ASTIGMATISM (WIDE)

-5.0   5.0
DISTORTION (MIDDLE)

SPHERICAL ABERRATION
SINE CONDITION (MIDDLE)

ASTIGMATISM (MIDDLE)

DISTORTION (TELE)

SPHERICAL ABERRATION
SINE CONDITION (TELE)

ASTIGMATISM (TELE)

DISTORTION

FIG. 42a (WIDE)
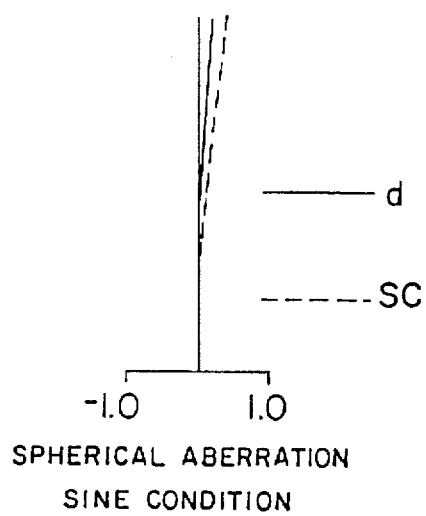
SPHERICAL ABERRATION
SINE CONDITION
FIG. 42b (WIDE)
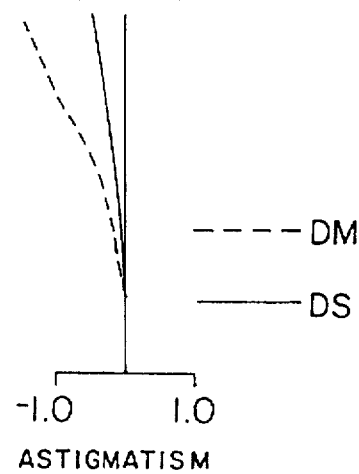
ASTIGMATISM
FIG. 42c (WIDE)
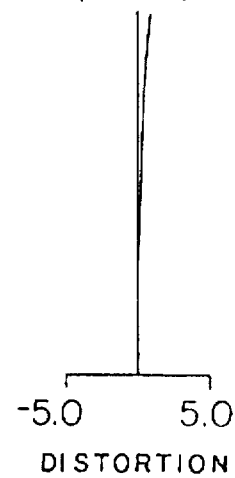
DISTORTION
FIG. 42d (MIDDLE)
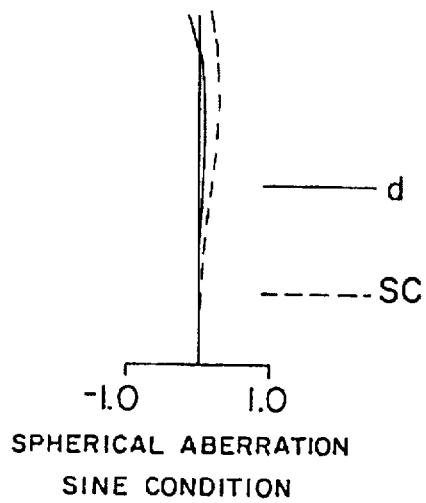
SPHERICAL ABERRATION
SINE CONDITION
FIG. 42e (MIDDLE)
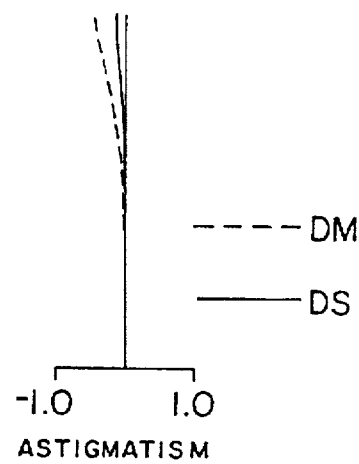
ASTIGMATISM
FIG. 42f (MIDDLE)
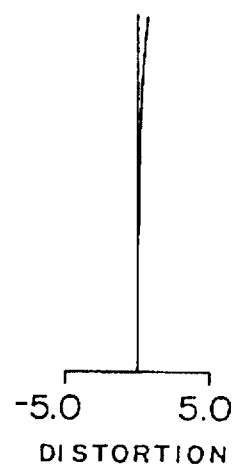
DISTORTION (Tele)

— d
----- SC

-1.0   1.0
SPHERICAL ABERRATION
SINE CONDITION (Tele)

----DM
——DS

-1.0   1.0
ASTIGMATISM (Tele)

-5.0   5.0
DISTORTION (WIDE)

-1.0   1.0
SPHERICAL ABERRATION
SINE CONDITION (WIDE)

-1.0   1.0
ASTIGMATISM (WIDE)

-5.0   5.0
DISTORTION

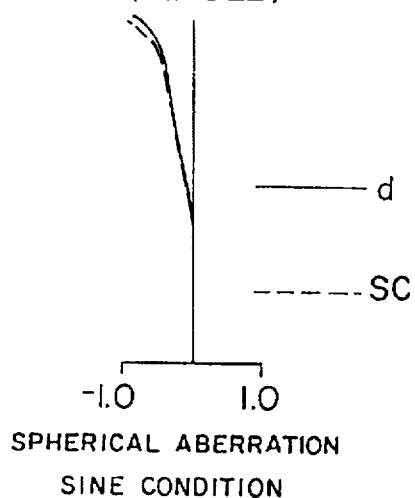
FIG. 44d (MIDDLE)
SPHERICAL ABERRATION
SINE CONDITION
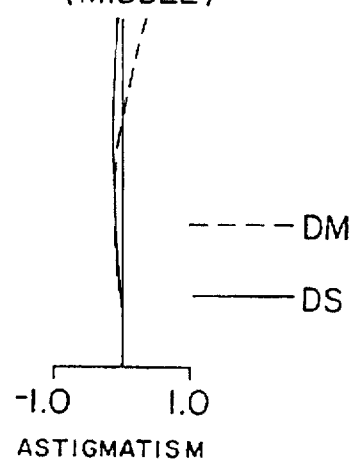
FIG. 44e (MIDDLE)
ASTIGMATISM
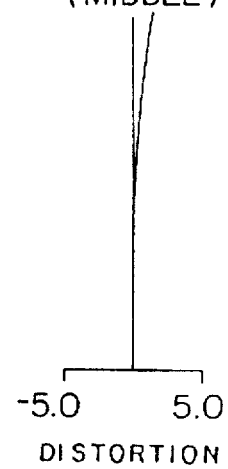
FIG. 44f (MIDDLE)
DISTORTION
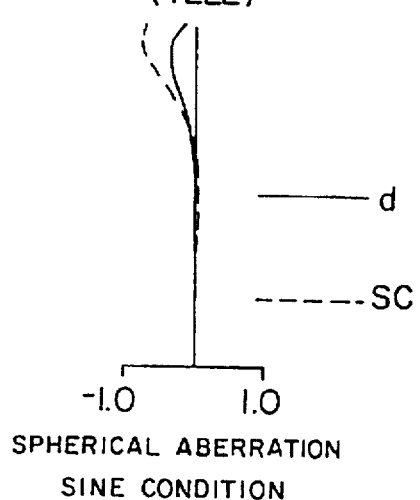
FIG. 44g (TELE)
SPHERICAL ABERRATION
SINE CONDITION
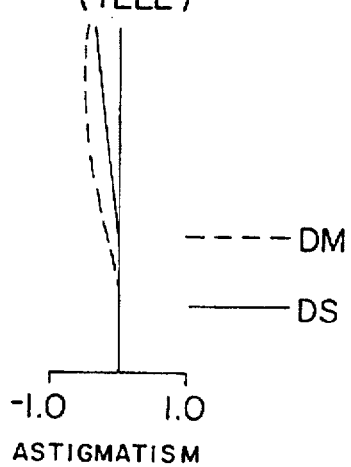
FIG. 44h (TELE)
ASTIGMATISM
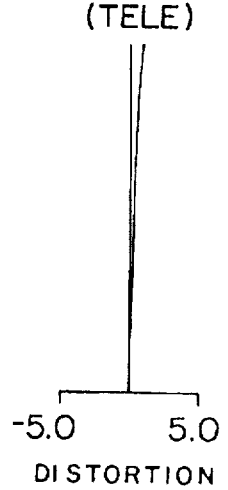
FIG. 44i (TELE)
DISTORTION (WIDE)

SPHERICAL ABERRATION
SINE CONDITION (WIDE)

ASTIGMATISM (WIDE)

DISTORTION (MIDDLE)

SPHERICAL ABERRATION
SINE CONDITION (MIDDLE)

ASTIGMATISM (MIDDLE)

DISTORTION

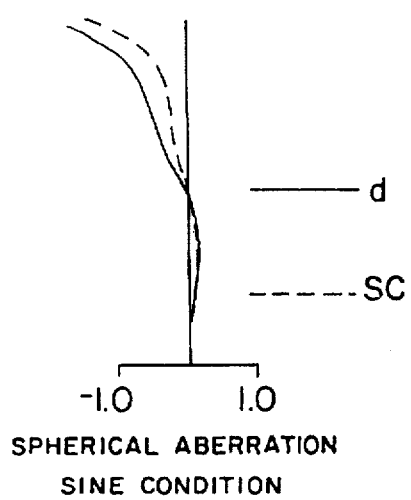
FIG. 45g (Tele)
SPHERICAL ABERRATION
SINE CONDITION
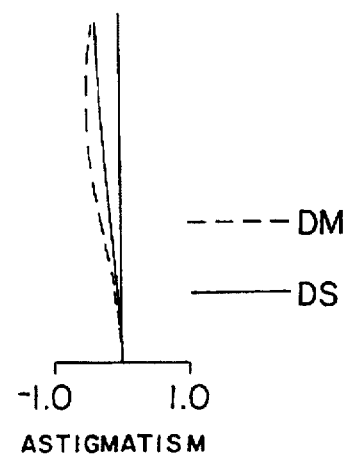
FIG. 45h (Tele)
ASTIGMATISM
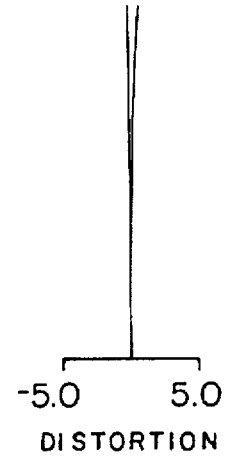
FIG. 45i (Tele)
DISTORTION (WIDE)

-1.0    1.0
SPHERICAL ABERRATION
SINE CONDITION

—— d
---- SC (WIDE)

-1.0    1.0
ASTIGMATISM

---- DM
—— DS (WIDE)

-5.0    5.0
DISTORTION

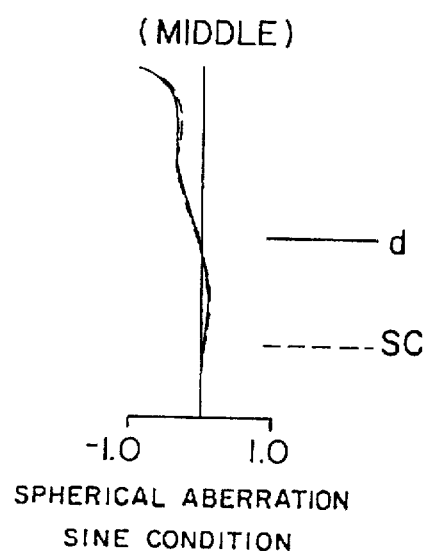
FIG. 47d (MIDDLE)
SPHERICAL ABERRATION
SINE CONDITION
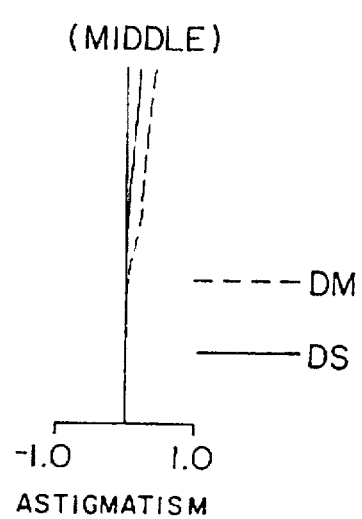
FIG. 47e (MIDDLE)
ASTIGMATISM
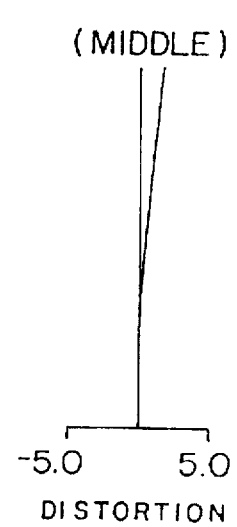
FIG. 47f (MIDDLE)
DISTORTION
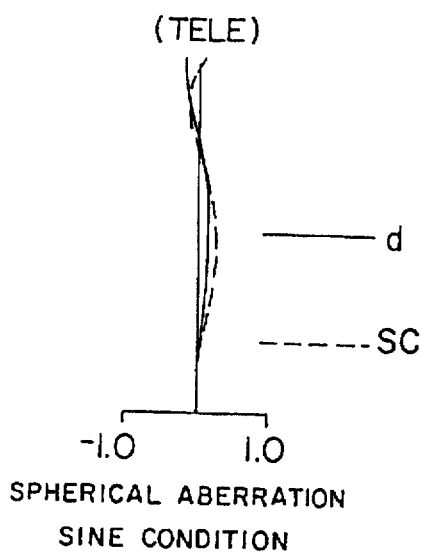
FIG. 47g (TELE)
SPHERICAL ABERRATION
SINE CONDITION
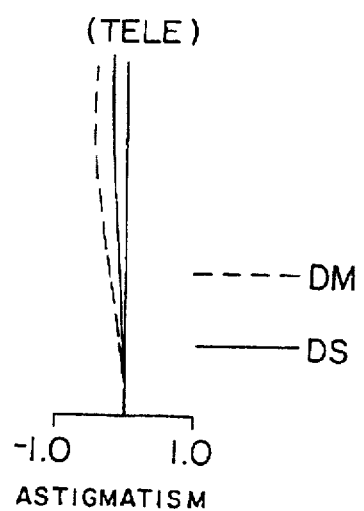
FIG. 47h (TELE)
ASTIGMATISM
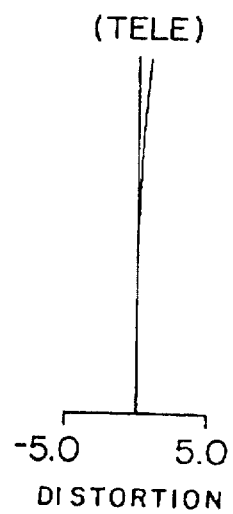
FIG. 47i (TELE)
DISTORTION (WIDE)

-1.0    1.0
SPHERICAL ABERRATION
SINE CONDITION

——— d
- - - - SC (WIDE)

-1.0    1.0
ASTIGMATISM

- - - - DM
——— DS (WIDE)

-5.0    5.0
DISTORTION

FIG. 49d (MIDDLE)
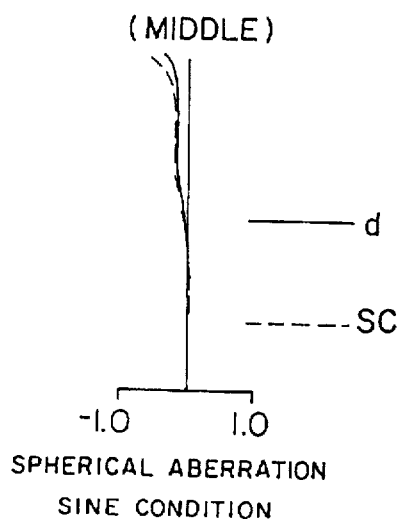
SPHERICAL ABERRATION
SINE CONDITION
FIG. 49e (MIDDLE)
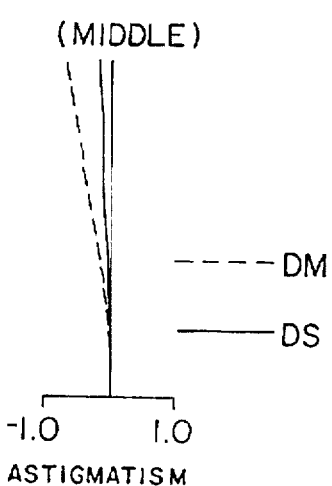
ASTIGMATISM
FIG. 49f (MIDDLE)
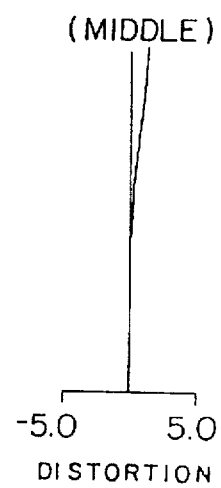
DISTORTION
FIG. 49g (TELE)
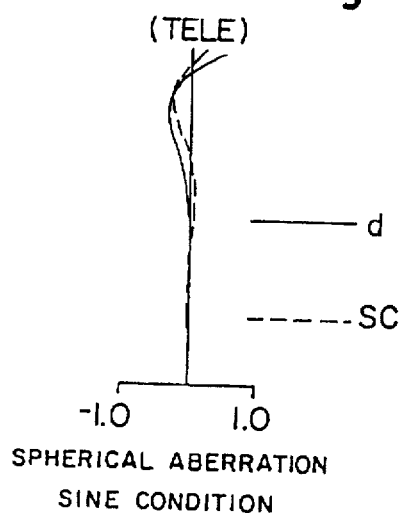
SPHERICAL ABERRATION
SINE CONDITION
FIG. 49h (TELE)
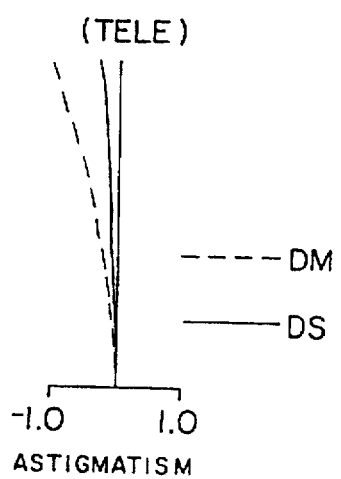
ASTIGMATISM
FIG. 49i (TELE)
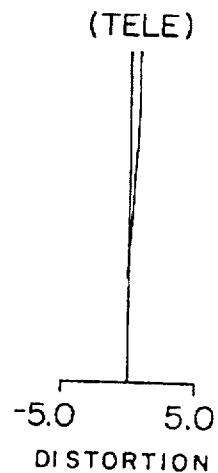
DISTORTION

ZOOM LENS SYSTEM

BACKGROUND OF THE INVENTION

1. Field of the Invention

The present invention pertains to a zoom lens system.

2. Description of the Related Art

Mainstream telephoto-type zoom lens systems that have been conventionally proposed have a four-component construction in which lens units are arranged such that their order in terms of refractive power is, from the object side, positive, negative, positive and positive, or positive, negative, positive and negative. However, a four-component zoom lens system generally has a large number of lenses, and when it is zoomed to the wide angle position, its total length becomes long.

SUMMARY OF THE INVENTION

The present invention was made in consideration of these points. Its object is to provide a compact zoom lens system which comprises a small number of lenses and has a short total system length.

Another object of the present invention is to provide a zoom lens system in which various aberrations are well compensated for despite its compact size.

These and other objects are attained by providing a lens system which comprises a master lens and a converter lens which is attachable at an object side of the master lens. The master lens and the converter lens have a plurality of lens unit which are movable on an optical axis during a zooming operation of the lens system.

BRIEF DESCRIPTION OF THE DRAWINGS

The above objects and features of the present invention are set forth with particularity in the appended claims. The present invention, both as to its organization and manner of operation, together with further objects and advantages thereof, may best be understood by reference to the following detailed description, taken in connection with the accompanying drawings.

FIG. 2a to 2i show aberration curves of the first embodiment of the lens system.

FIG. 7a to 7i show aberration curves of the third embodiment of the lens system at the closest focusing condition.

FIG. 13a to 13i show aberration curves of the sixth embodiment of the lens system.

FIG. 15a to 15i show aberration curves of the seventh embodiment of the lens system.

FIG. 19a to 19i show aberration curves of the ninth embodiment of the lens system.

FIG. 20a to 20i show aberration curves of the ninth embodiment of the lens system at the closest focusing condition.

FIG. 22a to 22i show aberration curves of the tenth embodiment of the lens system.

FIG. 24a to 24i show aberration curves of the eleventh embodiment of the lens system.

FIG. 27a to 27i show aberration curves of the twelfth embodiment of the lens system at the closest focusing condition.

FIG. 37a to 37i show aberration curves of the seventeenth embodiment of the lens system.

FIG. 39a to 39i show aberration curves of the eighteenth embodiment of the lens system.

FIG. 42a to 42i show aberration curves of the nineteenth embodiment of the lens system at the closest focusing condition.

FIG. 44a to 44i show aberration curves of the twentieth embodiment of the lens system.

FIG. 45a to 45i show aberration curves of the twentieth embodiment of the lens system at the closest focusing condition.

FIG. 47a to 47i show aberration curves of the twenty-first embodiment of the lens system.

FIG. 49a to 49i show aberration curves of the twenty-second embodiment of the lens system.

DETAILED DESCRIPTION OF THE PREFERRED EMBODIMENTS

Figure 1:
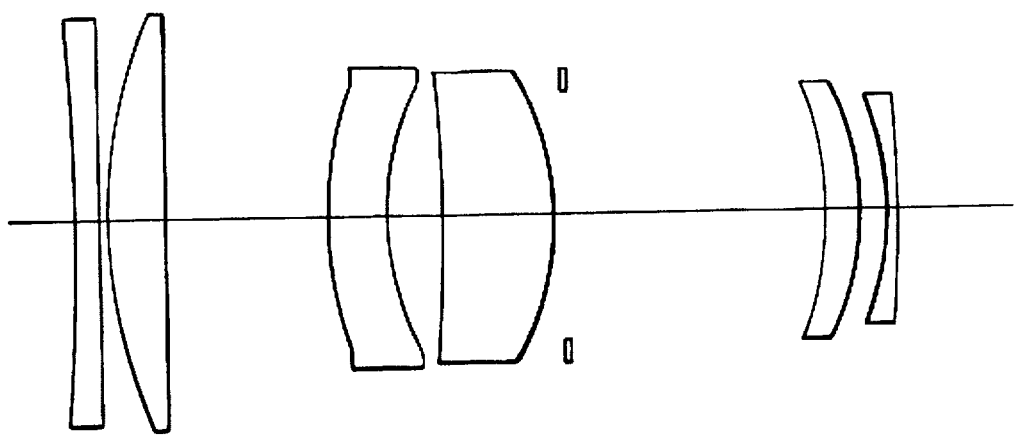
FIG. 1 is a cross-sectional view of a first embodiment of the lens system.

Embodiments of the present invention are explained below.

The embodiments have a three-component construction: they basically comprise, from the object side, a first lens unit having a positive refractive power, a second lens unit having a positive refractive power and a third lens unit having a negative refractive power. During zooming, the sizes of the first area of empty space between the first lens unit and the second lens unit and the second area of empty space between the second lens unit and the third lens unit change.

The zoom lens systems of the embodiments meet the following conditions in addition to having the basic construction described above. It is not necessary, however, to meet all of the conditions simultaneously.

(1) $BFL_W < DL/2$ (2) $E_{12W}/E_{23T} < 20$ (3) $0.5 < f_1/f_W < 3.0$ (4) $0.1 < f_1/f_2 < 10$ (5) $0.1 < f_{12W}/f_W < 5$ (6) $1.6 < \beta_{3W} < 3.0$ (7) $0.1 < \phi_{1-1}/\phi_W < 5.0$ (8) $-5.0 < \phi_{2-1}/\phi_W < -0.01$ (9) $6 < T_1 < 12$ wherein:

$BFL_W$: a back focal length of the zoom lens system in the shortest focal length condition, DL : a diagonal length of an image frame, $E_{12W}$: a length of the first area of empty space in the shortest focal length condition, $E_{23T}$: a length of the second area of empty space in the longest focal length condition, $f_1$: a focal length of the first lens unit, $f_2$: a focal length of the second lens unit, $f_W$: a focal length of the zoom lens system in the shortest focal length condition, $f_{12W}$: a composite focal length with the first and second lens units in the shortest focal length condition, $\beta_{3W}$: a lateral magnification of the third lens unit in the shortest focal length condition, $\phi_W$: a refractive power of the zoom lens system in the shortest focal length condition, $\phi_{1-1}$: a refractive power of a lens surface of the fist lens unit that is closest to the object side, $\phi_{2-1}$: a refractive power of a lens surface of the second lens unit that is closest to the object side, and $T_1$: an axial distance of the first lens unit.

Condition (1) governs the back focal length of the zoom lens system in the shortest focal length condition.

Most conventional zoom lens systems that have a refractive power arrangement of positive, positive and negative from the object side have a short back focal length. Their back focal length in the wide angle range is particularly short. A zoom lens system with a short back focal length is best suited for devices whose distance from the last lens surface to the image plane is short, such as compact cameras, but it is not suitable for devices in which a mirror is used between the last lens surface and the image plane, such as single lens reflex cameras.

With this in mind, in the embodiments pertaining to the present invention, an adequate back focal length in the wide angle range can be obtained by meeting condition (1), and they can therefore be used in devices that require a long back focal length, such as single lens reflex cameras.

Condition (2) governs the ratio of the length of the first area of empty space in the shortest focal length condition to the second area of empty space in the longest focal length condition. If the lower limit of condition (2) is exceeded with the first area of empty space in the wide angle range becoming small, the point in the second lens unit at which the light beam enters said lens unit rises relative to the center point of the lens. Consequently, it becomes difficult to compensate for the negative axial chromatic aberration that occurs in the second lens unit. If the lower limit of condition (2) is exceeded by the second area of empty space in the telephoto range becoming small, the point in the third lens unit at which the light beam enters said lens unit rises relative to the center point of the lens. Consequently, it becomes difficult to compensate for the positive axial chromatic aberration that occurs in the third lens unit, and at the same time the spherical aberration tends to worsen. On the other hand, if the upper limit of condition (2) is exceeded with the second area of empty space in the telephoto range becoming large or with the first area of empty space in the wide angle range becoming large, the total length of the zoom lens system increases, and at the same time the second area of empty space in the wide angle range also increases, which makes it difficult to obtain an adequate back focal length.

It is effective to set the lower limit of condition (2) at around 6 in order to better compensate for the axial chromatic aberration.

Condition (3) governs the ratio of the focal length of the first lens unit to the focal length of the zoom lens system in the shortest focal length condition. If the lower limit of condition (3) is exceeded, the refractive power of the first lens unit becomes too strong, and as a result it becomes difficult to obtain an adequate back focal length in the wide angle range, as well as to compensate for the positive lateral chromatic aberration in the telephoto range. On the other hand, if the upper limit of condition (3) is exceeded, the refractive power of the first lens unit becomes too weak, and as a result it becomes difficult to compensate for the negative axial chromatic aberration in the wide angle range and the positive axial chromatic aberration in the telephoto range. Further, since the amount of movement of the first lens unit during zooming increases, a lens system that exceeds the upper limit of condition (3) is unsuitable in achieving a compact lens mount.

Condition (4) governs the ratio of the focal length of the first lens unit to the focal length of the second lens unit. If the lower limit of condition (4) is exceeded, the refractive power of the first lens unit becomes too strong, and as a result it becomes difficult to compensate for the spherical aberration in the telephoto range. On the other hand, if the upper limit of condition (4) is exceeded, the refractive power of the second lens unit becomes too strong, and as a result it becomes difficult to compensate for the distortion and off-axial coma in the wide angle range. In addition, the refractive power of the first lens unit becomes too weak and the amount of movement of the first lens unit during zooming increases, and as a result it becomes difficult to achieve a compact lens mount.

It is effective to set the upper limit of condition (4) at around 2.2 in order to better compensate for the aberrations in the wide angle range and achieve a more compact lens mount.

Condition (5) governs the ratio of the composite focal length of the first and second lens units in the shortest focal length condition to the focal length of the zoom lens system in the shortest focal length condition. If the lower limit of condition (5) is exceeded, the refractive powers of the first and second lens units both become too strong, and as a result it becomes difficult to compensate for the spherical aberration in the telephoto range and the off-axial aberrations in the wide angle range. If the upper limit of condition (5) is exceeded, the refractive powers of the first and second lens units both become too weak, and as a result the compactness of the zoom lens system is lost.

Condition (6) governs the lateral magnification of the third lens unit in the shortest focal length condition. If the lower limit of condition (6) is exceeded, the refractive power of the third lens unit becomes too strong, and as a result it becomes difficult to compensate for aberrations—the curvature of field and coma, in particular—in the third lens unit. On the other hand, if the upper limit of condition (6) is exceeded, the refractive power of the third lens unit becomes too weak, and as a result the compactness of the zoom lens system is lost.

Condition (7) governs the ratio of the refractive power of the lens surface of the first lens unit that is closest to the object to the refractive power of the entire zoom lens system in the shortest focal length condition.

Generally, in a telephoto-type zoom lens system, the point in the first lens unit at which the beam of light passes through said lens unit becomes highest in the telephoto range. Where the light beam passes through a lens unit at a point that is high relative to the center of the lens unit, compensation for aberrations is difficult. Therefore, in order to obtain good performance in terms of compensation for aberrations in the telephoto range, it is preferred that the point in the first lens unit at which the light beam passes through said lens unit be as low as possible. This construction can be realized by having the lens surface of the first lens unit that is closest to the object (the first surface) be convex on the object side such that it has a positive refractive power. Condition (7) is a condition to set the refractive power of this first surface to an appropriate level.

If the lower limit of condition (7) is exceeded, the refractive power of the first surface becomes too weak, and as a result the first lens unit becomes large, making it difficult to achieve a compact zoom lens system. In addition, it becomes necessary to enhance the refractive powers of other positive surfaces in the first lens unit, which makes it difficult to compensate for spherical aberrations and comas in the telephoto range in particular. On the other hand, if the upper limit of condition (7) is exceeded, the refractive power of the first surface becomes too strong, which gives rise to the occurrence of large spherical and comas in the telephoto range, compensation for which is difficult.

Condition (8) governs the ratio of the refractive power of the lens surface of the second lens unit that is closest to the object to the refractive power of the entire zoom lens system in the shortest focal length condition.

Where the first lens unit has a positive refractive power and the third lens unit has a negative refractive power, a positive distortion easily occurs. It is preferred to give the surface of the second lens unit that is closest to the object (the second surface) a strong refractive power in order to compensate for said distortion. However, if the second surface is made to have a strong positive refractive power, a large coma easily occurs from the second surface. This phenomenon occurs because the light beam projected from the first lens unit enters the second lens unit from a wide angle when a relatively strong refractive power is given to the first lens unit in order to achieve a compact zoom lens system. Therefore, it is preferred to give a negative refractive power to the second surface. By giving a strong negative refractive power to the second surface, the rear principal point of the second lens unit becomes positioned on the image side. Therefore, it becomes possible to reduce the first area of empty space, which also contributes to making the zoom lens system compact. Condition (8) is a condition to set the refractive power of this second surface to an appropriate level.

If the lower limit of condition (8) is exceeded, the refractive power of the second surface becomes too strong, and as a result overcompensation of the distortion in the minus direction easily takes place. In addition, it becomes necessary to use a surface having a strong positive refractive power within the second lens unit in order to have the second lens unit have a positive refractive power, which allows for easy occurrence of a coma. On the other hand, if the upper limit of condition (8) is exceeded, the refractive power of the first surface becomes too weak, which makes it difficult to compensate for distortion, in addition to making it difficult to achieve a compact zoom lens system.

It is effective to set the lower limit of condition (8) at around −3.0 in order to better compensate for said distortion.

Condition (9) governs the axial distance of the first lens unit. If the lower limit of condition (9) is exceeded, it becomes difficult to obtain a proper edge surface for the lens(es) of the first lens unit having a positive refractive power. If the upper limit of condition (9) is exceeded, the length of the first lens unit becomes too long, which makes it difficult to achieve a compact zoom lens system.

In addition, it is preferred to use aspherical surfaces in the zoom lens systems of the embodiments. Naturally, however, aspherical surfaces need not necessarily be used.

Where an aspherical surface is used in the first lens unit, the following effect is achieved. In other words, in order to make the zoom lens system compact and reduce the amount of movement of the first lens unit during zooming from the position in the shortest focal length condition to the position in the longest focal length condition, it is necessary to make the refractive power of the first lens unit strong. Where the refractive power of the first lens unit is made strong, however, a spherical aberration (spherical aberration in the telephoto range, in particular) easily occurs. The aspherical surface in the first lens unit is effective in compensating for this spherical aberration.

Furthermore, where the surface of the first lens unit that is closest to the object is given a negative refractive power so that an adequate back focal length may be obtained in the wide angle range, if the negative refractive power given to this surface is strong, a positive spherical aberration and a positive axial chromatic aberration easily occur. Therefore, if this surface is made aspherical, which weakens the negative refractive power, these aberrations are kept small while an adequate back focal length in the wide angle range can be effectively obtained.

Where an aspherical surface is used in the second lens unit, the following effect is achieved. In other words, in order to make the zoom lens system compact, it is necessary to make the refractive power of the second lens unit strong. Where the refractive power of the second lens unit is made strong, however, an off-axial coma easily occurs in the wide angle range. The aspherical surface in the second lens unit is effective to compensate for this off-axial coma.

Furthermore, if it is attempted to construct the second lens unit using a small number of lenses, it becomes necessary to give the surface of the second lens unit that is closest to the image a strong positive refractive power, and as a result the spherical aberration coefficient easily becomes a large positive value. Therefore, if a negative surface having a relatively weak refractive power is made aspherical, a large negative value can be obtained using this aspherical surface, which is effective in offsetting said spherical aberration in the second lens unit.

Where an aspherical surface is used in the third lens unit, the following effect is achieved. In other words, if the refractive powers of the first and second lens units are made strong in order to make the zoom lens system compact, it inevitably also becomes necessary to increase the refractive power of the third lens unit. If the refractive power of the third lens unit is increased, however, the refractive powers of negative surfaces become strong, which easily gives rise to a negative curvature of field. This inclination is particularly marked in zoom lens systems having a long back focal length. The aspherical surface in the third lens unit is effective in compensating for this curvature of field.

Furthermore, if it is attempted to construct the third lens unit using a small number of lenses, it becomes necessary to use a surface having a strong negative refractive power in the third lens unit, and as a result the spherical aberration coefficient easily becomes a large negative value. Therefore, a large positive spherical aberration coefficient can be obtained by using an aspherical surface in the third lens unit, which effectively offsets the spherical aberration in the third lens unit.

By using three or more aspherical surfaces in the entire zoom lens system, it becomes possible to significantly reduce the number of lenses that comprise each lens unit. For example, it is possible to construct each lens unit with two lenses. In this case, it is effective to use an aspherical surface in the second and third lens units.

In addition, it is preferred that the first and third lens units be moved together during zooming. By moving the first and third lens units together during zooming, the lens mount construction—the cam construction for zooming, in particular—can be simplified.

The aperture is preferably positioned between the first lens unit and the second lens unit, or between the second lens unit and the third lens unit. Where the aperture is positioned between the first lens unit and the second lens unit, it becomes possible to cut off-axial lower light rays in the wide angle range in particular, so that the performance is improved, and at the same time it becomes possible to reduce the lens diameter of the first lens unit. Where the aperture is positioned between the second lens unit and the third lens unit, the matching between the aperture and off-axial light rays improves so that it becomes possible to secure a good illumination curve with regard to the image height even when the aperture is made small. The aperture may be moved together with the second lens unit or independently of the second lens unit during zooming.

Focusing is preferably performed using the second lens unit. The effect of focusing using the second lens unit is explained below using aberration coefficients. Table 1 shows the aberration coefficients in Embodiment 3, which is described below, where focusing is performed using the first lens unit, the second lens unit and the third lens unit.

TABLE 1

|  |  | Infinity Focusing | Nearest Focusing | | |
|---|---|---|---|---|---|
|  |  |  | Unit 1 | Unit 2 | Unit 3 |
| Spherical Aberration | Wide | 3.1 | 6.5 | 3.6 | 3.3 |
|  | Tele | 81 | 130 | 85 | 32 |
| Coma | Wide | 0.7 | −1.3 | 0.5 | 0.2 |
|  | Tele | 0.1 | −13 | −0.7 | −0.5 |
| Astigmatism | Wide | 0.4 | 0.1 | 0.1 | 0.1 |
|  | Tele | 0.1 | 3.0 | −0.2 | 0.1 |

The following can be seen from Table 1. First, where focusing is performed using the first lens unit, compensation for the spherical aberration, coma and astigmatism tends to be insufficient. Where focusing is performed using the third lens unit, the fluctuation in spherical aberration tends to be large between infinity focusing and closest range focusing. Where focusing is performed using the second lens unit, all aberrations are well compensated for and no significant fluctuation in any aberration is seen between infinity focusing and closest range focusing.

Further, since the refractive power of the first lens unit is not very strong, where focusing is performed using the first lens unit, the lens unit must be moved over a great distance to perform focusing. Where focusing is performed using the third lens unit, the third lens unit moves toward the image during focusing, which shortens the back focal length. This is therefore not suited for devices such as single reflex cameras, in particular, which require a long back focal length. Where focusing is performed using the second lens unit, there is little disadvantage arising in connection with the lens unit's movement for focusing. Therefore, it is preferred that focusing be performed using the second lens unit.

Figure 2A:
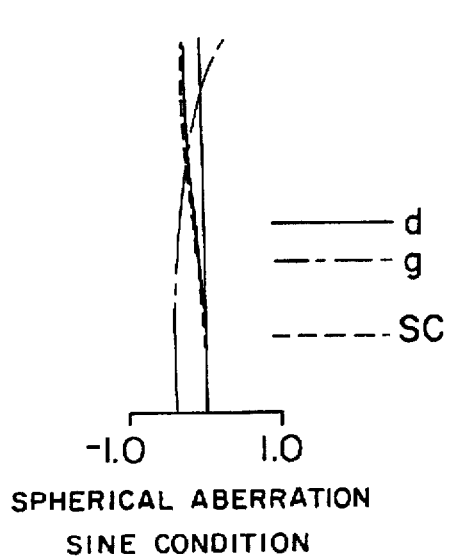
Figure 2B:
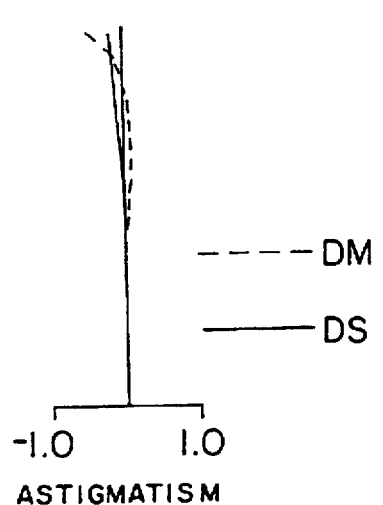
Figure 2C:
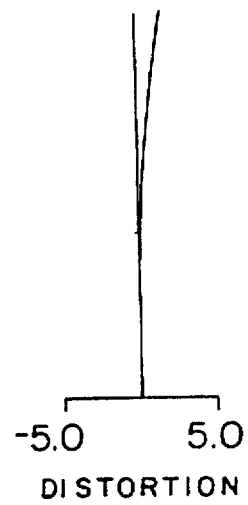
Figure 3:
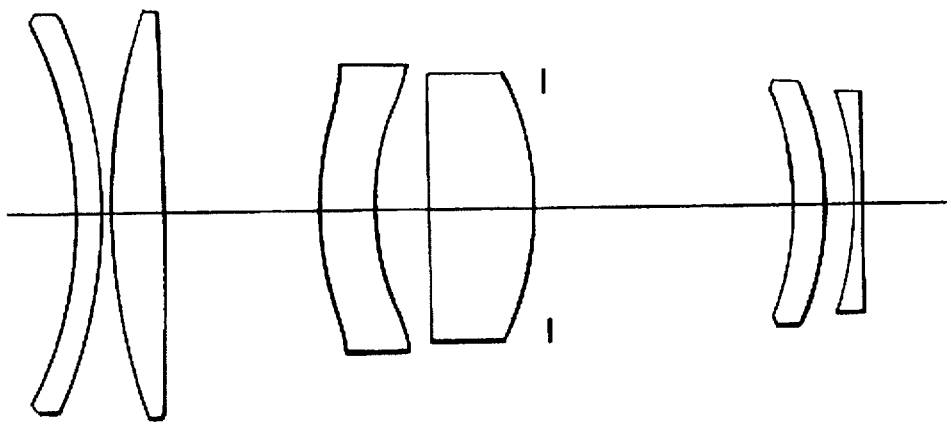
FIG. 3 is a cross-sectional view of a second embodiment of the lens system.
Figure 4A:
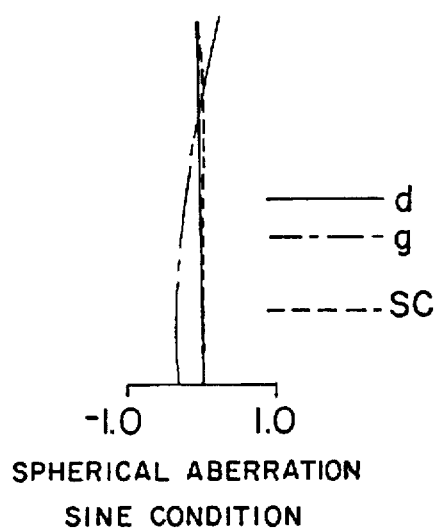
FIG. 4a to 4i show aberration curves of the second embodiment of the lens system.
Figure 4B:
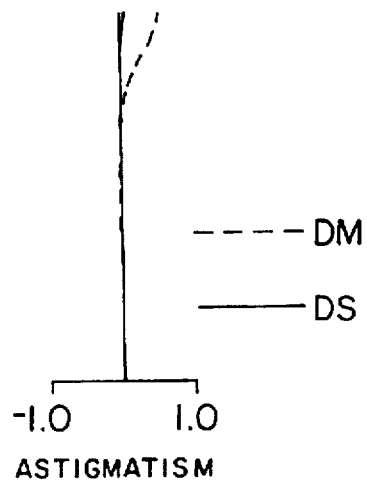
Figure 4C:
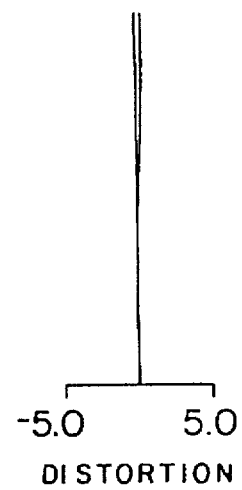
Figure 4D:
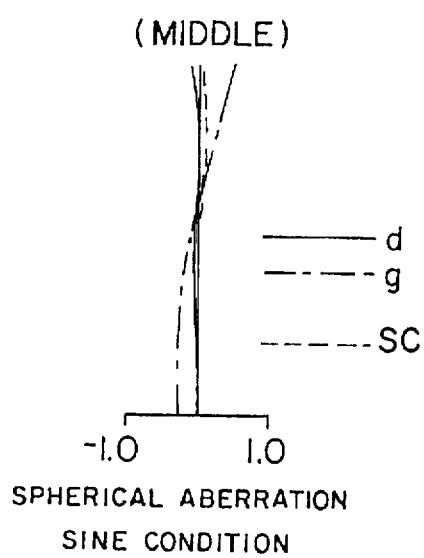
Figure 4E:
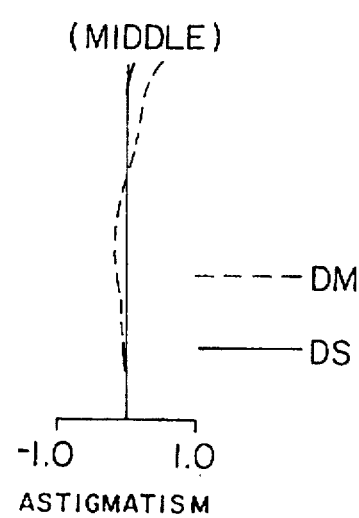
Figure 4F:
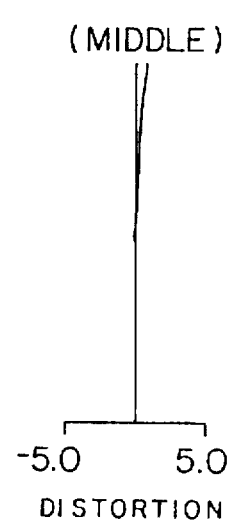
Figure 4G:
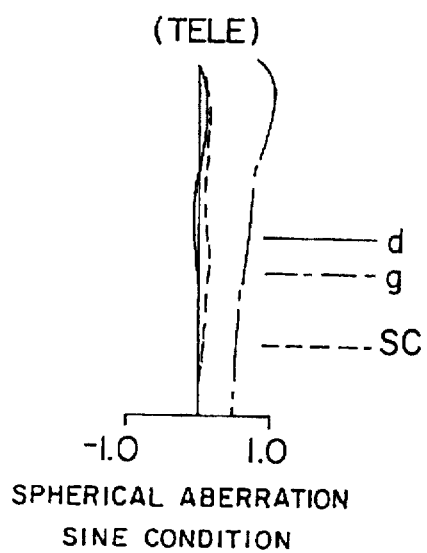
Figure 4H:
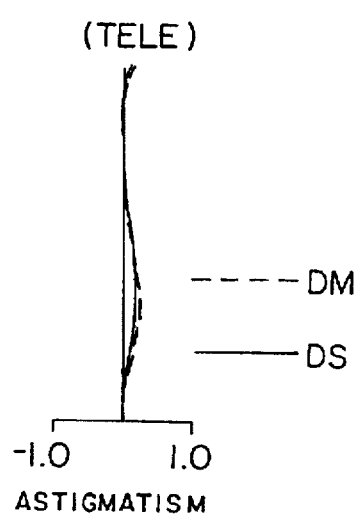
Figure 4I:
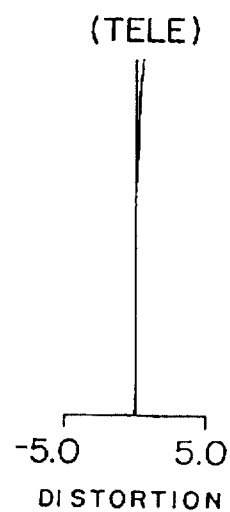
Figure 5:
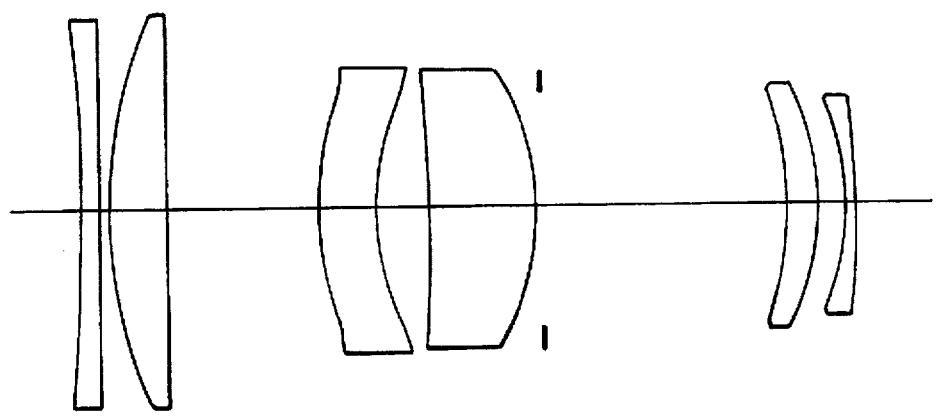
FIG. 5 is a cross-sectional view of a third embodiment of the lens system.
Figure 6A:
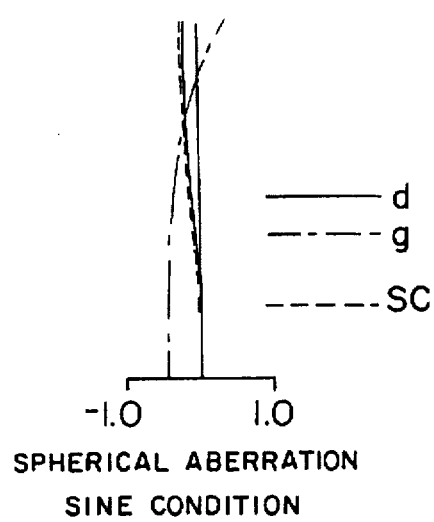
FIG. 6a to 6i show aberration curves of the third embodiment of the lens system.
Figure 6B:
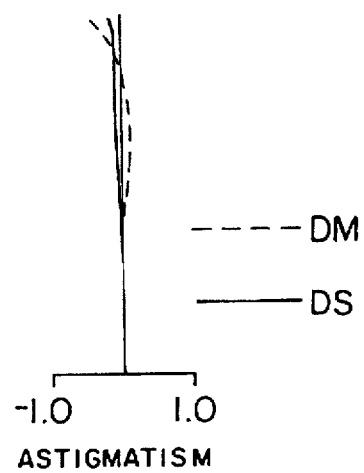
Figure 6C:
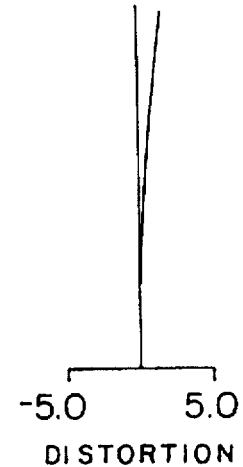
Figure 6D:
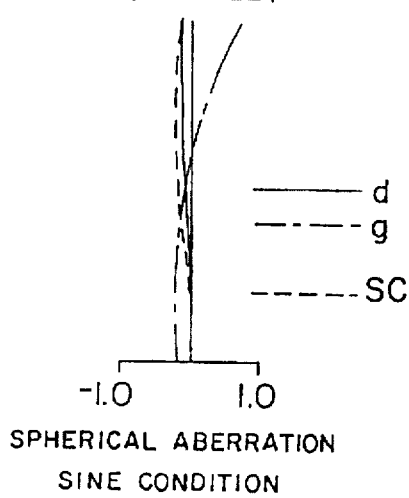
Figure 6E:
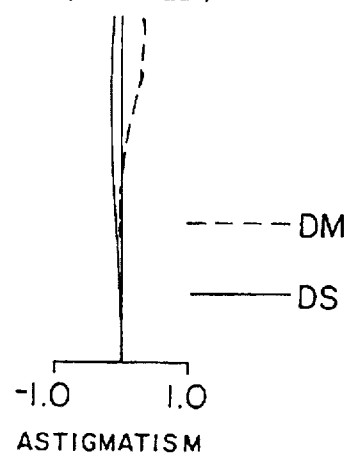
Figure 6F:
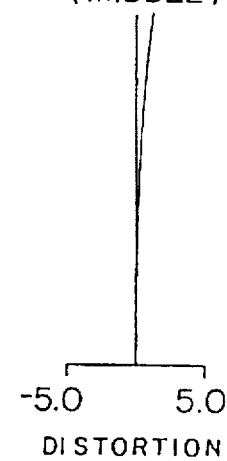
Figure 6G:
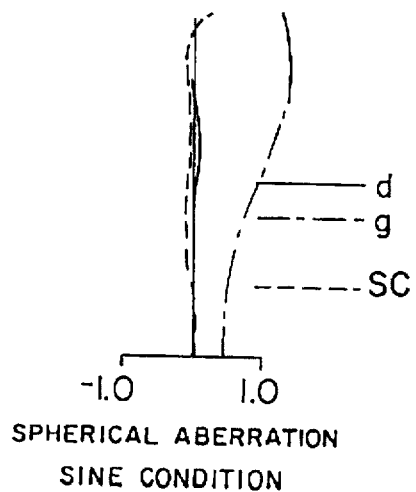
Figure 6H:
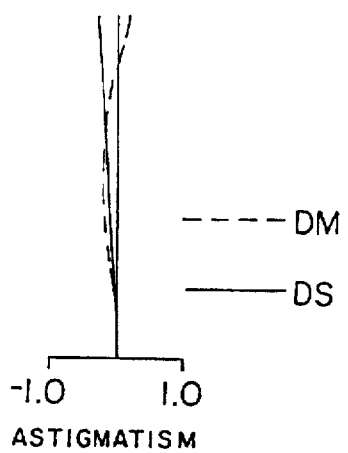
Figure 6I:
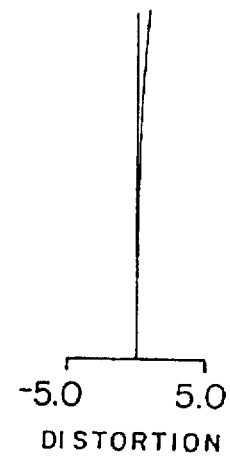
Figure 8:
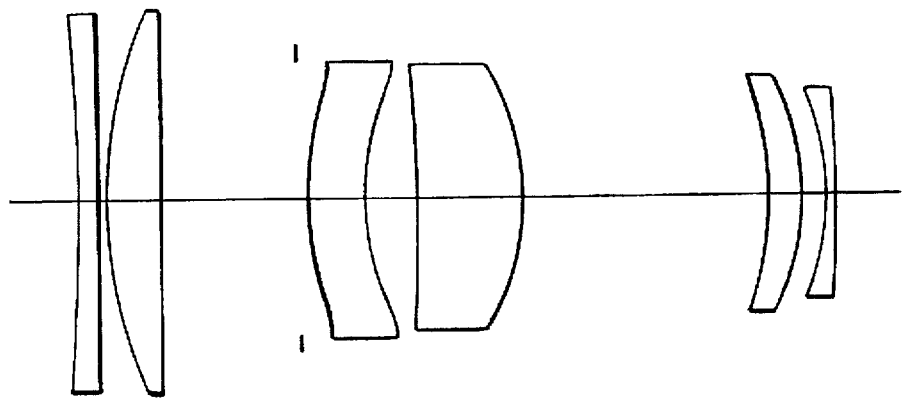
FIG. 8 is a cross-sectional view of a fourth embodiment of the lens system.
Figure 9A:
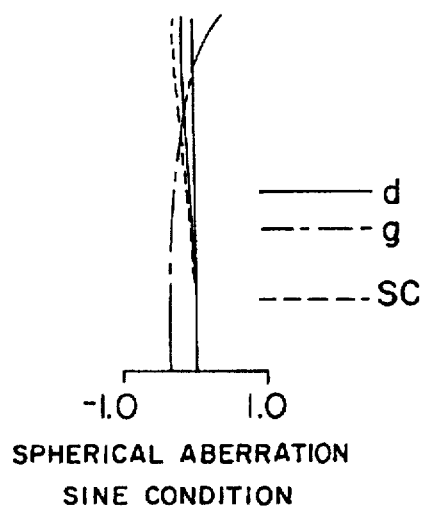
FIG. 9a to 9i show aberration curves of the fourth embodiment of the lens system.
Figure 9B:
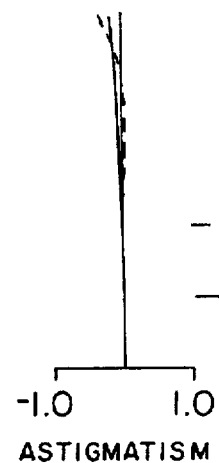
Figure 9C:
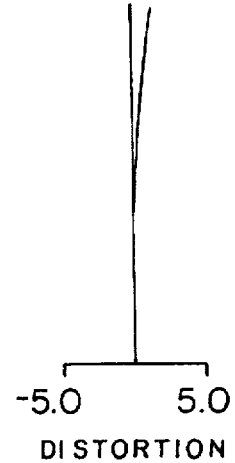
Figure 9D:
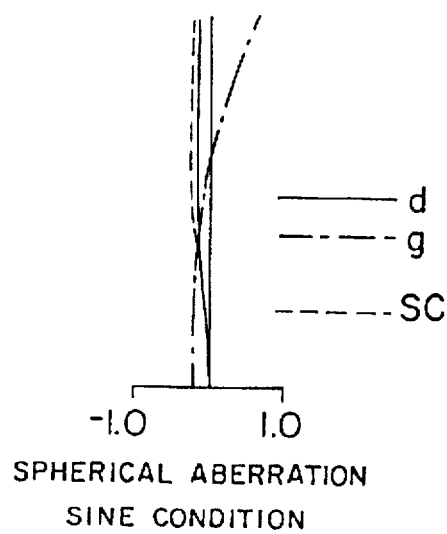
Figure 9E:
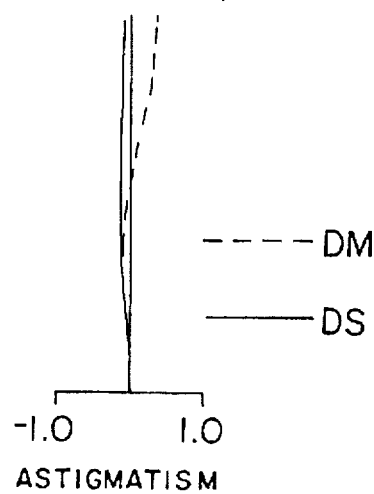
Figure 9F:
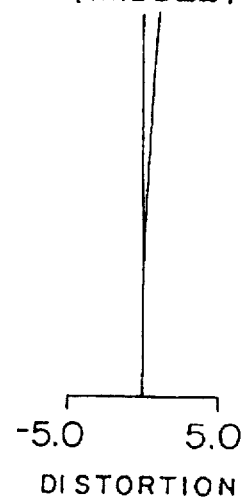
Figure 9G:
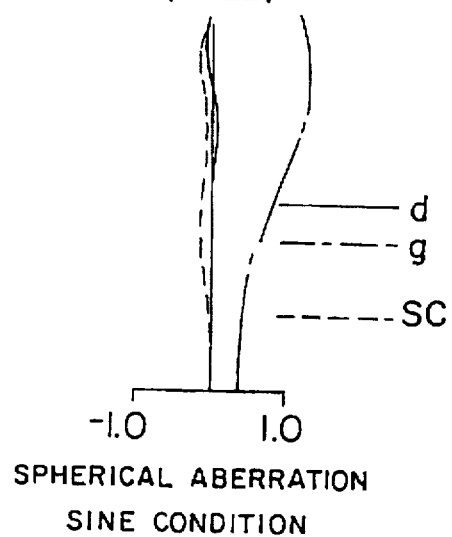
Figure 9H:
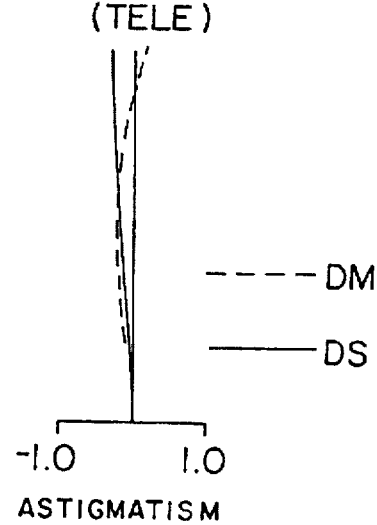
Figure 9I:
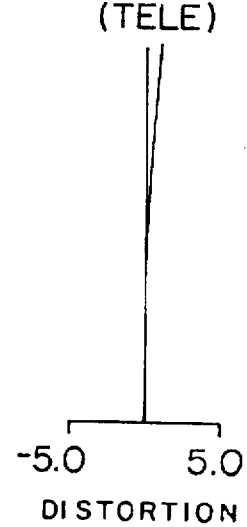
Figure 10:
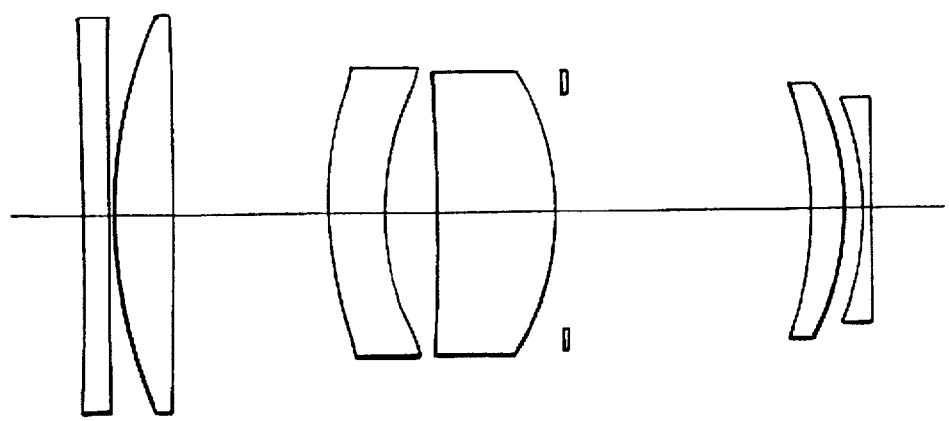
FIG. 10 is a cross-sectional view of a fifth embodiment of the lens system.
Figure 11A:
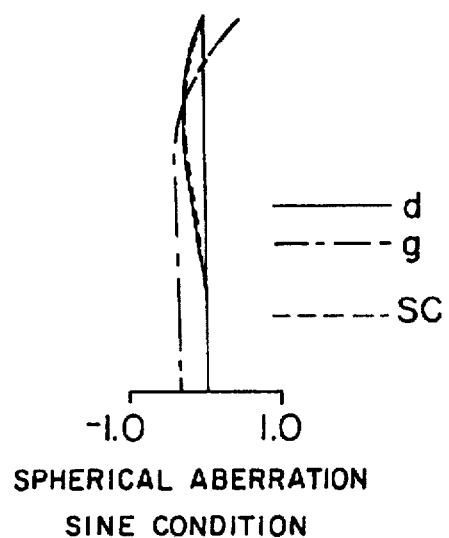
FIG. 11a to 11i show aberration curves of the fifth embodiment of the lens system.
Figure 11B:
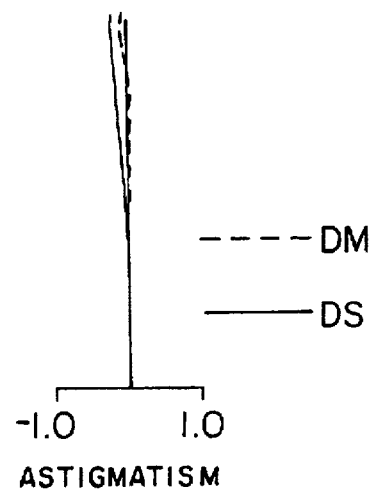
Figure 11C:
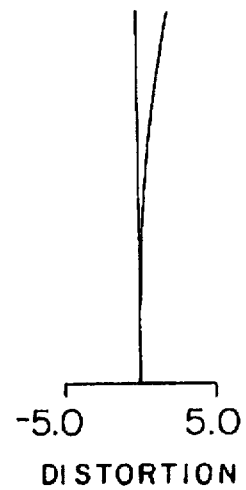
Figure 11D:
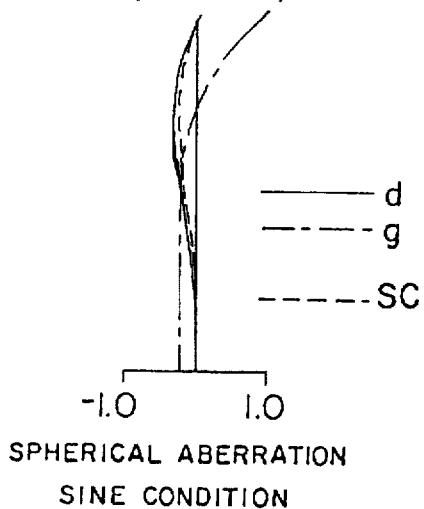
Figure 11E:
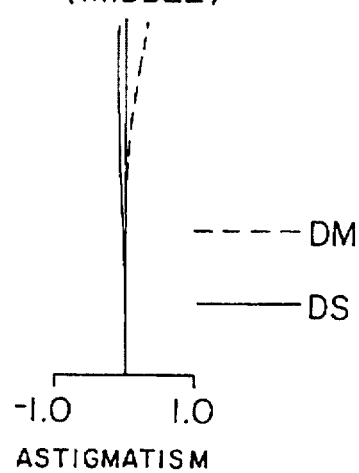
Figure 11F:
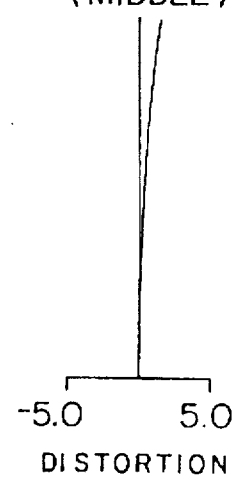
Figure 11G:
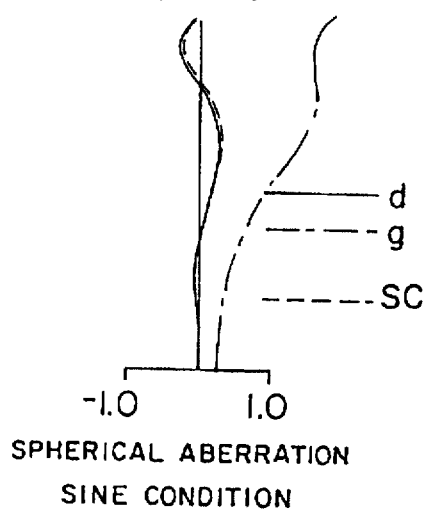
Figure 11H:
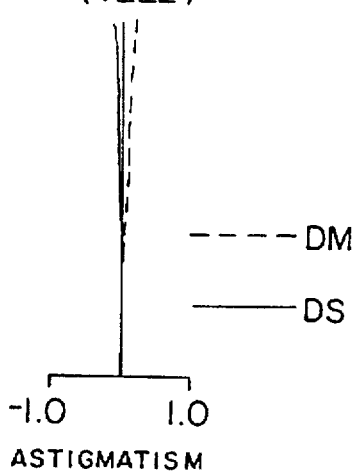
Figure 11I:
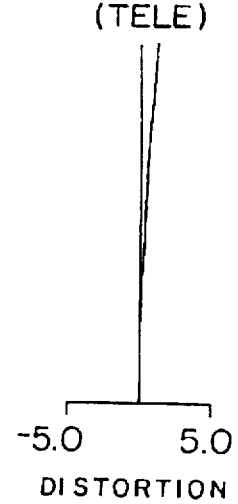
Figure 12:
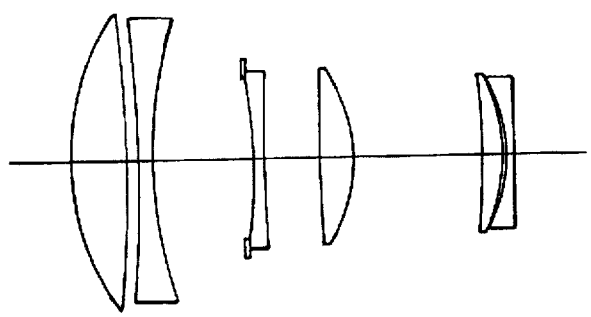
FIG. 12 is a cross-sectional view of a sixth embodiment of the lens system.
Figure 13A:
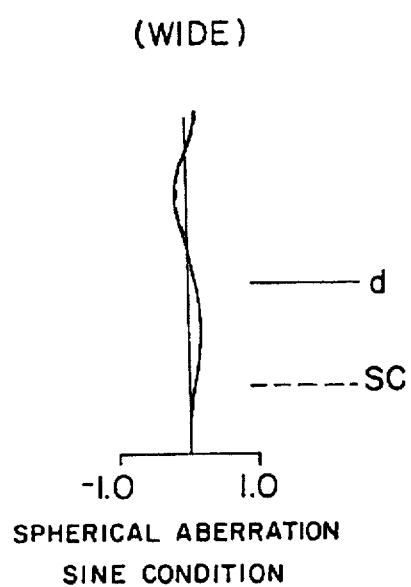
Figure 13B:
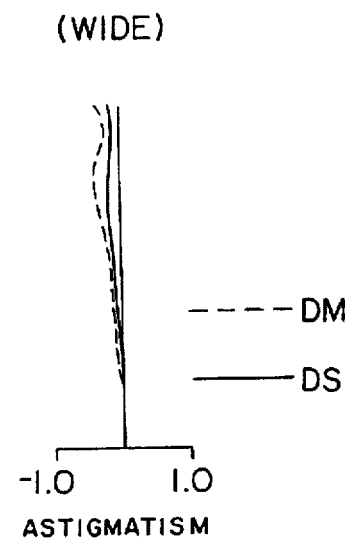
Figure 13C:
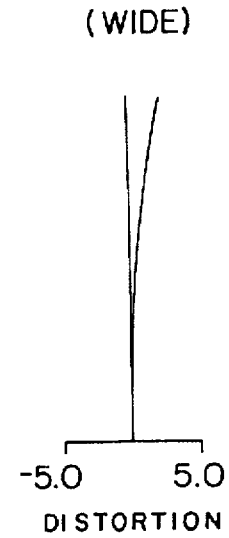
Figure 14:
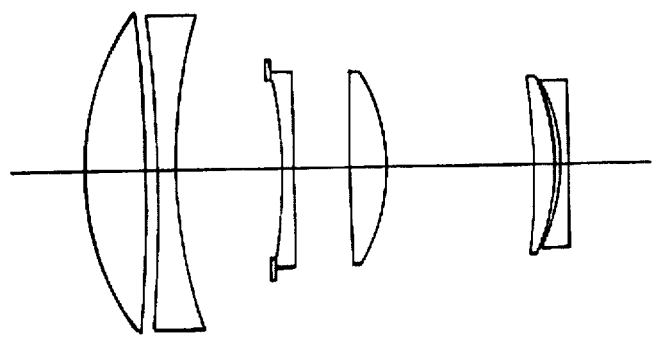
FIG. 14 is a cross-sectional view of a seventh embodiment of the lens system.
Figure 15A:
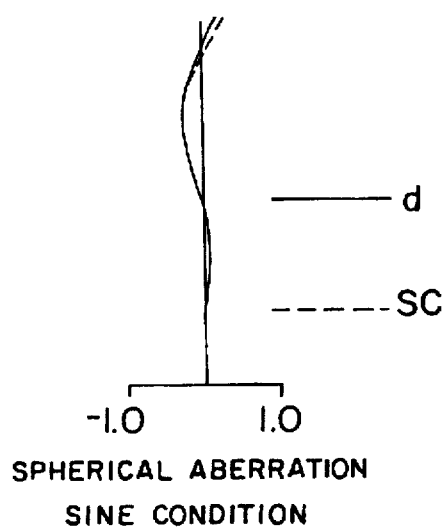
Figure 15B:
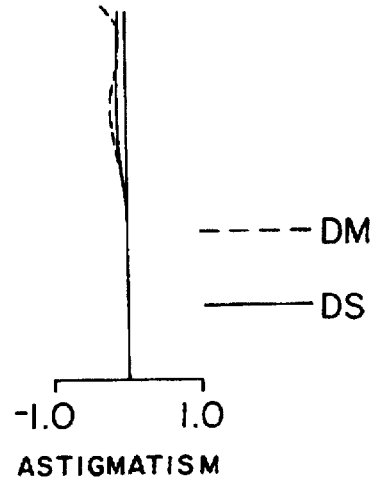
Figure 15C:
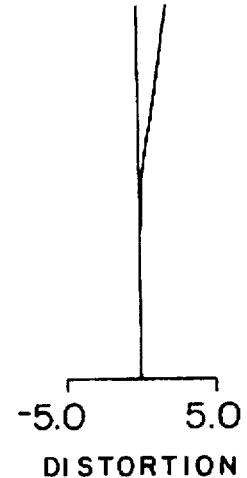
Figure 16:
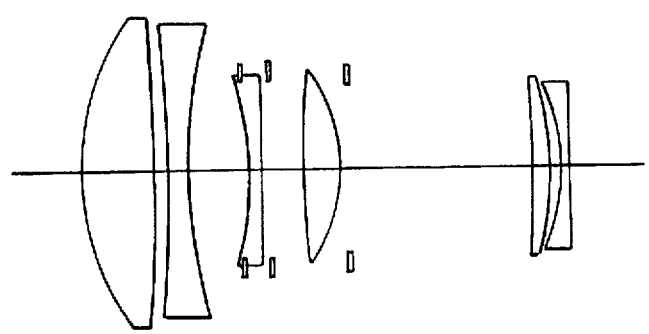
FIG. 16 is a cross-sectional view of a eighth embodiment of the lens system.
Figure 17A:
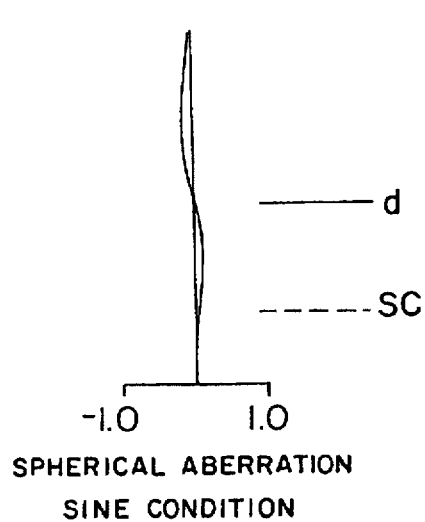
FIG. 17a to 17i show aberration curves of the eighth embodiment of the lens system.
Figure 17B:
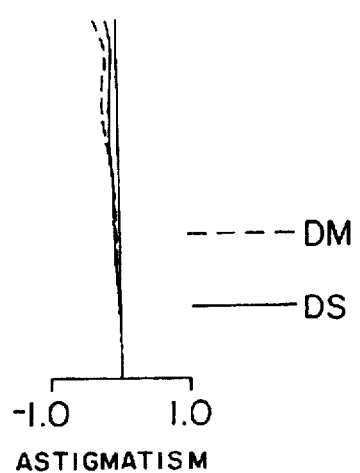
Figure 17C:
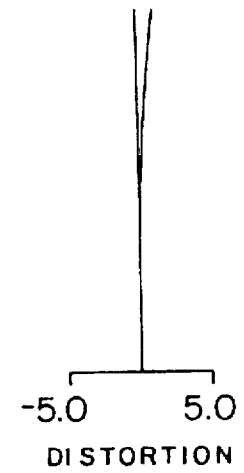
Figure 17D:
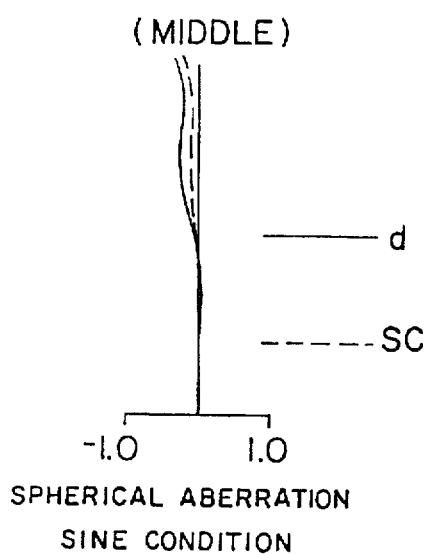
Figure 17E:
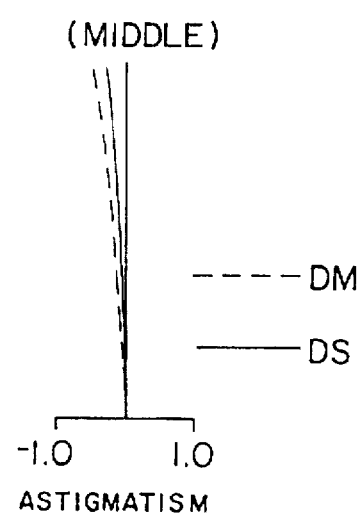
Figure 17F:
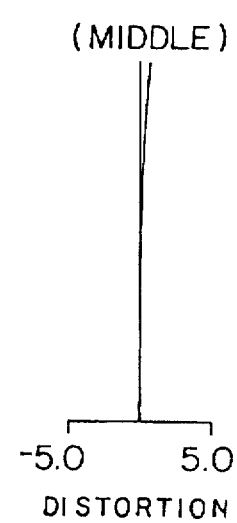
Figure 17G:
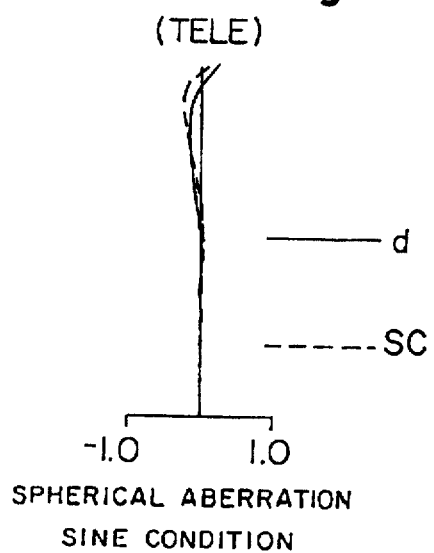
Figure 17H:
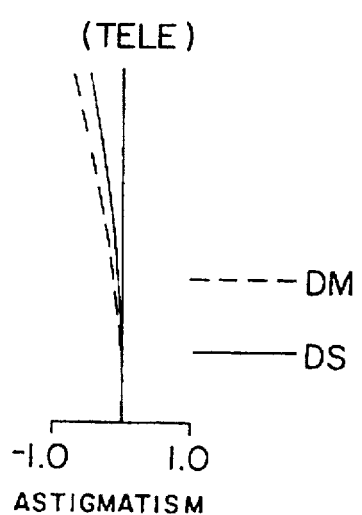
Figure 17I:
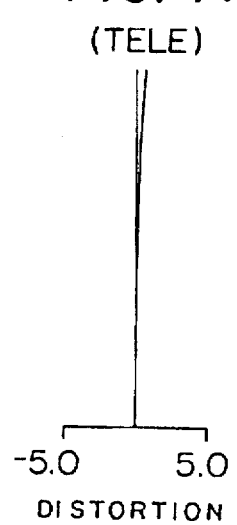
Figure 18:
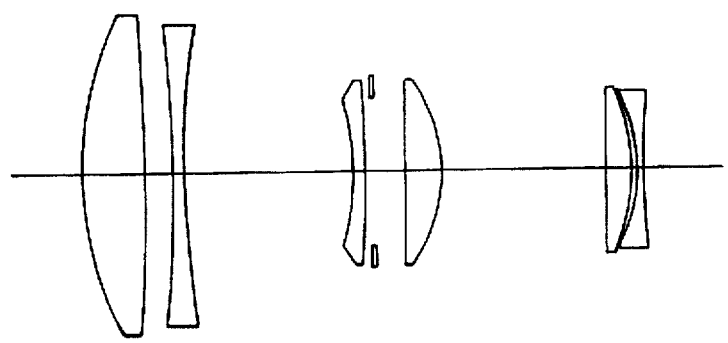
FIG. 18 is a cross-sectional view of a ninth embodiment of the lens system.
Figure 19A:
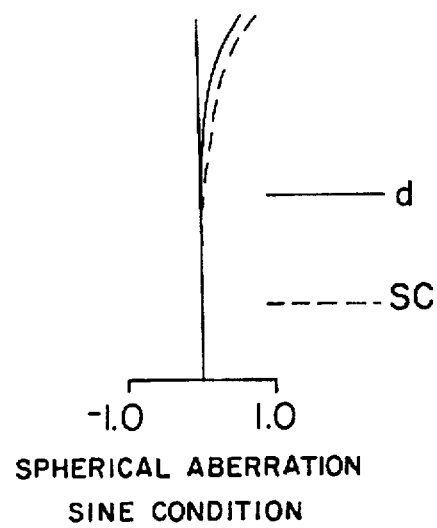
Figure 19B:
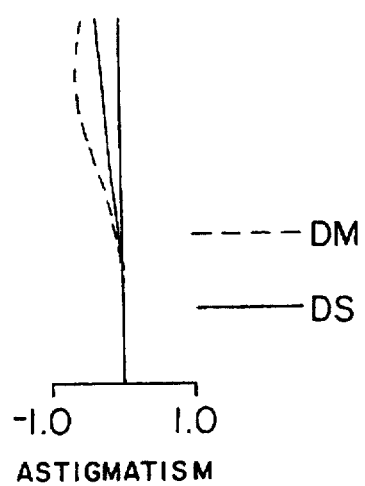
Figure 19C:
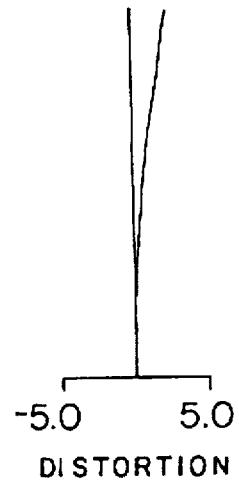
Figure 21:
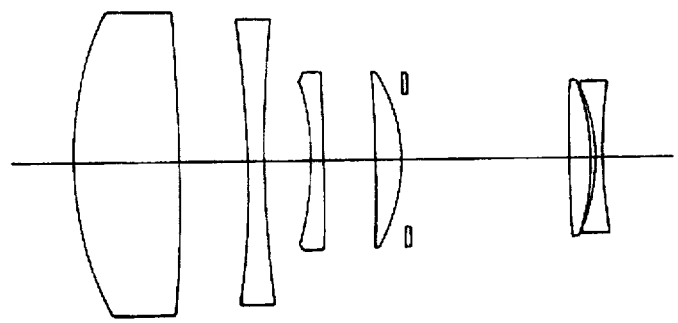
FIG. 21 is a cross-sectional view of a tenth embodiment of the lens system.
Figure 22A:
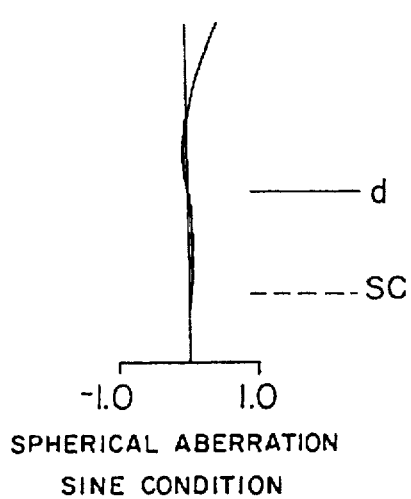
Figure 22B:
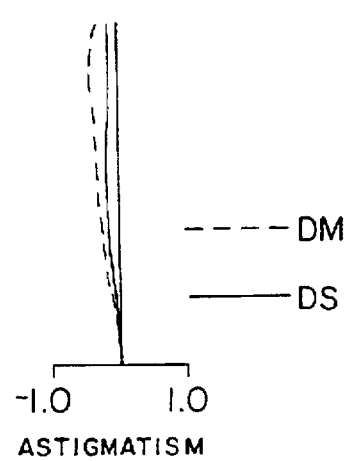
Figure 22C:
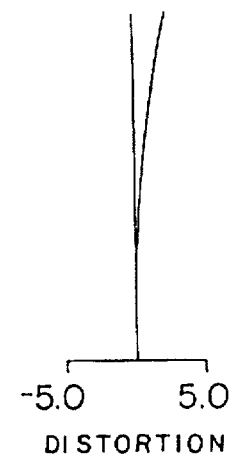
Figure 23:
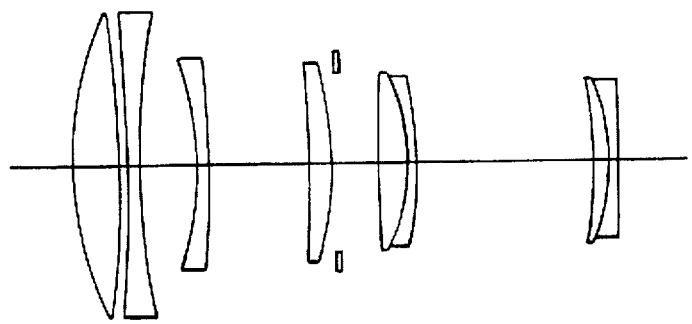
FIG. 23 is a cross-sectional view of a eleventh embodiment of the lens system.
Figure 24A:
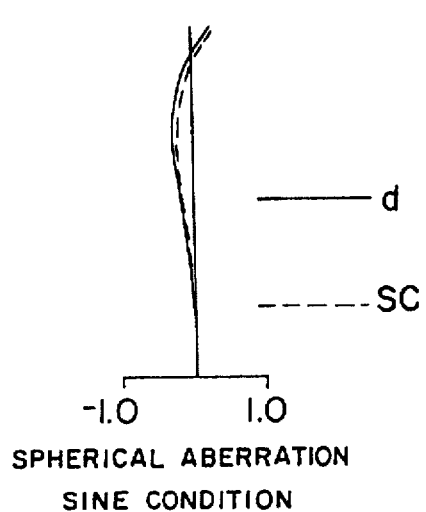
Figure 24B:
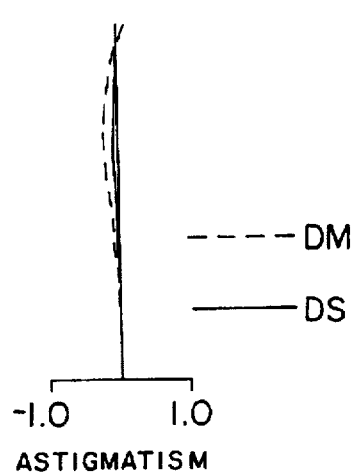
Figure 24C:
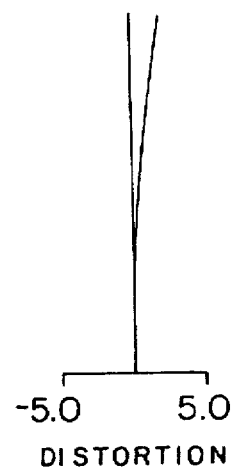
Figure 25:
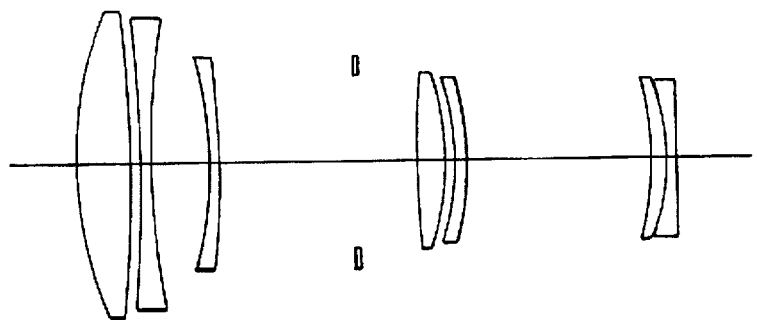
FIG. 25 is a cross-sectional view of a twelfth embodiment of the lens system.
Figure 26A:
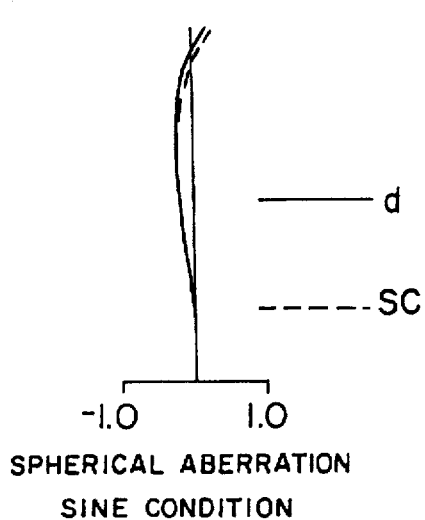
FIG. 26a to 26i show aberration curves of the twelfth embodiment of the lens system.
Figure 26B:
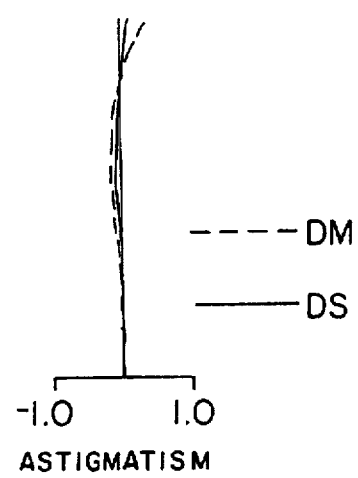
Figure 26C:
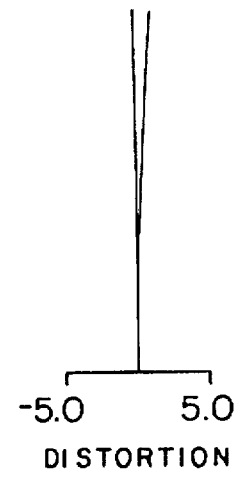
Figure 26D:
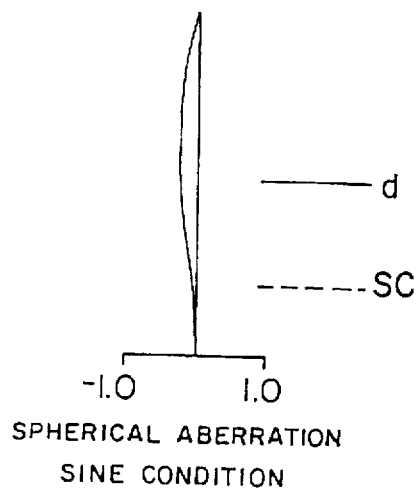
Figure 26E:
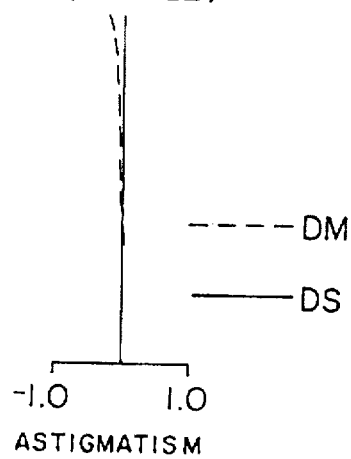
Figure 26F:
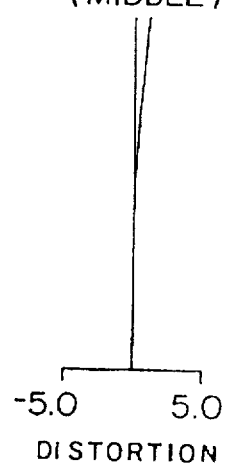
Figure 26G:
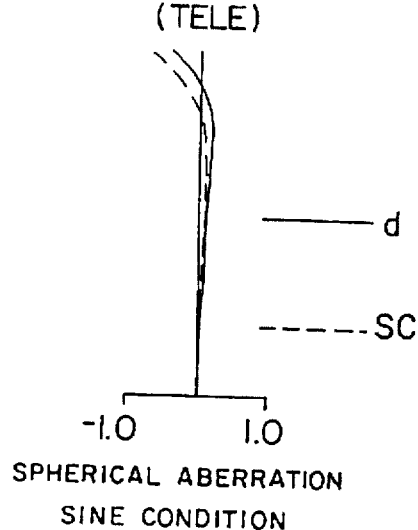
Figure 26H:
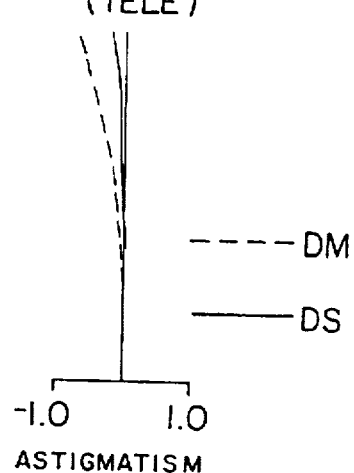
Figure 26I:
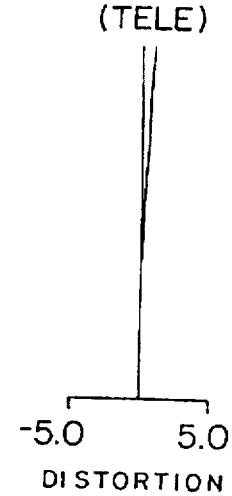
Figure 28:
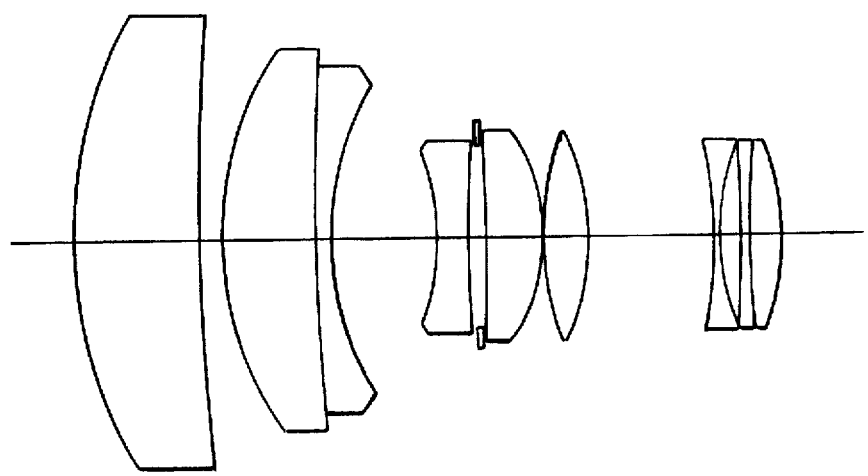
FIG. 28 is a cross-sectional view of a thirteenth embodiment of the lens system.
Figure 29A:
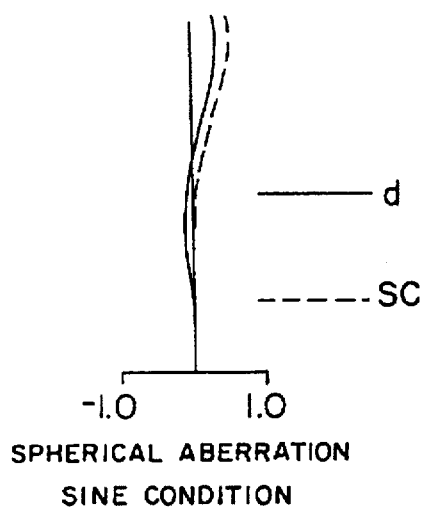
FIG. 29a to 29i show aberration curves of the thirteenth embodiment of the lens system.
Figure 29B:
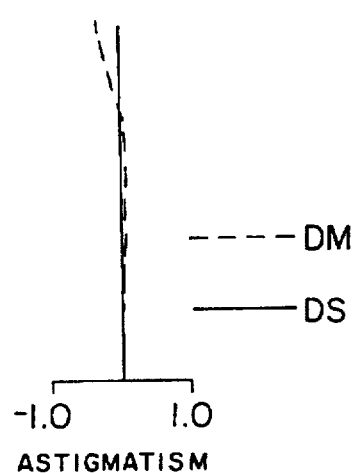
Figure 29C:
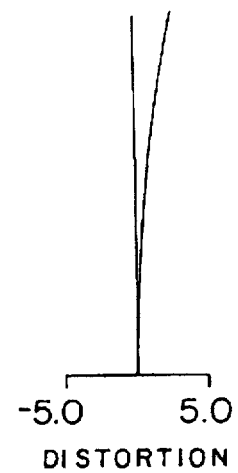
Figure 29D:
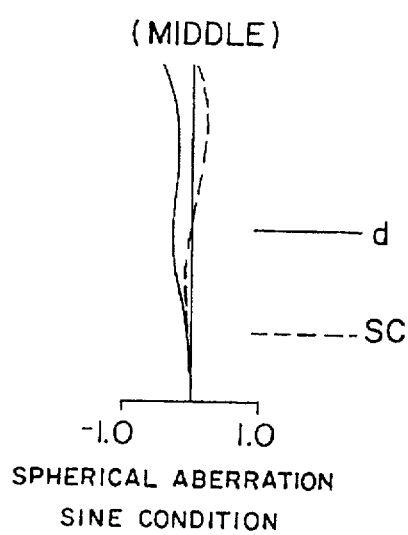
Figure 29E:
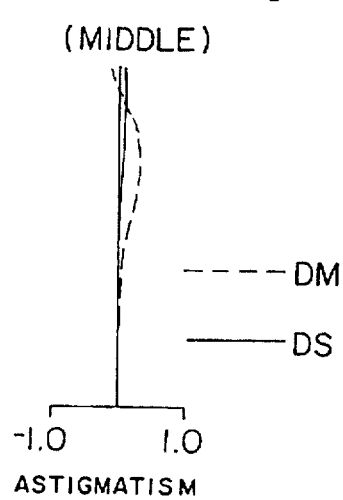
Figure 29F:
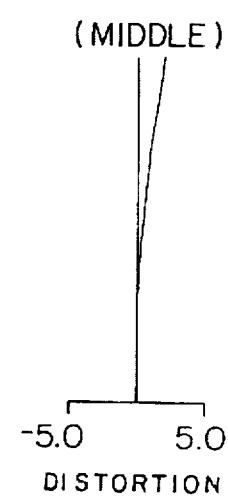
Figure 29G:
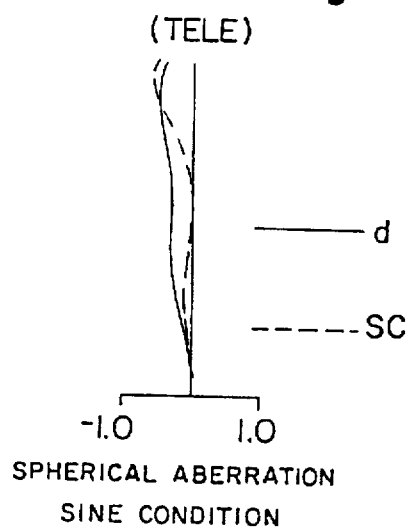
Figure 29H:
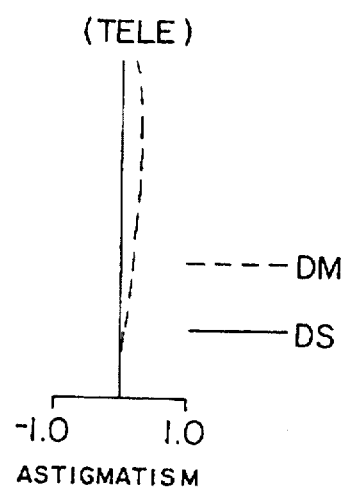
Figure 29I:
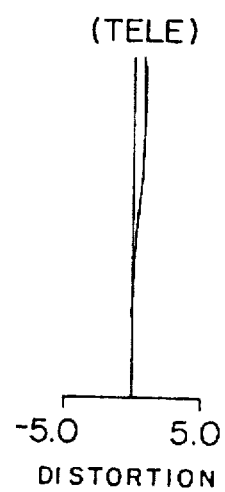
Figure 30:
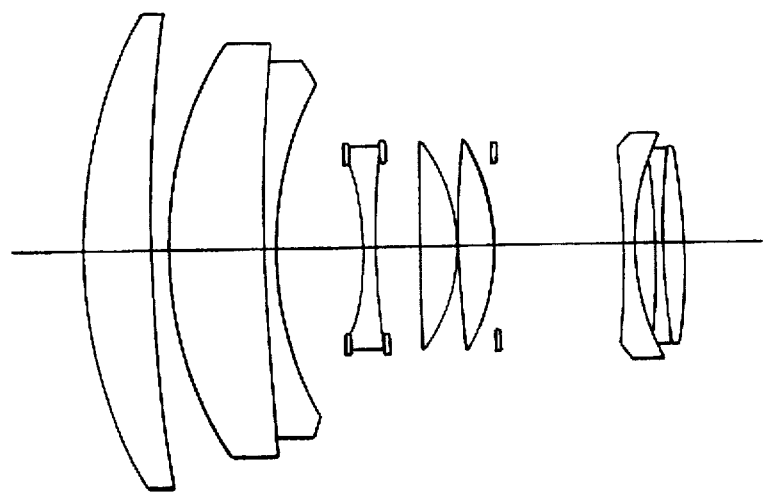
FIG. 30 is a cross-sectional view of a fourteenth embodiment of the lens system.
Figure 31A:
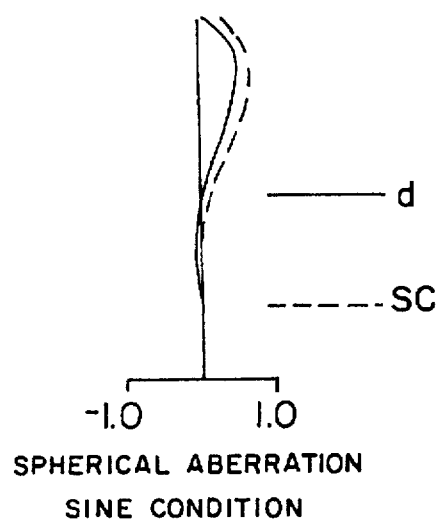
FIG. 31a to 31i show aberration curves of the fourteenth embodiment of the lens system.
Figure 31B:
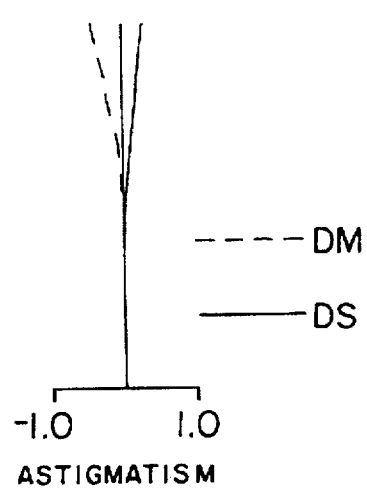
Figure 31C:
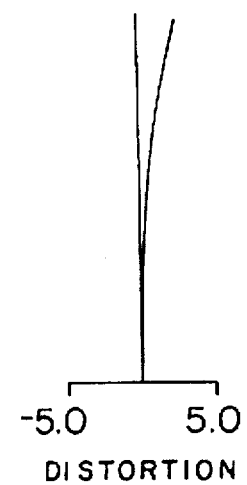
Figure 31D:
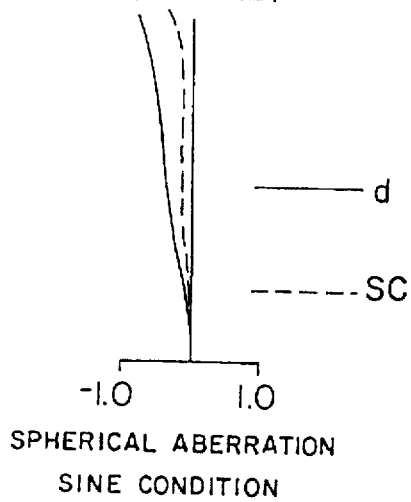
Figure 31E:
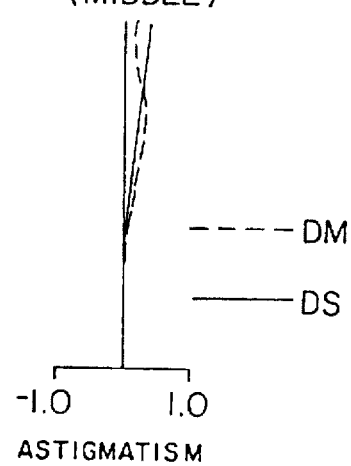
Figure 31F:
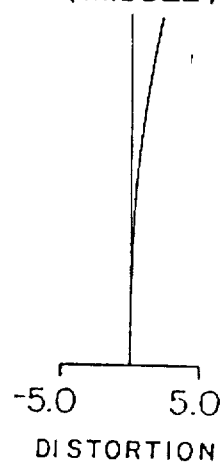
Figure 31G:
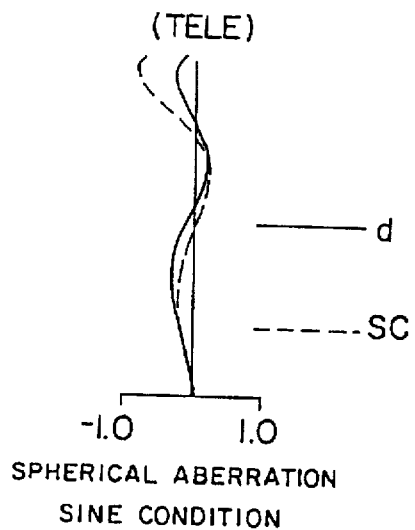
Figure 31H:
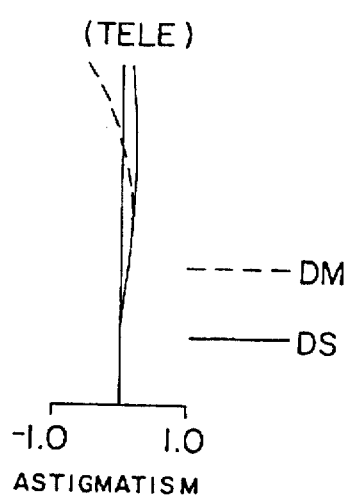
Figure 31I:
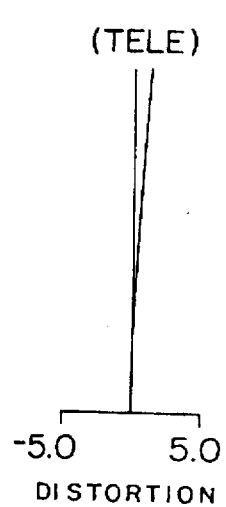
Figure 32:
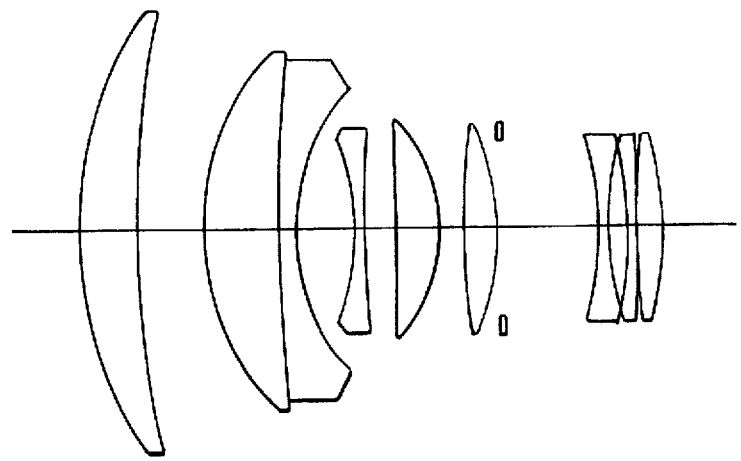
FIG. 32 is a cross-sectional view of a fifteenth embodiment of the lens system.
Figure 33A:
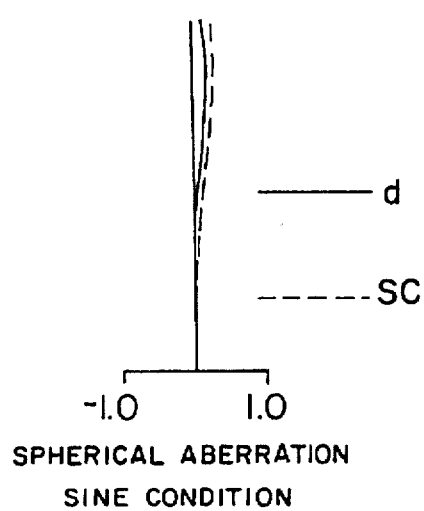
FIG. 33a to 33i show aberration curves of the fifteenth embodiment of the lens system.
Figure 33B:
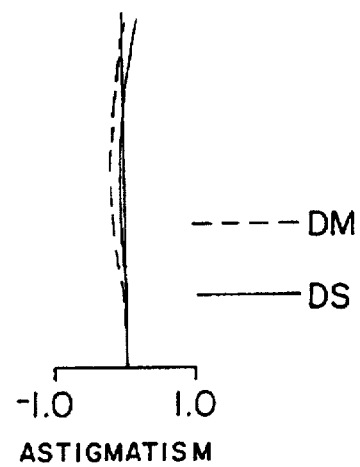
Figure 33C:
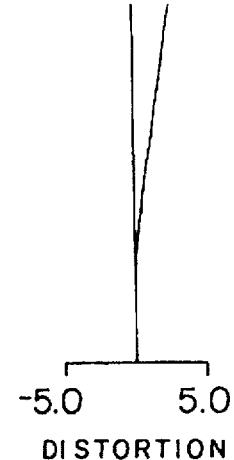
Figure 33D:
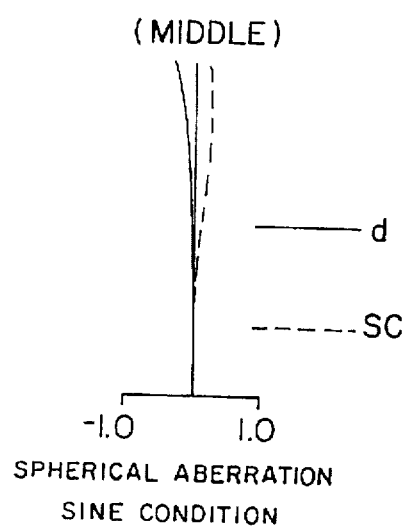
Figure 33E:
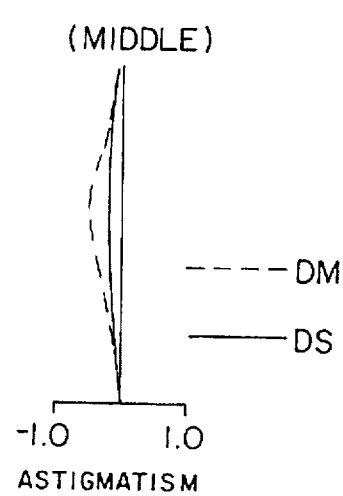
Figure 33F:
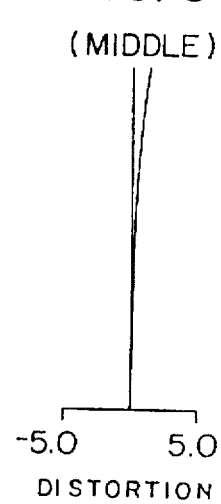
Figure 33G:
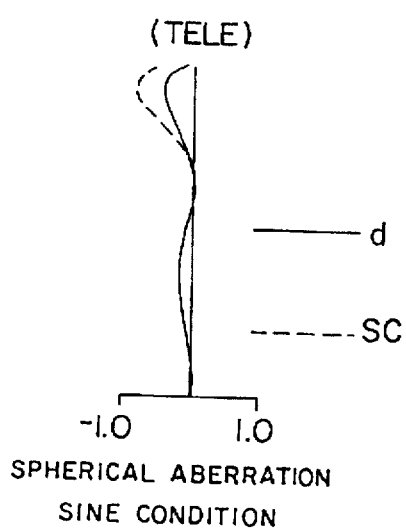
Figure 33H:
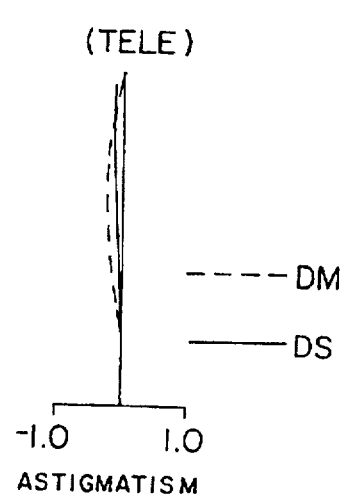
Figure 33I:
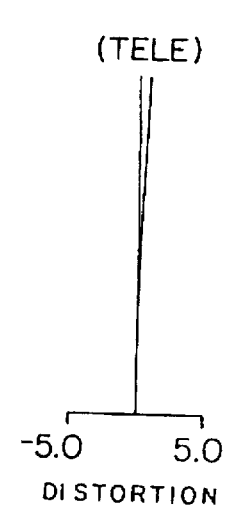
Figure 34:
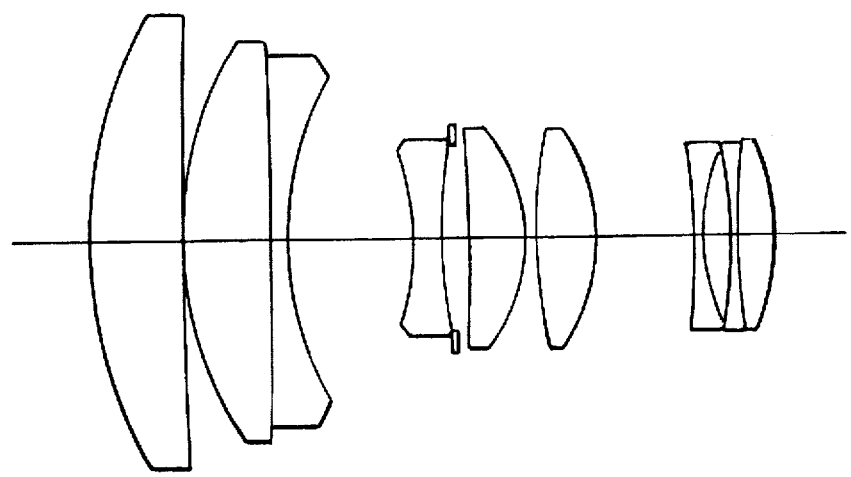
FIG. 34 is a cross-sectional view of a sixteenth embodiment of the lens system.
Figure 35A:
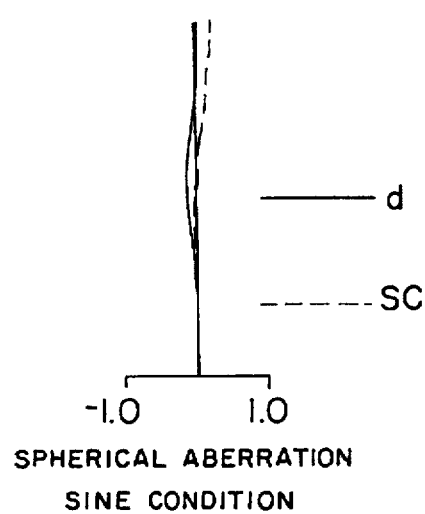
FIG. 35a to 35i show aberration curves of the sixteenth embodiment of the lens system.
Figure 35B:
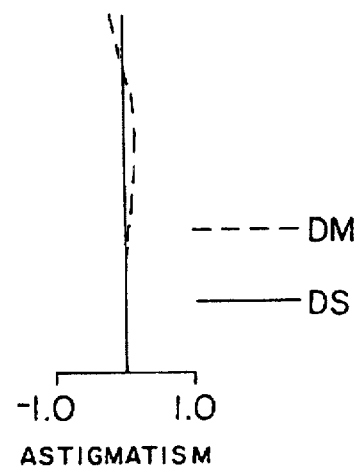
Figure 35C:
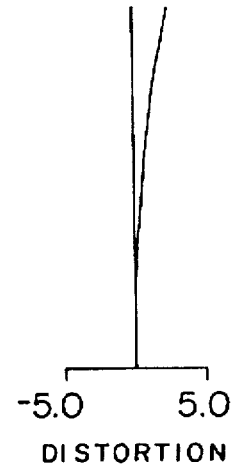
Figure 35D:
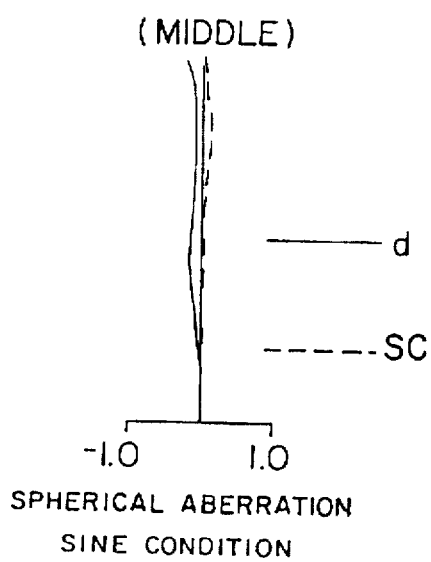
Figure 35E:
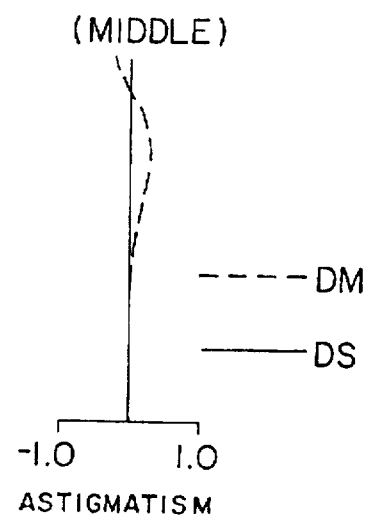
Figure 35F:
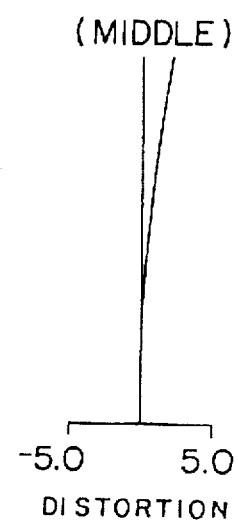
Figure 35G:
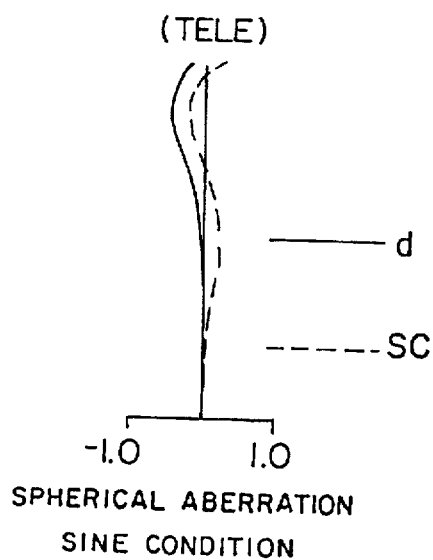
Figure 35H:
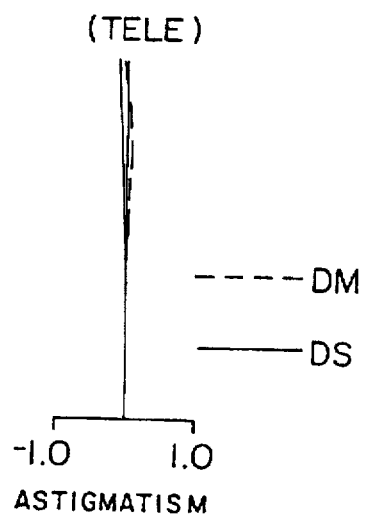
Figure 35I:
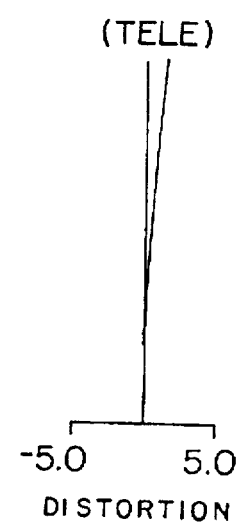
Figure 36:
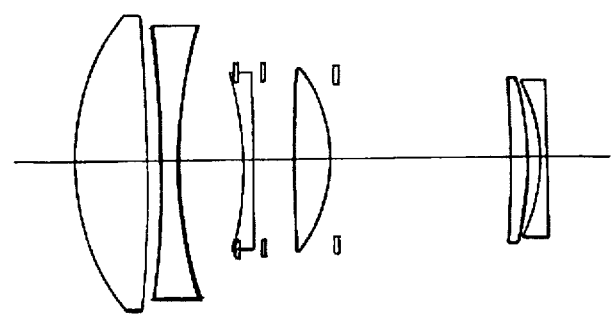
FIG. 36 is a cross-sectional view of a seventeenth embodiment of the lens system.
Figure 37A:
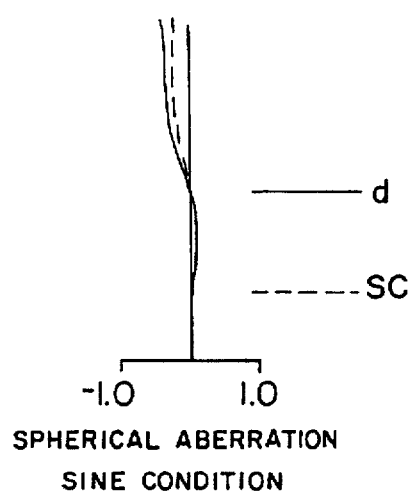
Figure 37B:
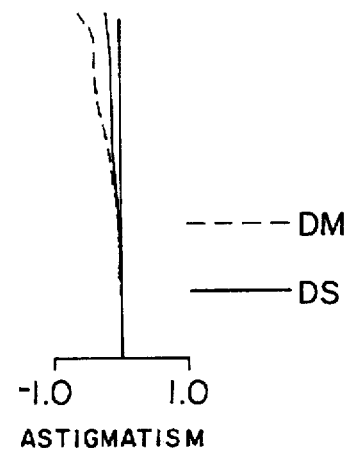
Figure 37C:
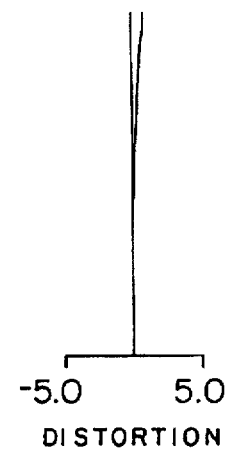
Figure 38:
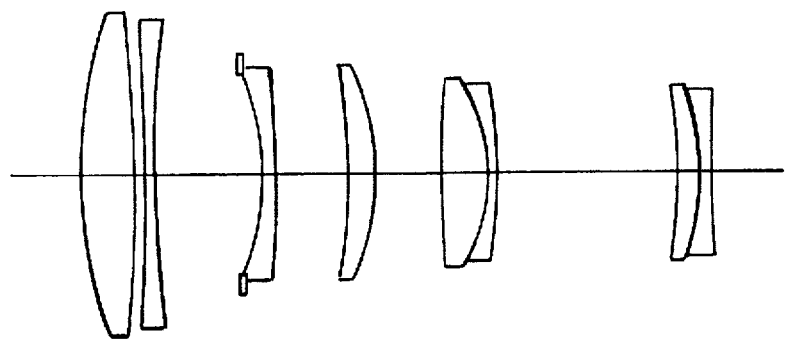
FIG. 38 is a cross-sectional view of a eighteenth embodiment of the lens system.
Figure 39A:
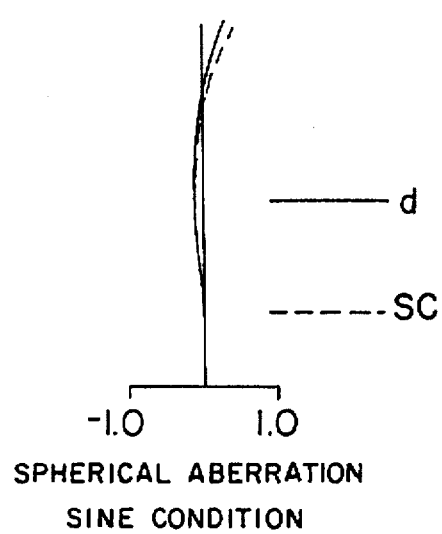
Figure 39B:
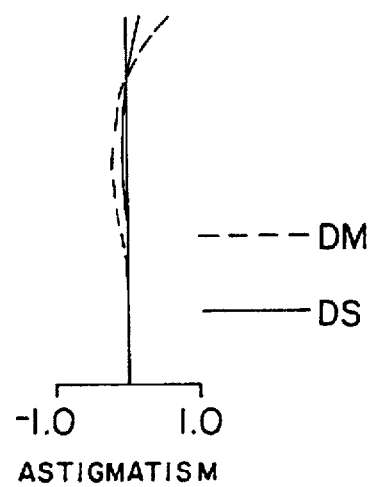
Figure 39C:
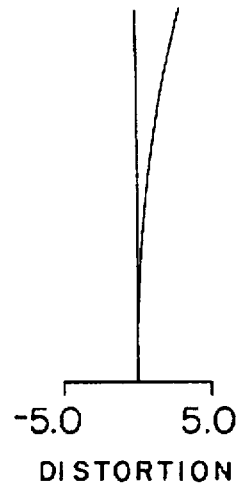
Figure 40:
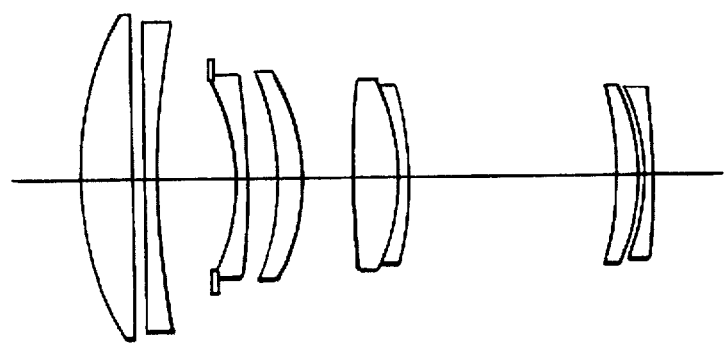
FIG. 40 is a cross-sectional view of a nineteenth embodiment of the lens system.
Figure 41A:
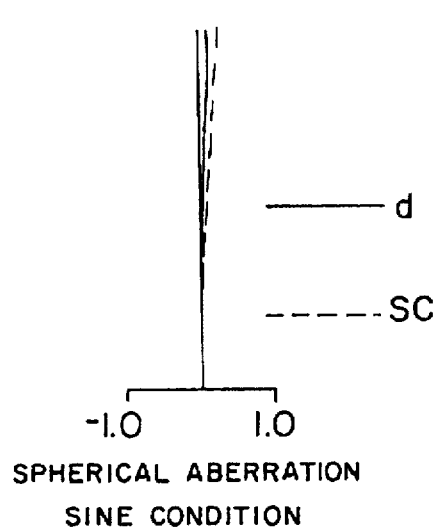
FIG. 41a to 41i show aberration curves of the nineteenth embodiment of the lens system.
Figure 41B:
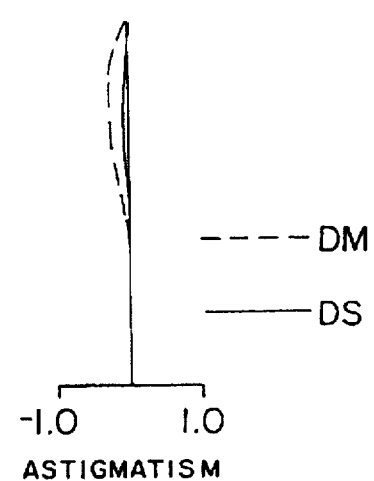
Figure 41C:
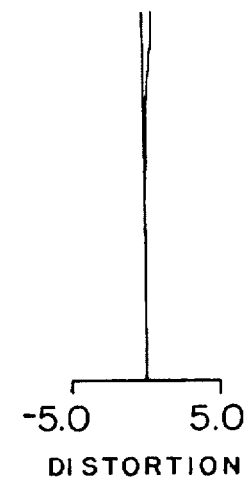
Figure 41D:
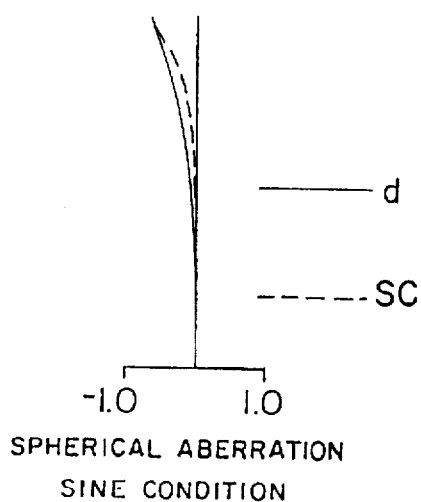
Figure 41E:
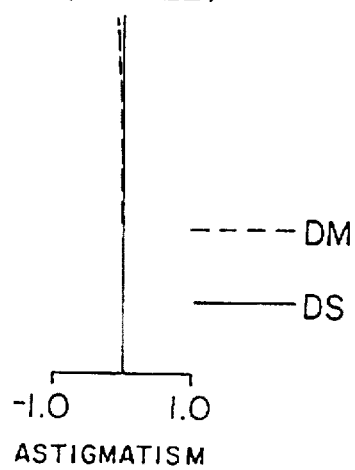
Figure 41F:
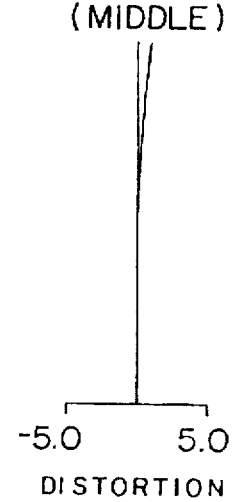
Figure 41G:
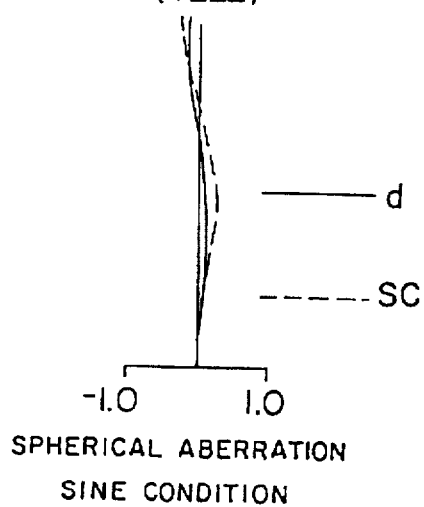
Figure 41H:
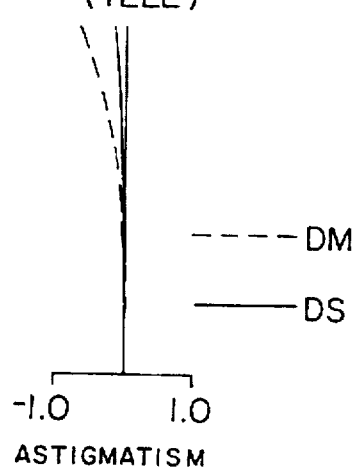
Figure 41I:
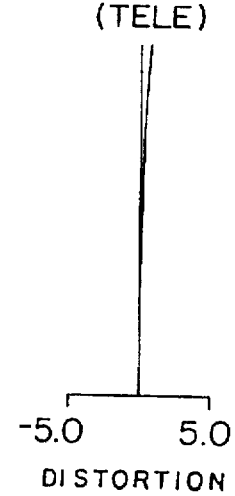
Figure 42G:
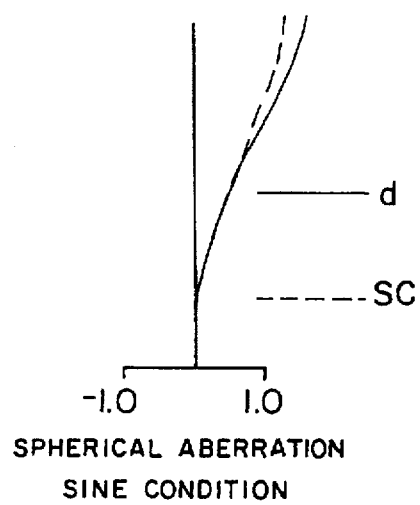
Figure 42H:
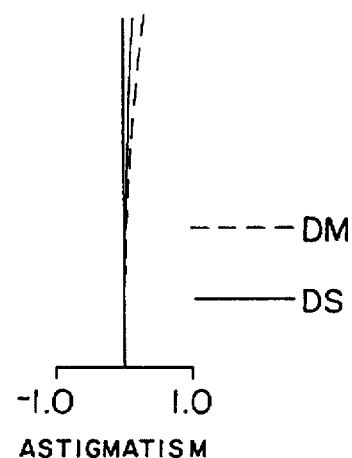
Figure 42I:
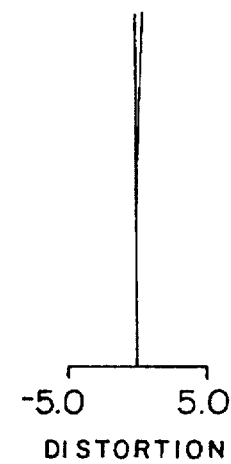
Figure 43:
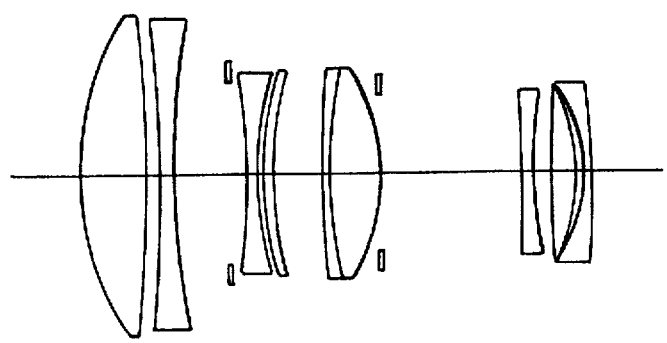
FIG. 43 is a cross-sectional view of a twentieth embodiment of the lens system.
Figure 44A:
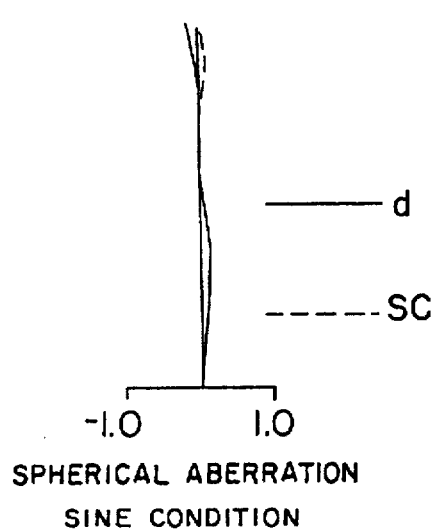
Figure 44B:
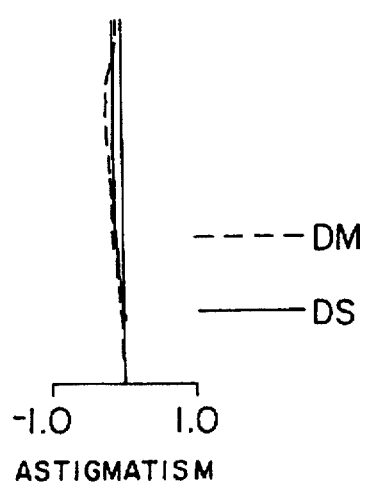
Figure 44C:
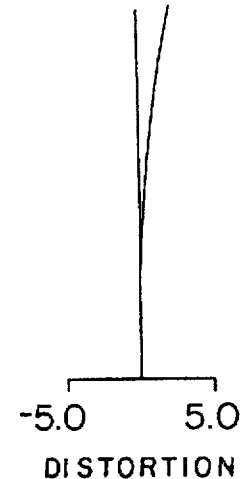
Figure 45A:
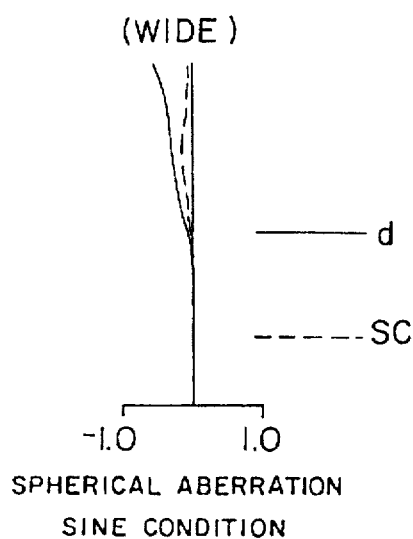
Figure 45B:
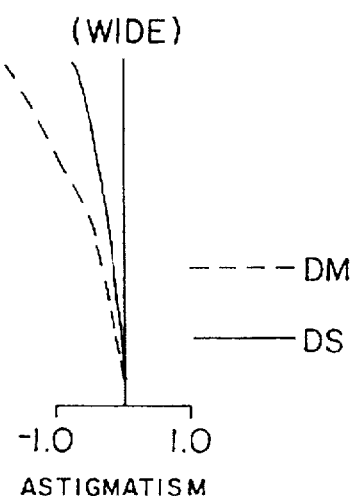
Figure 45C:
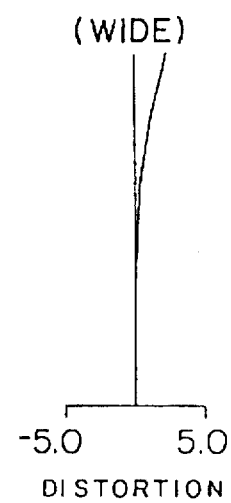
Figure 45D:
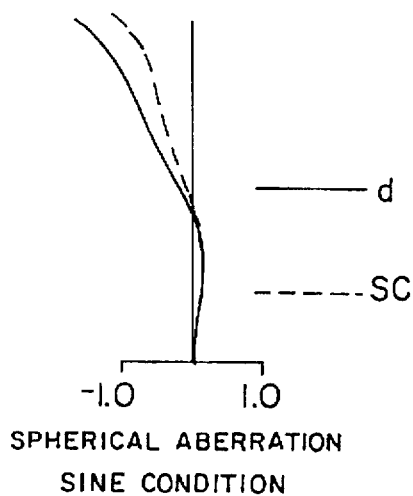
Figure 45E:
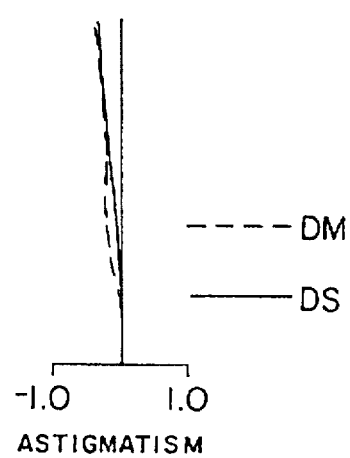
Figure 45F:
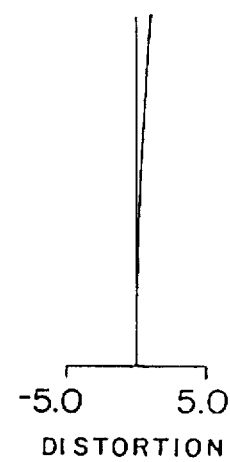
Figure 46:
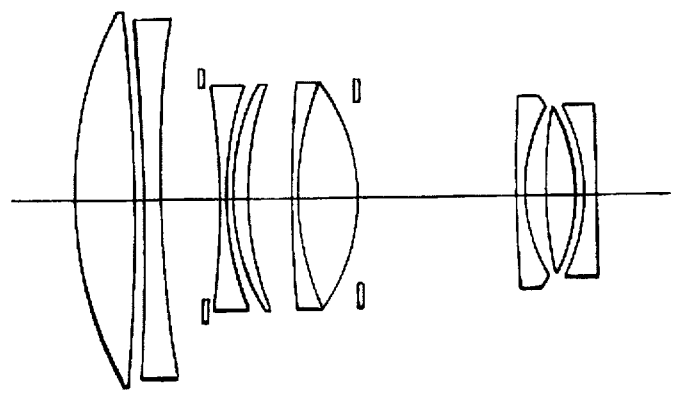
FIG. 46 is a cross-sectional view of a twenty-first embodiment of the lens system.
Figure 47A:
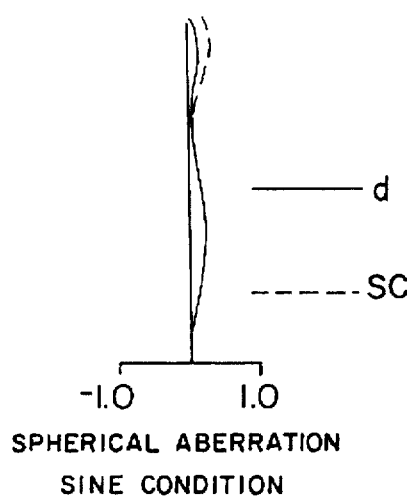
Figure 47B:
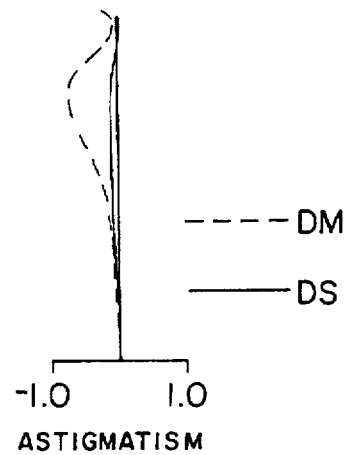
Figure 47C:
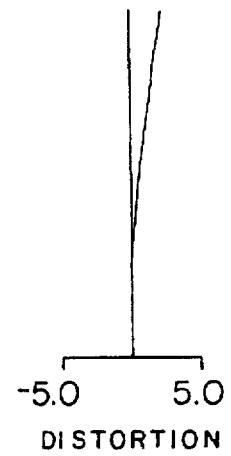
Figure 48:
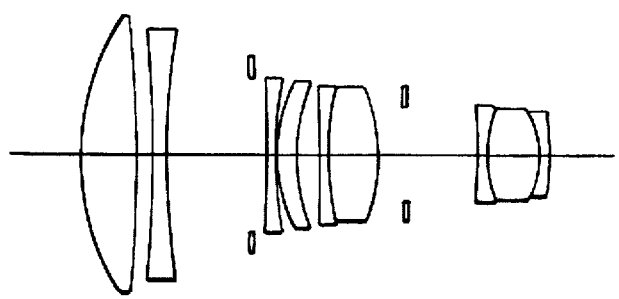
FIG. 48 is a cross-sectional view of a twenty-second embodiment of the lens system.
Figure 49A:
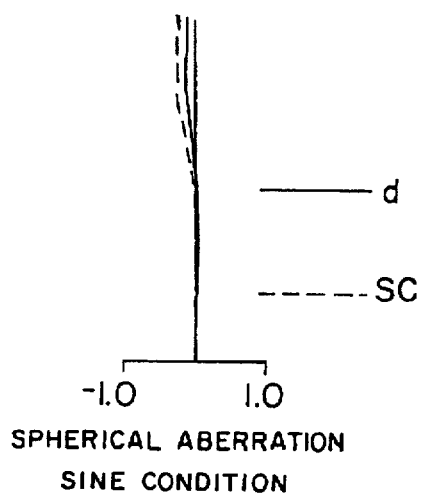
Figure 49B:
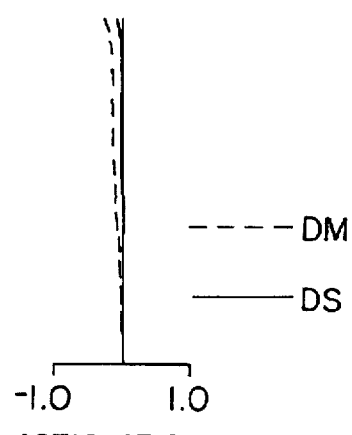
Figure 49C:
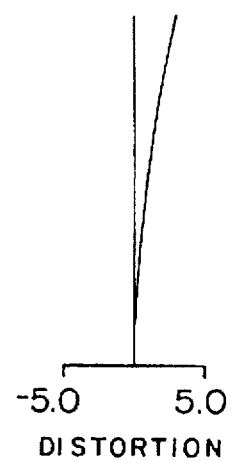

Specific numerical data for each embodiment is shown below. The specific construction of each embodiment is as shown in FIGS. 1 through 22 and Tables 2 through 23. In each table, ri (i=1, 2, 3, ...) represents the radius of curvature of the ith lens surface from the object side; di (i=1, 2, 3, ...) represents the ith axial distance from the object side; and Ni (i=1, 2, 3, ...) and vvi (i=1, 2, 3, ...) represent the refractive index (vd) and the Abbe number (vd) with regard to the d-line of the ith lens from the object side, respectively. Values of focal length f and f-number fNo of the zoom lens system in the shortest focal length condition, the middle focal length condition and the longest focal length condition are also shown in the tables.

In the embodiments, the surfaces marked with asterisks in the radius of curvature column are aspherical. The configuration of an aspherical surface is defined by the following equation.

$$X = \frac{C \cdot Y^2}{\sqrt{1 + (1 - \epsilon \cdot Y^2 \cdot C^2)}} + \Sigma_i A_i Y^i$$

wherein:

X : an amount of displacement from the reference surface along the optical axis, Y : a height in a direction perpendicular to the optical axis, C : a paraxial curvature, $\epsilon$: a conic constant, and Ai : an ith aspherical coefficient.

TABLE 2A

Lens Construction of First Embodiment
f = 102.0 ~ 140.0 ~ 195.0
fNo. = 4.6 ~ 5.8 ~ 5.8

| | Radius of Curvature | Axial Distance | Refractive Index (Nd) | Abbe Number |
|---|---|---|---|---|
| r1 | −169.365 | | | |
| | | d1  2.000 | N1  1.74000 | ν1  28.26 |
| r2 | −1306.472 | | | |
| | | d2  0.971 | | |
| r3 | 45.676 | | | |
| | | d3  5.000 | N2  1.48749 | ν2  70.44 |
| r4 | −1437.442 | | | |
| | | d4  14.039 ~ 24.553 ~ 33.196 | | |
| * r5 | 28.504 | | | |
| | | d5  5.000 | N3  1.71736 | ν3  29.42 |
| * r6 | 21.194 | | | |
| | | d6  4.934 | | |
| r7 | −113.038 | | | |
| | | d7  9.798 | N4  1.48749 | ν4  70.44 |
| r8 | −22.848 | | | |
| | | d8  1.000 ~ 1.000 ~ 1.000 | | |
| r9 | Stop | | | |
| | | d9  22.688 ~ 12.138 ~ 3.200 | | |
| * r10 | −32.993 | | | |
| | | d10  3.000 | N5  1.75520 | ν5  27.51 |
| * r11 | −24.878 | | | |
| | | d11  2.500 | | |
| r12 | −23.411 | | | |
| | | d12  1.000 | N6  1.72000 | ν6  50.31 |
| r13 | −131.625 | | | |

Σd = 71.930 ~ 71.894 ~ 71.599

TABLE 2B

Aspherical Coefficient of First Embodiment r5:
$\epsilon$ = 0.10000× 10
A4 = −0.26445× $10^{-4}$
A6 = −0.10097× $10^{-6}$
A8 = 0.35240× $10^{-9}$
A10 = −0.41137×$10^{-11}$
A12 = 0.12761×$10^{-13}$ r6:
$\epsilon$ = 0.10000× 10
A4 = −0.27677× $10^{-4}$
A6 = −0.12567× $10^{-6}$
A8 = 0.28046× $10^{-9}$
A10 = −0.48853×$10^{-11}$
A12 = 0.22406×$10^{-13}$
A14 = 0.80357×$10^{-19}$
A16 = 0.17989×$10^{-20}$ r10:
$\epsilon$ = 0.10000× 10
A3 = −0.81495× $10^{-4}$
A4 = 0.27205× $10^{-4}$
A5 = −0.28129× $10^{-5}$
A6 = 0.13213× $10^{-6}$
A7 = −0.62289×$10^{-10}$
A8 = −0.62048× $10^{-9}$
A9 = −0.16606×$10^{-11}$
A10 = −0.15232×$10^{-11}$
A11 = 0.77273×$10^{-14}$
A12 = 0.98806×$10^{-14}$
A13 = 0.14722×$10^{-18}$
A14 = 0.78203×$10^{-19}$
A15 = 0.61697×$10^{-20}$
A16 = 0.35458×$10^{-21}$

TABLE 2B-continued

Aspherical Coefficient of First Embodiment r11:
$\epsilon$ = 0.100× 10
A3 = −0.732× $10^{-4}$
A4 = 0.167× $10^{-4}$
A5 = −0.990× $10^{-6}$
A6 = −0.153× $10^{-7}$
A7 = 0.481× $10^{-9}$
A8 = −0.233× $10^{-9}$
A9 = −0.173×$10^{-10}$
A10 = 0.743×$10^{-12}$
A11 = 0.299×$10^{-13}$
A12 = −0.586×$10^{-16}$
A13 = −0.383×$10^{-18}$

TABLE 3A

Lens Construction of Second Embodiment
f = 102.0 ~ 140.0 ~ 195.0
fNo. = 4.6 ~ 5.8 ~ 5.8

| | Radius of Curvature | Axial Distance | Refractive Index (Nd) | Abbe Number |
|---|---|---|---|---|
| * r1 | −34.837 | | | |
| | | d1  2.000 | N1  1.74000 | ν1  28.26 |
| r2 | −43.462 | | | |
| | | d2  0.971 | | |
| r3 | 54.296 | | | |
| | | d3  5.000 | N2  1.48749 | ν2  70.44 |

TABLE 3A-continued

Lens Construction of Second Embodiment
f = 102.0 ~ 140.0 ~ 195.0
fNo. = 4.6 ~ 5.8 ~ 5.8

| | Radius of Curvature | Axial Distance | Refractive Index (Nd) | Abbe Number |
|---|---|---|---|---|
| r4 | −263.350 | | | |
| | | d4 13.910 ~ 26.089 ~ 35.789 | | |
| * r5 | 27.536 | | | |
| | | d5 5.000 | N3 1.71736 | ν3 29.42 |
| * r6 | 20.556 | | | |
| | | d6 4.934 | | |
| r7 | −494.824 | | | |
| | | d7 9.798 | N4 1.48749 | ν4 70.44 |
| r8 | −26.145 | | | |
| | | d8 1.000 ~ 1.000 ~ 1.000 | | |
| r9 | Stop | | | |
| | | d9 22.457 ~ 12.083 ~ 3.200 | | |
| * r10 | −26.328 | | | |
| | | d10 3.000 | N5 1.84666 | ν5 23.82 |
| * r11 | −25.666 | | | |
| | | d11 2.500 | | |
| r12 | −28.697 | | | |
| | | d12 1.000 | N6 1.61800 | ν6 63.39 |
| r13 | −220.191 | | | |

$\Sigma d$ = 71.570 ~ 73.375 ~ 74.192

TABLE 3B

Aspherical Coefficient of Second Embodiment r1:
$\epsilon$ = 0.10000× 10
A4 = 0.13697× $10^{-5}$
A6 = −0.83104×$10^{-10}$
A8 = 0.15066×$10^{-11}$ r5:
$\epsilon$ = 0.10000× 10
A4 = −0.27994× $10^{-4}$
A6 = −0.96492× $10^{-7}$
A8 = 0.43136× $10^{-9}$
A10 = −0.30280×$10^{-11}$
A12 = 0.70736×$10^{-14}$ r6:
$\epsilon$ = 0.10000× 10
A4 = −0.33938× $10^{-4}$
A6 = −0.12393× $10^{-6}$
A8 = 0.43751× $10^{-9}$
A10 = −0.36780×$10^{-11}$
A12 = 0.11085×$10^{-13}$
A14 = 0.80357×$10^{-19}$
A16 = 0.17989×$10^{-20}$ r10:
$\epsilon$ = 0.10000× 10
A3 = −0.86906× $10^{-4}$
A4 = 0.25404× $10^{-4}$
A5 = −0.28828× $10^{-5}$
A6 = 0.13116× $10^{-6}$
A7 = 0.11429× $10^{-8}$
A8 = −0.43197× $10^{-9}$
A9 = −0.16606×$10^{-11}$
A10 = 0.32991×$10^{-12}$
A11 = 0.77273×$10^{-14}$
A12 = 0.45988×$10^{-14}$
A13 = 0.14722×$10^{-18}$
A14 = 0.78203×$10^{-19}$
A15 = 0.61697×$10^{-20}$
A16 = 0.35458×$10^{-21}$ r11:
$\epsilon$ = 0.10000× 10
A3 = −0.65190× $10^{-4}$
A4 = 0.13693× $10^{-4}$
A5 = −0.10867× $10^{-5}$
A6 = −0.12995× $10^{-7}$
A7 = 0.77090× $10^{-9}$
A8 = 0.15613× $10^{-9}$
A9 = −0.82346×$10^{-11}$
A10 = −0.16902×$10^{-12}$
A11 = 0.29893×$10^{-13}$
A12 = 0.35220×$10^{-15}$
A13 = −0.38277×$10^{-18}$

TABLE 4A

Lens Construction of Third Embodiment
f = 102.0 ~ 140.0 ~ 195.0
fNo. =4.6 ~ 5.8 ~ 5.8

| | Radius of Curvature | Axial Distance | Refractive Index (Nd) | Abbe Number |
|---|---|---|---|---|
| | r1 −180.196 | | | |
| | | d1 2.000 | N1 1.74000 | ν1 28.26 |
| | r2 −2424.653 | | | |
| | | d2 0.971 | | |
| | r3 45.563 | | | |
| | | d3 5.000 | N2 1.48749 | ν2 70.44 |
| | r4 −1544.616 | | | |
| | | d4 14.038 ~ 24.559 ~ 33.206 | | |
| * | r5 28.165 | | | |
| | | d5 5.000 | N3 1.71736 | ν3 29.42 |
| * | r6 20.971 | | | |
| | | d6 4.934 | | |
| | r7 −111.559 | | | |
| | | d7 9.779 | N4 1.48749 | ν4 70.44 |
| | r8 −22.776 | | | |
| | | d8 1.000 ~ 1.000 ~ 1.000 | | |
| | r9 Stop | | | |
| | | d9 22.685 ~ 12.137 ~ 3.200 | | |
| * | r10 −32.151 | | | |
| | | d10 3.000 | N5 1.75520 | ν5 27.51 |
| * | r11 −24.537 | | | |
| | | d11 2.500 | | |
| | r12 −23.781 | | | |
| | | d12 1.000 | N6 1.72000 | ν6 50.31 |
| | r13 −139.601 | | | |

Σd = 71.907 ~ 71.88 ~ 71.59
Closest Focusing (D = 1.5 m)

d4 10.556 ~ 20.502 ~ 28.512
d8 4.482 ~ 5.057 ~ 5.694
d9 22.685 ~ 12.137 ~ 3.200

TABLE 4B

Aspherical Coefficient of Third Embodiment r5:
$\epsilon$ = 0.10000× 10
A4 = −0.26619× $10^{-4}$
A6 = −0.10232× $10^{-6}$
A8 = 0.33201× $10^{-9}$
A10 = −0.39994× $10^{-11}$
A12 = 0.12569× $10^{-13}$ r6:
$\epsilon$ = 0.10000× 10
A4 = −0.27935× $10^{-4}$
A6 = −0.13216× $10^{-6}$
A8 = 0.29134× $10^{-9}$
A10 = −0.49551× $10^{-11}$
A12 = 0.22885× $10^{-13}$
A14 = 0.80357× $10^{-19}$
A16 = 0.17989× $10^{-20}$ r10:
$\epsilon$ = 0.10000× 10
A3 = −0.80386× $10^{-4}$
A4 = 0.26488× $10^{-4}$
A5 = −0.28564× $10^{-5}$
A6 = 0.13032× $10^{-6}$
A7 = −0.15229× $10^{-9}$
A8 = −0.63617× $10^{-9}$
A9 = −0.16606× $10^{-11}$
A10 = −0.18394× $10^{-11}$
A11 = 0.77273× $10^{-14}$
A12 = 0.11590× $10^{-13}$
A13 = 0.14722× $10^{-18}$
A14 = 0.78203× $10^{-19}$
A15 = 0.61697× $10^{-20}$
A16 = 0.35458× $10^{-21}$

TABLE 4B-continued

Aspherical Coefficient of Third Embodiment r11:
$\epsilon$ = 0.10000× 10
A3 = −0.72161× $10^{-4}$
A4 = 0.16403× $10^{-4}$
A5 = −0.10134× $10^{-5}$
A6 = −0.16807× $10^{-7}$
A7 = 0.42257× $10^{-9}$
A8 = −0.32178× $10^{-9}$
A9 = −0.81465× $10^{-12}$
A10 = −0.45572× $10^{-12}$
A11 = 0.29893× $10^{-13}$
A12 = 0.22254× $10^{-14}$
A13 = −0.38277× $10^{-18}$

TABLE 5A

Lens Construction of Fourth Embodiment
f = 102.0 ~ 140.0 ~ 195.0
fNo. = 4.6 ~ 5.8 ~ 5.8

| | Radius of Curvature | Axial Distance | | Refractive Index (Nd) | | Abbe Number |
|---|---|---|---|---|---|---|
| r1 | −169.365 | | | | | |
| | | d1 | 2.000 | N1 1.74000 | ν1 | 28.26 |
| r2 | −1306.472 | | | | | |
| | | d2 | 0.971 | | | |
| r3 | 45.676 | | | | | |
| | | d3 | 5.000 | N2 1.48749 | ν2 | 70.44 |
| r4 | −1437.442 | | | | | |
| | | d4 | 13.039 ~ 23.553 ~ 32.196 | | | |
| r5 | Stop | | | | | |
| | | d5 | 1.000 | | | |
| * r6 | 28.504 | | | | | |
| | | d6 | 5.000 | N3 1.71736 | ν3 | 29.42 |
| * r7 | 21.194 | | | | | |
| | | d7 | 4.934 | | | |
| r8 | −113.038 | | | | | |
| | | d8 | 9.798 | N4 1.48749 | ν4 | 70.44 |
| r9 | −22.848 | | | | | |
| | | d9 | 23.688 ~ 13.138 ~ 4.200 | | | |
| * r10 | −32.993 | | | | | |
| | | d10 | 3.000 | N5 1.75520 | ν5 | 27.51 |
| * r11 | −24.878 | | | | | |
| | | d11 | 2.500 | | | |
| r12 | −23.411 | | | | | |
| | | d12 | 1.000 | N6 1.72000 | ν6 | 50.31 |
| r13 | −131.625 | | | | | |

Σd = 71.930 ~ 71.894 ~ 71.599

TABLE 5B

Aspherical Coefficient of Fourth Embodiment r6:
$\epsilon$ = 0.10000× 10
A4 = −0.26445× $10^{-4}$
A6 = −0.10097× $10^{-6}$
A8 = 0.35240× $10^{-9}$
A10 = −0.41137×$10^{-11}$
A12 = 0.12761×$10^{-13}$ r7:
$\epsilon$ = 0.10000× 10
A4 = −0.27677× $10^{-4}$
A6 = −0.12567× $10^{-6}$
A8 = 0.28046× $10^{-9}$
A10 = −0.48853×$10^{-11}$
A12 = 0.22406×$10^{-13}$
A14 = 0.80357×$10^{-19}$
A16 = 0.17989×$10^{-20}$ r10:
$\epsilon$ = 0.10000× 10
A3 = −0.81495× $10^{-4}$
A4 = 0.27205× $10^{-4}$
A5 = −0.28129× $10^{-5}$
A6 = 0.13213× $10^{-6}$
A7 = −0.62289×$10^{-10}$
A8 = −0.62048× $10^{-9}$
A9 = −0.16606×$10^{-11}$
A10 = −0.15232×$10^{-11}$
A11 = 0.77273×$10^{-14}$
A12 = 0.98806×$10^{-14}$
A13 = 0.14722×$10^{-18}$
A14 = 0.78203×$10^{-19}$
A15 = 0.61697×$10^{-20}$
A16 = 0.35458×$10^{-21}$

TABLE 5B-continued

Aspherical Coefficient of Fourth Embodiment r11:
$\epsilon$ = 0.10000× 10
A3 = −0.73220× $10^{-4}$
A4 = 0.16653× $10^{-4}$
A5 = −0.98986× $10^{-6}$
A6 = −0.15299× $10^{-7}$
A7 = 0.48059× $10^{-9}$
A8 = −0.23320× $10^{-9}$
A9 = −0.17321×$10^{-10}$
A10 = 0.74297×$10^{-12}$
A11 = 0.29893×$10^{-13}$
A12 = −0.58614×$10^{-16}$
A13 = −0.38277×$10^{-18}$

TABLE 6A

Lens Construction of Fifth Embodiment
f = 102.0 ~ 140.0 ~ 195.0
fNo. = 4.6 ~ 5.8 ~ 5.8

| | Radius of Curvature | Axial Distance | | Refractive Index (Nd) | | Abbe Number |
|---|---|---|---|---|---|---|
| r1 | −399.243 | | | | | |
| | | d1 | 2.000 | N1 1.74000 | ν1 | 28.26 |
| r2 | 380.981 | | | | | |
| | | d2 | 0.830 | | | |
| r3 | 44.781 | | | | | |
| | | d3 | 5.000 | N2 1.48749 | ν2 | 70.44 |
| r4 | −3060.443 | | | | | |

TABLE 6A-continued

Lens Construction of Fifth Embodiment
f = 102.0 ~ 140.0 ~ 195.0
fNo. = 4.6 ~ 5.8 ~ 5.8

| | Radius of Curvature | Axial Distance | | Refractive Index (Nd) | | Abbe Number |
|---|---|---|---|---|---|---|
| | | d4 13.990 ~ 24.891 ~ 33.709 | | | | |
| * r5 | 29.970 | | | | | |
| | | d5 | 5.000 | N3 1.71736 | v3 | 29.42 |
| * r6 | 20.178 | | | | | |
| | | d6 | 4.934 | | | |
| r7 | −122.681 | | | | | |
| | | d7 | 10.345 | N4 1.48749 | v4 | 70.44 |
| r8 | −22.846 | | | | | |
| | | d8 | 1.000 ~ 1.000 ~ 1.000 | | | |
| r9 | Stop | | | | | |
| | | d9 22.508 ~ 12.074 ~ 3.200 | | | | |
| r10 | −32.592 | | | | | |
| | | d10 | 3.000 | N5 1.75520 | v5 | 27.51 |
| r11 | −24.059 | | | | | |
| | | d11 | 1.571 | | | |
| r12 | −25.050 | | | | | |
| | | d12 | 1.000 | N6 1.72000 | v6 | 50.31 |
| r13 | −249.468 | | | | | |

$\Sigma d$ = 71.178 ~ 71.645 ~ 71.589

TABLE 6B

Aspherical Coefficient of Fifth Embodiment

| r5: | r6: |
|---|---|
| $\epsilon$ = 0.10000× 10 | $\epsilon$ = 0.10000× 10 |
| A4 = −0.26718× $10^{-4}$ | A4 = −0.28960× $10^{-4}$ |
| A6 = −0.10520× $10^{-6}$ | A6 = −0.17707× $10^{-6}$ |
| A8 = −0.36923×$10^{-11}$ | A8 = 0.47075× $10^{-9}$ |
| A10 = −0.23644×$10^{-12}$ | A10 = −0.30757×$10^{-11}$ |

TABLE 6B-continued

Aspherical Coefficient of Fifth Embodiment

| A12 = 0.16385×$10^{-14}$ | A12 = 0.12678×$10^{-13}$ |
|---|---|
| | A14 = 0.80357×$10^{-19}$ |
| | A16 = 0.17989×$10^{-20}$ |

TABLE 7A

Lens Construction of Sixth Embodiment
f = 82.0 ~ 120.0 ~ 158.0
fNo. = 4.6 ~ 5.2 ~ 5.7

| | Radius of Curvature | Axial Distance | | Refractive Index (Nd) | | Abbe Number |
|---|---|---|---|---|---|---|
| r1 | 24.096 | | | | | |
| | | d1 | 5.520 | N1 1.71300 | v1 | 53.93 |
| r2 | −163.557 | | | | | |
| | | d2 | 0.980 | | | |
| r3 | −145.873 | | | | | |
| | | d3 | 1.920 | N2 1.80741 | v2 | 31.59 |
| r4 | 47.389 | | | | | |
| | | d4 | 8.695 ~ 15.630 ~ 19.294 | | | |
| r5 | Stop | | | | | |
| | | d5 | 0.800 | | | |
| * r6 | −58.697 | | | | | |
| | | d6 | 1.000 | N3 1.85000 | v3 | 40.04 |
| r7 | 190.384 | | | | | |
| | | d7 | 5.320 | | | |
| r8 | 1027.485 | | | | | |
| | | d8 | 3.020 | N4 1.51680 | v4 | 64.20 |
| r9 | −16.363 | | | | | |
| | | d9 12.665 ~ 5.328 ~ 1.000 | | | | |
| * r10 | −52.240 | | | | | |
| | | d10 | 1.840 | N5 1.79850 | v5 | 22.60 |
| r11 | −18.355 | | | | | |
| | | d11 | 0.450 | | | |

TABLE 7A-continued

Lens Construction of Sixth Embodiment
$f = 82.0 \sim 120.0 \sim 158.0$
$fNo. = 4.6 \sim 5.2 \sim 5.7$

| | Radius of Curvature | Axial Distance | Refractive Index (Nd) | Abbe Number |
|---|---|---|---|---|
| r12 | −14.891 | d12  0.750 | N6  1.80500 | v6  40.97 |
| * r13 | 160.189 | | | |

$\Sigma d = 42.960 \sim 42.558 \sim 41.894$

TABLE 7B

Aspherical Coefficient of Sixth Embodiment r6:
$\epsilon = 0.10000 \times 10$
$A4 = -0.44116 \times 10^{-4}$
$A6 = 0.23475 \times 10^{-6}$
$A8 = -0.10883 \times 10^{-7}$
$A10 = 0.15315 \times 10^{-9}$
$A12 = -0.85233 \times 10^{-12}$
$A14 = 0.78185 \times 10^{-17}$
$A16 = 0.11566 \times 10^{-18}$ r13:
$\epsilon = 0.10000 \times 10$
$A4 = -0.44116 \times 10^{-4}$
$A6 = 0.23475 \times 10^{-6}$
$A8 = -0.10883 \times 10^{-7}$
$A10 = 0.15315 \times 10^{-9}$
$A12 = -0.85233 \times 10^{-11}$
$A14 = 0.78185 \times 10^{-15}$
$A16 = 0.11566 \times 10^{-17}$ r10:
$\epsilon = 0.10000 \times 10$
$A4 = -0.32730 \times 10^{-4}$
$A6 = 0.28940 \times 10^{-6}$
$A8 = 0.45843 \times 10^{-8}$
$A10 = -0.71081 \times 10^{-10}$
$A12 = 0.86070 \times 10^{-12}$
$A14 = 0.12445 \times 10^{-15}$
$A16 = 0.22007 \times 10^{-17}$

TABLE 8B

Aspherical Coefficient of Seventh Embodiment r6:
$\epsilon = 0.10000 \times 10$
$A4 = -0.43351 \times 10^{-4}$
$A6 = 0.23167 \times 10^{-6}$
$A8 = -0.10817 \times 10^{-7}$
$A10 = 0.15377 \times 10^{-9}$
$A12 = -0.84872 \times 10^{-12}$
$A14 = 0.78185 \times 10^{-17}$
$A16 = 0.11566 \times 10^{-18}$ r10:
$\epsilon = 0.10000 \times 10$
$A4 = -0.33110 \times 10^{-4}$
$A6 = 0.29430 \times 10^{-6}$
$A8 = 0.46163 \times 10^{-8}$
$A10 = -0.70917 \times 10^{-10}$
$A12 = 0.86252 \times 10^{-12}$
$A14 = 0.12445 \times 10^{-15}$
$A16 = 0.22007 \times 10^{-17}$ r7:
$\epsilon = 0.10000 \times 10$
$A4 = -0.36494 \times 10^{-6}$
$A6 = 0.10444 \times 10^{-7}$
$A8 = 0.46241 \times 10^{-11}$
$A10 = -0.10907 \times 10^{-12}$
$A12 = -0.25801 \times 10^{-15}$ r13:
$\epsilon = 0.10000 \times 10$
$A4 = -0.60404 \times 10^{-4}$
$A6 = 0.78833 \times 10^{-6}$
$A8 = -0.15752 \times 10^{-7}$
$A10 = 0.26799 \times 10^{-9}$
$A12 = -0.15938 \times 10^{-11}$
$A14 = -0.12835 \times 10^{-15}$
$A16 = -0.23419 \times 10^{-17}$

TABLE 8A

Lens Construction of Seventh Embodiment
$f = 82.0 \sim 120.0 \sim 158.0$
$fNo. = 4.6 \sim 5.2 \sim 5.7$

| | Radius of Curvature | Axial Distance | Refractive Index (Nd) | Abbe Number |
|---|---|---|---|---|
| r1 | 24.101 | d1  5.520 | N1  1.71300 | v1  53.93 |
| r2 | −164.342 | d2  0.980 | | |
| r3 | −146.567 | d3  1.920 | N2  1.80741 | v2  31.59 |
| r4 | 47.397 | d4  8.254 ~ 15.381 ~ 19.231 | | |
| r5 | Stop | d5  0.800 | | |
| * r6 | −58.620 | d6  1.000 | N3  1.85000 | v3  40.04 |
| * r7 | 170.198 | d7  5.320 | | |
| r8 | 1741.917 | d8  3.020 | N4  1.51680 | v4  64.20 |
| r9 | −16.363 | d9  13.283 ~ 5.579 ~ 1.000 | | |
| * r10 | −52.846 | d10  1.840 | N5  1.79850 | v5  22.60 |
| r11 | −18.357 | d11  0.450 | | |
| r12 | −14.861 | d12  0.750 | N6  1.80500 | v6  40.97 |
| * r13 | 193.602 | | | |

$\Sigma d = 43.137 \sim 42.56 \sim 41.831$

TABLE 9A

Lens Construction of Eighth Embodiment
f = 82.0 ~ 120.0 ~ 158.0
fNo. = 4.6 ~ 5.2 ~ 5.7

| | Radius of Curvature | Axial Distance | | Refractive Index (Nd) | | Abbe Number | |
|---|---|---|---|---|---|---|---|
| | r1    24.753 | | | | | | |
| | | d1 | 7.000 | N1 | 1.69100 | ν1 | 54.75 |
| | r2   −170.668 | | | | | | |
| | | d2 | 1.180 | | | | |
| | r3   −151.154 | | | | | | |
| | | d3 | 1.980 | N2 | 1.80741 | ν2 | 31.59 |
| | r4    45.704 | | | | | | |
| | | d4 | 5.025 ~ 13.271 ~ 18.355 | | | | |
| | r5   Flare Cutter | | | | | | |
| | | d5 | 0.860 | | | | |
| * | r6   −36.300 | | | | | | |
| | | d6 | 1.000 | N3 | 1.78831 | ν3 | 47.32 |
| | r7   1509.958 | | | | | | |
| | | d7 | 0.820 | | | | |
| | r8    Stop | | | | | | |
| | | d8 | 3.230 | | | | |
| | r9   265.691 | | | | | | |
| | | d9 | 3.350 | N4 | 1.48749 | ν4 | 70.44 |
| | r10  −16.318 | | | | | | |
| | | d10 | 0.500 | | | | |
| | r11   Flare Cutter | | | | | | |
| | | d11 | 17.495 ~ 5.328 ~ 1.000 | | | | |
| * | r12  −82.136 | | | | | | |
| | | d12 | 1.790 | N5 | 1.79850 | ν5 | 22.60 |
| | r13  −24.995 | | | | | | |
| | | d13 | 0.940 | | | | |
| | r14  −17.066 | | | | | | |
| | | d14 | 0.800 | N6 | 1.80500 | ν6 | 40.97 |
| * | r15  −742.341 | | | | | | |

$\Sigma d = 45.970 \sim 43.96 \sim 42.805$

TABLE 9B

Aspherical Coefficient of Eighth Embodiment r6:
$\epsilon = 0.10000 \times 10$
$A4 = -0.39419 \times 10^{-4}$
$A6 = 0.81732 \times 10^{-7}$
$A8 = -0.50904 \times 10^{-8}$
$A10 = 0.63079 \times 10^{-10}$
$A12 = -0.32886 \times 10^{-12}$ r15:
$\epsilon = 0.10000 \times 10$
$A4 = -0.33714 \times 10^{-4}$
$A6 = 0.35844 \times 10^{-6}$
$A8 = -0.80989 \times 10^{-8}$
$A10 = 0.13636 \times 10^{-9}$
$A12 = -0.78402 \times 10^{-12}$

TABLE 9B-continued

Aspherical Coefficient of Eighth Embodiment r12:
$\epsilon = 0.10000 \times 10$
$A4 = 0.10528 \times 10^{-4}$
$A6 = 0.96880 \times 10^{-7}$
$A8 = 0.20231 \times 10^{-8}$
$A10 = -0.26508 \times 10^{-10}$
$A12 = 0.26108 \times 10^{-12}$

TABLE 10A

Lens Construction of Ninth Embodiment
f = 82.0 ~ 120.0 ~ 158.0
fNo. = 4.6 ~ 5.2 ~ 5.7

| | Radius of Curvature | Axial Distance | | Refractive Index (Nd) | | Abbe Number | |
|---|---|---|---|---|---|---|---|
| | r1    32.591 | | | | | | |
| | | d1 | 5.877 | N1 | 1.69100 | ν1 | 54.75 |
| | r2   −161.851 | | | | | | |
| | | d2 | 2.548 | | | | |
| | r3   −116.617 | | | | | | |
| | | d3 | 1.000 | N2 | 1.80741 | ν2 | 31.59 |
| | r4    77.552 | | | | | | |
| | | d4 | 15.396 ~ 31.343 ~ 37.054 | | | | |
| * | r5   −25.895 | | | | | | |

TABLE 10A-continued

Lens Construction of Ninth Embodiment
f = 82.0 ~ 120.0 ~ 158.0
fNo. = 4.6 ~ 5.2 ~ 5.7

|   | Radius of Curvature |     | Axial Distance     |     | Refractive Index (Nd) |     | Abbe Number |
|---|---------------------|-----|--------------------|-----|-----------------------|-----|-------------|
|   |                     | d5  | 1.000              | N3  | 1.83400               | ν3  | 37.05       |
| * | r6  −98.414         |     |                    |     |                       |     |             |
|   |                     | d6  | 0.568              |     |                       |     |             |
|   | r7  Stop            |     |                    |     |                       |     |             |
|   |                     | d7  | 3.000              |     |                       |     |             |
|   | r8  −441.560        |     |                    |     |                       |     |             |
|   |                     | d8  | 3.192              | N4  | 1.56873               | ν4  | 63.10       |
|   | r9  −14.775         |     |                    |     |                       |     |             |
|   |                     | d9  | 15.129 ~ 6.361 ~ 1.000 |     |                   |     |             |
| * | r10  −1940.843      |     |                    |     |                       |     |             |
|   |                     | d10 | 2.212              | N5  | 1.75450               | ν5  | 32.17       |
|   | r11  −20.511        |     |                    |     |                       |     |             |
|   |                     | d11 | 0.565              |     |                       |     |             |
|   | r12  −15.522        |     |                    |     |                       |     |             |
|   |                     | d12 | 0.700              | N6  | 1.80500               | ν6  | 51.57       |
| * | r13  71.145         |     |                    |     |                       |     |             |

Σd = 51.187 ~ 58.366 ~ 58.716
Closest Focusing (D = 1.0 m)

d4  12.392 ~ 26.837 ~ 31.669
d9  18.133 ~ 10.867 ~ 6.385

TABLE 10B

Aspherical Coefficient of Ninth Embodiment

| r5: | r10: |
|---|---|
| $\epsilon = 0.10000 \times 10$ | $\epsilon = 0.10000 \times 10$ |
| $A4 = -0.50264 \times 10^{-4}$ | $A4 = -0.72467 \times 10^{-5}$ |
| $A6 = -0.88171 \times 10^{-8}$ | $A6 = 0.66828 \times 10^{-6}$ |
| $A8 = -0.11756 \times 10^{-7}$ | $A8 = -0.13765 \times 10^{-7}$ |
| $A10 = 0.27112 \times 10^{-9}$ | $A10 = 0.35385 \times 10^{-9}$ |
| $A12 = -0.25465 \times 10^{-11}$ | $A12 = -0.21767 \times 10^{-11}$ |

TABLE 10B-continued

Aspherical Coefficient of Ninth Embodiment

| r6: | r13: |
|---|---|
| $\epsilon = 0.10000 \times 10$ | $\epsilon = 0.10000 \times 10$ |
| $A4 = -0.37396 \times 10^{-6}$ | $A4 = -0.37474 \times 10^{-4}$ |
| $A6 = 0.64781 \times 10^{-8}$ | $A6 = 0.52227 \times 10^{-6}$ |
| $A8 = -0.44828 \times 10^{-11}$ | $A8 = -0.12204 \times 10^{-7}$ |
| $A10 = -0.30118 \times 10^{-12}$ | $A10 = 0.31183 \times 10^{-9}$ |
| $A12 = -0.28385 \times 10^{-14}$ | $A12 = -0.22332 \times 10^{-11}$ |

TABLE 11A

Lens Construction of Tenth Embodiment
f = 82.0 ~ 120.0 ~ 158.0
fNo. = 4.6 ~ 5.2 ~ 5.7

|   | Radius of Curvature |     | Axial Distance        |     | Refractive Index (Nd) |     | Abbe Number |
|---|---------------------|-----|-----------------------|-----|-----------------------|-----|-------------|
| * | r1  32.410          |     |                       |     |                       |     |             |
|   |                     | d1  | 10.000                | N1  | 1.62230               | ν1  | 53.11       |
|   | r2  −361.920        |     |                       |     |                       |     |             |
|   |                     | d2  | 6.700                 |     |                       |     |             |
|   | r3  −113.705        |     |                       |     |                       |     |             |
|   |                     | d3  | 1.440                 | N2  | 1.84666               | ν2  | 23.82       |
|   | r4  107.861         |     |                       |     |                       |     |             |
|   |                     | d4  | 4.544 ~ 22.677 ~ 28.662 |   |                       |     |             |
| * | r5  −30.717         |     |                       |     |                       |     |             |
|   |                     | d5  | 1.200                 | N3  | 1.80741               | ν3  | 31.59       |
|   | r6  −271.463        |     |                       |     |                       |     |             |
|   |                     | d6  | 4.900                 |     |                       |     |             |
|   | r7  −181.809        |     |                       |     |                       |     |             |
|   |                     | d7  | 2.670                 | N4  | 1.62280               | ν4  | 56.88       |
|   | r8  −15.642         |     |                       |     |                       |     |             |
|   |                     | d8  | 0.500                 |     |                       |     |             |
|   | r9  Stop            |     |                       |     |                       |     |             |
|   |                     | d9  | 15.937 ~ 6.779 ~ 1.000 |    |                       |     |             |
| * | r10  176.488        |     |                       |     |                       |     |             |

TABLE 11A-continued

Lens Construction of Tenth Embodiment
f = 82.0 ~ 120.0 ~ 158.0
fNo. = 4.6 ~ 5.2 ~ 5.7

| Radius of Curvature | Axial Distance | Refractive Index (Nd) | Abbe Number |
|---|---|---|---|
| r11 −22.454 | | | |
| | d10 1.970 | N5 1.75000 | v5 25.14 |
| r12 −17.238 | d11 0.530 | | |
| | d12 0.850 | N6 1.85000 | v6 40.04 |
| * r13 62.248 | | | |

Σd = 51.241 ~ 60.216 ~ 60.422

TABLE 11B

Aspherical Coefficient of Tenth Embodiment r1:
$\epsilon$ = 0.10000× 10
A4 = 0.69127× $10^{-8}$
A6 = −0.56365× $10^{-9}$
A8 = 0.11704× $10^{-11}$
A10 = 0.19276× $10^{-13}$
A12 = −0.68161× $10^{-16}$ r10:
$\epsilon$ = 0.10000× 10
A4 = −0.20483× $10^{-4}$
A6 = 0.96091× $10^{-7}$
A8 = 0.11560× $10^{-7}$
A10 = −0.21519× $10^{-9}$
A12 = 0.21269× $10^{-11}$

TABLE 11B-continued

Aspherical Coefficient of Tenth Embodiment r5:
$\epsilon$ = 0.10000× 10
A4 = −0.52915× $10^{-4}$
A6 = 0.21093× $10^{-6}$
A8 = −0.16873× $10^{-7}$
A10 = 0.31014× $10^{-9}$
A12 = −0.23164× $10^{-11}$ r13:
$\epsilon$ = 0.10000× 10
A4 = −0.53625× $10^{-4}$
A6 = 0.67444× $10^{-6}$
A8 = −0.16134× $10^{-7}$
A10 = 0.36475× $10^{-9}$
A12 = −0.26644× $10^{-11}$

TABLE 12A

Lens Construction of Eleventh Embodiment
f = 82.0 ~ 120.0 ~ 158.0
f No. = 4.6 ~ 5.2 ~ 5.7

| Radius of Curvature | Axial Distance | Refractive Index (Nd) | Abbe Number |
|---|---|---|---|
| r1 33.480 | | | |
| | d1 4.300 | N1 1.74250 | v1 52.47 |
| r2 −115.645 | | | |
| | d2 0.900 | | |
| r3 −121.066 | | | |
| | d3 1.000 | N2 1.67741 | v2 28.50 |
| r4 62.780 | | | |
| | d4 5.454 ~ 15.322 ~ 19.941 | | |
| r5 −28.888 | | | |
| | d5 1.000 | N3 1.51009 | v3 63.43 |
| r6 −116.093 | | | |
| | d6 9.300 | | |
| r7 −91.771 | | | |
| | d7 2.000 | N4 1.64769 | v4 31.23 |
| r8 −33.543 | | | |
| | d8 0.500 | | |
| r9 Stop | | | |
| | d9 4.000 | | |
| r10 212.542 | | | |
| | d10 2.630 | N5 1.60881 | v5 58.86 |
| r11 −18.976 | | | |
| | d11 0.180 | | |
| r12 −18.425 | | | |
| | d12 0.800 | N6 1.79504 | v6 28.39 |
| r13 −39.416 | | | |
| | d13 16.747 ~ 6.819 ~ 1.000 | | |
| r14 −30.648 | | | |
| | d14 1.300 | N7 1.79850 | v7 22.60 |
| r15 −19.102 | | | |
| | d15 0.100 | | |
| r16 −19.603 | | | |
| | d16 0.800 | N8 1.75450 | v8 51.57 |
| r17 355.100 | | | |

Σd = 51.011 ~ 50.951 ~ 49.751

TABLE 13A

Lens Construction of Twelfth Embodiment $f = 82.0 \sim 120.0 \sim 158.0$
$f\,No. = 4.6 \sim 5.2 \sim 5.8$

| Radius of Curvature | Axial Distance | Refractive Index (Nd) | Abbe Number |
|---|---|---|---|
| r1 36.656 | | | |
| | d1 5.130 | N1 1.70800 | ν1 53.23 |
| r2 −120.408 | | | |
| | d2 0.860 | | |
| r3 −132.510 | | | |
| | d3 1.000 | N2 1.74000 | ν2 31.72 |
| r4 75.976 | | | |
| | d4 5.429 ∼ 18.174 ∼ 23.493 | | |
| r5 −34.220 | | | |
| | d5 1.000 | N3 1.48749 | ν3 70.44 |
| r6 −73.401 | | | |
| | d6 12.900 | | |
| r7 Stop | | | |
| | d7 5.680 | | |
| r8 159.548 | | | |
| | d8 2.580 | N4 1.77000 | ν4 48.92 |
| r9 −24.967 | | | |
| | d9 0.900 | | |
| r10 −21.289 | | | |
| | d10 0.950 | N5 1.84666 | ν5 24.51 |
| r11 −34.151 | | | |
| | d11 17.230 ∼ 7.079 ∼ 1.000 | | |
| r12 −29.184 | | | |
| | d12 1.480 | N6 1.79850 | ν6 22.60 |
| r13 −20.039 | | | |
| | d13 0.100 | | |
| r14 −21.828 | | | |
| | d14 0.950 | N7 1.75450 | ν7 51.57 |
| r15 2732.017 | | | |

$\Sigma d = 56.189 \sim 58.783 \sim 58.023$

Closest Focusing (D = 1.0 m)

d4  1.988 ∼ 13.405 ∼ 17.865
d11  20.671 ∼ 11.848 ∼ 6.628

TABLE 14A

Lens Construction of Thirteenth Embodiment $f = 82.0 \sim 138.0 \sim 234.0$
$f\,No. = 4.6 \sim 5.2 \sim 5.7$

| Radius of Curvature | Axial Distance | Refractive Index (Nd) | Abbe Number |
|---|---|---|---|
| r1 43.926 | | | |
| | d1 12.000 | N1 1.63980 | ν1 34.55 |
| r2 246.738 | | | |
| | d2 2.000 | | |
| r3 31.080 | | | |
| | d3 8.850 | N2 1.48749 | ν2 70.44 |
| r4 278.824 | | | |
| | d4 1.300 | N3 1.78472 | ν3 25.70 |
| * r5 29.662 | | | |
| | d5 9.737 ∼ 32.164 ∼ 37.729 | | |
| r6 −27.530 | | | |
| | d6 3.000 | N4 1.85000 | ν4 40.04 |
| r7 99.569 | | | |
| | d7 0.850 | | |
| r8 Stop | | | |
| | d8 0.850 | | |
| r9 −98.291 | | | |
| | d9 5.500 | N5 1.51728 | ν5 69.43 |
| r10 −17.029 | | | |
| | d10 0.100 | | |
| r11 41.613 | | | |
| | d11 4.000 | N6 1.48749 | ν6 70.44 |
| r12 −21.925 | | | |
| | d12 11.538 ∼ 5.884 ∼ 1.000 | | |

TABLE 14A-continued

Lens Construction of Thirteenth Embodiment

| | | | |
|---|---|---|---|
| * r13 −108.562 | | | |
| | d13 0.750 | N7 1.80500 | v7 40.97 |
| r14 23.084 | | | |
| | d14 1.950 | | |
| r15 −144.723 | | | |
| | d15 0.750 | N8 1.85000 | v8 40.04 |
| * r16 34.666 | | | |
| | d16 0.230 | | |
| r17 86.655 | | | |
| | d17 2.600 | N9 1.79850 | v9 22.60 |
| r18 −30.346 | | | |
| | $\Sigma d = 66.005 \sim 82.778 \sim 83.459$ | | |

TABLE 14B

Aspherical Coefficient of Thirteenth Embodiment

| r6: | r16: | r13: |
|---|---|---|
| $\epsilon = 0.10000 \times 10$ | $\epsilon = 0.10000 \times 10$ | $\epsilon = 0.10000 \times 10$ |
| $A4 = -0.50885 \times 10^{-4}$ | $A4 = -0.12509 \times 10^{-3}$ | $A4 = -0.11983 \times 10^{-3}$ |
| $A6 = -0.33844 \times 10^{-6}$ | $A6 = 0.74056 \times 10^{-6}$ | $A6 = 0.83127 \times 10^{-6}$ |
| $A8 = 0.59822 \times 10^{-8}$ | $A8 = -0.83283 \times 10^{-8}$ | $A8 = -0.84355 \times 10^{-8}$ |
| $A10 = -0.69159 \times 10^{-10}$ | $A10 = 0.68124 \times 10^{-10}$ | $A10 = 0.70463 \times 10^{-10}$ |
| $A12 = 0.31293 \times 10^{-12}$ | $A12 = -0.30883 \times 10^{-12}$ | $A12 = -0.31428 \times 10^{-12}$ |

TABLE 15A

Lens Construction of Fourteenth Embodiment $f = 82.0 \sim 138.0 \sim 234.0$
$f\,No. = 4.6 \sim 5.5 \sim 5.8$

| Radius of Curvature | Axial Distance | Refractive Index (Nd) | Abbe Number |
|---|---|---|---|
| r1 41.589 | | | |
| | d1 6.120 | N1 1.83400 | v1 37.05 |
| r2 139.887 | | | |
| | d2 1.500 | | |
| r3 32.987 | | | |
| | d3 8.630 | N2 1.48749 | v2 70.44 |
| r4 144.800 | | | |
| | d4 1.300 | N3 1.84666 | v3 23.82 |
| r5 31.525 | | | |
| | d5 6.334 ~ 29.731 ~ 33.915 | | |
| r6 Stop | | | |
| | d6 1.700 | | |
| * r7 −25.236 | | | |
| | d7 0.900 | N4 1.80500 | v4 40.97 |
| r8 84.973 | | | |
| | d8 0.840 | | |
| r9 Flare Cutter | | | |
| | d9 3.240 | | |
| r10 −408.893 | | | |
| | d10 3.200 | N5 1.48749 | v5 70.44 |
| r11 −16.423 | | | |
| | d11 0.100 | | |
| r12 68.284 | | | |
| | d12 3.330 | N6 1.48749 | v6 70.44 |
| r13 −20.411 | | | |
| | d13 0.100 | | |
| r14 Stop | | | |
| | d14 11.827 ~ 5.615 ~ 1.000 | | |
| * r15 −472.567 | | | |
| | d15 0.800 | N7 1.77250 | v7 49.77 |
| r16 20.582 | | | |
| | d16 1.720 | | |
| r17 −146.639 | | | |
| | d17 0.800 | N8 1.75450 | v8 51.57 |

TABLE 15A-continued

Lens Construction of Fourteenth Embodiment f = 82.0 ~ 138.0 ~ 234.0
f No. = 4.6 ~ 5.5 ~ 5.8

| Radius of Curvature | Axial Distance | Refractive Index (Nd) | Abbe Number |
|---|---|---|---|
| * r18 32.460 | | | |
| | d18 0.100 | | |
| r19 57.832 | | | |
| | d19 2.000 | N9 1.79850 | ν9 22.60 |
| r20 −59.876 | | | |
| | Σd = 54.541 ~ 71.726 ~ 71.295 | | |

TABLE 15B

Aspherical Coefficient of Fourteenth Embodiment r7:

$\epsilon = 0.10000 \times 10$
$A4 = -0.60523 \times 10^{-4}$
$A6 = -0.39512 \times 10^{-6}$
$A8 = 0.59832 \times 10^{-8}$
$A10 = -0.44617 \times 10^{-10}$
$A12 = 0.44350 \times 10^{-13}$ r18:

$\epsilon = 0.10000 \times 10$
$A4 = -0.14838 \times 10^{-3}$
$A6 = 0.70475 \times 10^{-6}$
$A8 = -0.76810 \times 10^{-8}$
$A10 = 0.59949 \times 10^{-10}$
$A12 = -0.39824 \times 10^{-12}$

TABLE 15B-continued

Aspherical Coefficient of Fourteenth Embodiment r15:

$\epsilon = 0.10000 \times 10$
$A4 = -0.13498 \times 10^{-3}$
$A6 = 0.79659 \times 10^{-6}$
$A8 = -0.91736 \times 10^{-8}$
$A10 = 0.89663 \times 10^{-10}$
$A12 = -0.51932 \times 10^{-12}$

TABLE 16A

Lens Construction of Fifteenth Embodiment f = 82.0 ~ 138.0 ~ 234.0
f No. = 4.6 ~ 5.6 ~ 5.8

| Radius of Curvature | Axial Distance | Refractive Index (Nd) | Abbe Number |
|---|---|---|---|
| r1 36.993 | | | |
| | d1 5.480 | N1 1.80500 | ν1 40.97 |
| r2 100.363 | | | |
| | d2 6.400 | | |
| r3 24.493 | | | |
| | d3 7.000 | N2 1.48749 | ν2 70.44 |
| r4 192.356 | | | |
| | d4 0.100 | N3 1.70055 | ν3 30.11 |
| r5 177.167 | | | |
| | d5 1.300 ~ 23.685 ~ 28.473 | | |
| r6 20.018 | | | |
| | d6 5.535 | | |
| * r7 −31.209 | | | |
| | d7 0.900 | N4 1.85000 | ν4 40.04 |
| r8 101.241 | | | |
| | d8 3.030 | | |
| r9 −328.159 | | | |
| | d9 4.060 | N5 1.48749 | ν5 70.44 |
| r10 −15.566 | | | |
| | d10 1.950 | | |
| r11 44.887 | | | |
| | d11 3.760 | N6 1.48749 | ν6 70.44 |
| r12 −22.013 | | | |
| | d12 0.100 | | |
| r13 Stop | | | |
| | d13 9.080 ~ 4.579 ~ 1.000 | | |
| * r14 −34.985 | | | |
| | d14 0.750 | N7 1.85000 | ν7 40.04 |
| r15 27.438 | | | |
| | d15 2.000 | | |
| r16 −40.087 | | | |
| | d16 0.750 | N8 1.80500 | ν8 40.97 |
| * r17 103.884 | | | |
| | d17 0.100 | | |
| r18 95.499 | | | |

TABLE 16A-continued

Lens Construction of Fifteenth Embodiment $f = 82.0 \sim 138.0 \sim 234.0$
$f\text{ No.} = 4.6 \sim 5.6 \sim 5.8$

| Radius of Curvature | Axial Distance | Refractive Index (Nd) | Abbe Number |
|---|---|---|---|
| | d18 2.570 | N9 1.79850 | v9 22.60 |
| r19 −26.962 | | | |
| | $\Sigma d = 54.865 \sim 68.514 \sim 69.723$ | | |

TABLE 16B

Aspherical Coefficient of Fifteenth Embodiment r7:

$\epsilon = 0.10000 \times 10$
$A4 = -0.61722 \times 10^{-4}$
$A6 = -0.16007 \times 10^{-6}$
$A8 = 0.80476 \times 10^{-9}$
$A10 = -0.56202 \times 10^{-11}$
$A12 = 0.47071 \times 10^{-14}$ r17:

$\epsilon = 0.10000 \times 10$
$A4 = -0.48594 \times 10^{-4}$
$A6 = 0.57978 \times 10^{-6}$
$A8 = -0.14360 \times 10^{-7}$
$A10 = 0.17839 \times 10^{-9}$
$A12 = -0.85458 \times 10^{-12}$

TABLE 16B-continued

Aspherical Coefficient of Fifteenth Embodiment r14:

$\epsilon = 0.10000 \times 10$
$A4 = -0.32203 \times 10^{-4}$
$A6 = 0.63012 \times 10^{-6}$
$A8 = -0.15013 \times 10-7$
$A10 = 0.18658 \times 10-9$
$A12 = -0.90240 \times 10^{-12}$

TABLE 17A

Lens Construction of Sixteenth Embodiment $f = 82.0 \sim 138.0 \sim 234.0$
$f\text{ No.} = 4.6 \sim 5.2 \sim 5.7$

| Radius of Curvature | Axial Distance | Refractive Index (Nd) | Abbe Number |
|---|---|---|---|
| r1 40.564 | | | |
| | d1 8.850 | N1 1.67339 | v1 29.25 |
| r2 421.058 | | | |
| | d2 0.100 | | |
| r3 34.256 | | | |
| | d3 8.480 | N2 1.48749 | v2 70.44 |
| r4 −488.749 | | | |
| | d4 1.300 | N3 1.80518 | v3 25.43 |
| r5 29.724 | | | |
| | d5 11.762 ~ 36.109 ~ 42.55 | | |
| * r6 .−38.801 | | | |
| | d6 2.450 | N4 1.77551 | v4 37.90 |
| r7 42.307 | | | |
| | d7 1.320 | | |
| r8 Stop | | | |
| | d8 1.480 | | |
| r9 −274.307 | | | |
| | d9 5.250 | N5 1.51680 | v5 64.20 |
| r10 −16.525 | | | |
| | d10 0.900 | | |
| r11 48.360 | | | |
| | d11 5.130 | N6 1.48749 | v6 70.44 |
| r12 −20.656 | | | |
| | d12 9.447 ~ 5.615 ~ 1.000 | | |
| * r13 −820.647 | | | |
| | d13 0.800 | N7 1.83400 | v7 37.05 |
| r14 19.756 | | | |
| | d14 2.550 | | |
| r15 −55.324 | | | |
| | d15 0.800 | N8 1.85000 | v8 40.04 |
| * r16 35.028 | | | |
| | d16 0.230 | | |
| r17 105.734 | | | |
| | d17 2.930 | N9 1.79850 | v9 22.60 |
| r18 −24.386 | | | |
| | $\Sigma d = 63.779 \sim 83.791 \sim 86.21$ | | |

TABLE 17B

Aspherical Coefficient of Sixteenth Embodiment r6:
- $\epsilon = 0.10000 \times 10$
- $A4 = -0.65731 \times 10^{-4}$
- $A6 = -0.31441 \times 10^{-6}$
- $A8 = 0.49324 \times 10^{-8}$
- $A10 = -0.60268 \times 10^{-10}$
- $A12 = 0.27929 \times 10^{-12}$ r13:
- $\epsilon = 0.1000 \times 10$
- $A4 = -0.12079 \times 10^{-3}$
- $A6 = 0.66521 \times 10^{-6}$
- $A8 = -0.78435 \times 10^{-8}$
- $A10 = 0.84146 \times 10^{-10}$
- $A12 = -0.44119 \times 10^{-12}$ r16:
- $\epsilon = 0.10000 \times 10$
- $A4 = -0.13246 \times 10^{-3}$
- $A6 = 0.73791 \times 10^{-6}$
- $A8 = -0.94943 \times 10^{-8}$
- $A10 = 0.86587 \times 10^{-10}$
- $A12 = -0.44144 \times 10^{-12}$

TABLE 18A

Lens Construction of Seventeenth Embodiment

$f = 82.0 \sim 120.0 \sim 158.0$
$f\ No. = 4.6 \sim 5.2 \sim 5.7$

| Radius of Curvature | Axial Distance | Refractive Index (Nd) | Abbe Number |
|---|---|---|---|
| r1  24.719 | | | |
| | d1 7.000 | N1 1.69350 | v1 51.83 |
| r2  −146.346 | | | |
| | d2 1.180 | | |
| r3  −117.052 | | | |
| | d3 1.980 | N2 1.80741 | v2 31.59 |
| r4  45.312 | | | |
| | d4 5.292 ~ 15.167 ~ 21.378 | | |
| r5  Stop | | | |
| | d5 0.860 | | |
| * r6  −36.255 | | | |
| | d6 1.000 | N3 1.78831 | v3 47.32 |
| r7  −561.520 | | | |
| | d7 0.820 | | |
| r8  Flare Cutter | | | |
| | d8 3.230 | | |
| r9  347.472 | | | |
| | d9 3.350 | N4 1.48749 | v4 70.44 |
| r10  −16.332 | | | |
| | d10 0.500 | | |
| r11  Stop | | | |
| | d11 17.086 ~ 7.211 ~ 1.000 | | |
| * r12  −85.730 | | | |
| | d12 1.790 | N5 1.79850 | v5 22.60 |
| r13  −27.436 | | | |
| | d13 0.940 | | |
| r14  −17.016 | | | |
| | d14 0.800 | N6 1.80500 | v6 40.97 |
| * r15  −259.281 | | | |

$\Sigma d = 45.828 \sim 45.828 \sim 45.828$

TABLE 18B

Aspherical Coefficient of Seventeenth Embodiment r6:
- $\epsilon = 0.10000 \times 10$
- $A4 = -0.38332 \times 10^{-4}$
- $A6 = 0.78074 \times 10^{-7}$
- $A8 = -0.50818 \times 10^{-8}$
- $A10 = 0.63173 \times 10^{-10}$
- $A12 = -0.32902 \times 10^{-12}$ r15:
- $\epsilon = 0.10000 \times 10$
- $A4 = -0.34091 \times 10^{-4}$
- $A6 = 0.35339 \times 10^{-6}$
- $A8 = -0.81651 \times 10^{-8}$
- $A10 = 0.13540 \times 10^{-9}$
- $A12 = -0.80298 \times 10^{-12}$

TABLE 18B-continued

Aspherical Coefficient of Seventeenth Embodiment r12:
- $\epsilon = 0.10000 \times 10$
- $A4 = -0.97551 \times 10^{-5}$
- $A6 = 0.10049 \times 10^{-6}$
- $A8 = 0.20604 \times 10^{-8}$
- $A10 = -0.26332 \times 10^{-10}$
- $A12 = 0.25959 \times 10^{-12}$

TABLE 19A

Lens Construction of Eighteenth Embodiment f = 82.0 ~ 120.0 ~ 158.0
f No. = 4.6 ~ 5.2 ~ 5.7

| Radius of Curvature | Axial Distance | Refractive Index (Nd) | Abbe Number |
|---|---|---|---|
| r1 39.782 | | | |
| | d1 4.900 | N1 1.69680 | v1 56.47 |
| r2 −126.443 | | | |
| | d2 0.900 | | |
| r3 −198.873 | | | |
| | d3 1.000 | N2 1.75000 | v2 25.14 |
| r4 110.252 | | | |
| | d4 7.759 ~ 17.235 ~ 21.169 | | |
| r5 Stop | | | |
| | d5 2.000 | | |
| r6 −21.416 | | | |
| | d6 1.000 | N3 1.51680 | v3 64.20 |
| r7 −99.032 | | | |
| | d7 6.500 | | |
| r8 −49.900 | | | |
| | d8 2.400 | N4 1.67339 | v4 29.25 |
| r9 −22.506 | | | |
| | d9 5.952 | | |
| r10 90.180 | | | |
| | d10 4.100 | N5 1.60881 | v5 58.86 |
| r11 −16.198 | | | |
| | d11 0.810 | N6 1.75520 | v6 27.51 |
| r12 −52.137 | | | |
| | d12 16.591 ~ 6.647 ~ 1.000 | | |
| r13 −42.194 | | | |
| | d13 1.800 | N7 1.79850 | v7 22.60 |
| r14 −22.114 | | | |
| | d14 0.210 | | |
| r15 −22.305 | | | |
| | d15 0.800 | N8 1.75450 | v8 51.57 |
| r16 93.408 | | | |

Σd = 56.722 ~ 56.254 ~ 54.541

TABLE 20A

Lens Construction of Nineteenth Embodiment f = 82.0 ~ 120.0 ~ 158.0
f No. = 4.6 ~ 5.2 ~ 5.7

| Radius of Curvature | Axial Distance | Refractive Index (Nd) | Abbe Number |
|---|---|---|---|
| r1 29.774 | | | |
| | d1 4.900 | N1 1.69100 | v1 54.75 |
| r2 −734.214 | | | |
| | d2 0.900 | | |
| r3 1135.048 | | | |
| | d3 1.000 | N2 1.80518 | v2 25.43 |
| r4 61.587 | | | |
| | d4 5.128 ~ 16.319 ~ 21.887 | | |
| r5 Stop | | | |
| | d5 2.000 | | |
| r6 −19.512 | | | |
| | d6 1.000 | N3 1.48749 | v3 70.44 |
| r7 −99.455 | | | |
| | d7 2.500 | | |
| r8 −26.840 | | | |
| | d8 2.400 | N4 1.67339 | v4 29.25 |
| r9 −18.643 | | | |
| | d9 4.500 | | |
| r10 67.466 | | | |
| | d10 4.100 | N5 1.51728 | v5 69.43 |
| r11 −20.737 | | | |
| | d11 0.810 | N6 1.75000 | v6 25.14 |
| * r12 −36.181 | | | |
| | d12 18.936 ~ 7.745 ~ 1.000 | | |
| * r13 −28.411 | | | |
| | d13 1.800 | N7 1.83350 | v7 21.00 |
| r14 −20.858 | | | |

TABLE 20A-continued

Lens Construction of Nineteenth Embodiment

| | | | | |
|---|---|---|---|---|
| r15 −19.368 | d14 0.400 | | | |
| | d15 0.800 | | N8 1.75450 | v8 51.57 |
| * r16 −136.490 | | | | |
| | $\Sigma d = 51.174 \sim 51.174 \sim 49.997$ | | | |

Closest Focusing (D = 1.0 m)

| | |
|---|---|
| d4 | $1.215 \sim 10.872 \sim 15.247$ |
| d12 | $22.849 \sim 13.192 \sim 7.640$ |

TABLE 20B

Aspherical Coefficient of Nineteenth Embodiment r12:

$\epsilon = 0.10000 \times 10$
$A4 = 0.41519 \times 10-5$
$A6 = -0.19986 \times 10^{-8}$
$A8 = -0.27913 \times 10^{-10}$
$A10 = -0.11359 \times 10^{-12}$
$A12 = 0.14355 \times 10^{-14}$ r16:

$\epsilon = 0.10000 \times 10$
$A4 = -0.32367 \times 10^{-5}$
$A6 = -0.19044 \times 10^{-7}$
$A8 = 0.14468 \times 10^{-9}$
$A10 = 0.45260 \times 10^{-11}$
$A12 = -0.42698 \times 10^{-13}$

TABLE 20B-continued

Aspherical Coefficient of Nineteenth Embodiment r13:

$\epsilon = 0.10000 \times 10$
$A4 = 0.22402 \times 10^{-5}$
$A6 = 0.14821 \times 10^{-7}$
$A8 = 0.12811 \times 10^{-10}$
$A10 = -0.26781 \times 10^{-13}$
$A12 = -0.20030 \times 10^{-14}$

TABLE 21A

Lens Construction of Twentieth Embodiment $f = 82.0 \sim 120.0 \sim 158.0$
$f \text{ No.} = 4.4 \sim 5.2 \sim 5.7$

| Radius of Curvature | Axial Distance | Refractive Index (Nd) | Abbe Number |
|---|---|---|---|
| r1 27.016 | | | |
| | d1 6.000 | N1 1.69350 | v1 50.29 |
| r2 −162.243 | | | |
| | d2 1.000 | | |
| r3 −161.398 | | | |
| | d3 1.500 | N2 1.80518 | v2 25.43 |
| r4 64.048 | | | |
| | d4 $5.210 \sim 13.997 \sim 18.310$ | | |
| r5 Stop | | | |
| | d5 1.500 | | |
| * r6 −111.894 | | | |
| | d6 0.956 | N3 1.51728 | v3 69.43 |
| r7 27.712 | | | |
| | d7 0.481 | | |
| r8 26.428 | | | |
| | d8 0.999 | N4 1.67339 | v4 29.25 |
| r9 36.197 | | | |
| | d9 4.600 | | |
| r10 112.883 | | | |
| | d10 0.664 | N5 1.75000 | v5 25.14 |
| r11 43.862 | | | |
| | d11 4.500 | N6 1.51728 | v6 69.43 |
| r12 −18.004 | | | |
| | d12 0.000 | | |
| r13 Flare Cutter | | | |
| | d13 $12.899 \sim 5.428 \sim 1.000$ | | |
| r14 −103.181 | | | |
| | d14 1.000 | N7 1.75450 | v7 51.57 |
| r15 44.391 | | | |
| | d15 1.699 | | |

TABLE 21A-continued

Lens Construction of Twentieth Embodiment

| | | | | |
|---|---|---|---|---|
| * r16 272.257 | | | | |
| | d16 2.100 | | N8 1.67339 | v8 29.25 |
| r17 −19.223 | | | | |
| | d17 0.520 | | | |
| r18 −15.051 | | | | |
| | d18 0.900 | | N9 1.78831 | v9 47.32 |
| * r19 −99.766 | | | | |
| | $\Sigma d = 46.528 \sim 47.844 \sim 47.729$ | | | |

Closest Focusing (D = 1.0 m)
d4   1.432 ~ 8.923 ~ 12.275
d13  16.677 ~ 10.501 ~ 7.035

TABLE 21B

Aspherical Coefficient of Nineteenth Embodiment r6:

$\epsilon = 0.10000 \times 10$
$A4 = -0.51682 \times 10^{-4}$
$A6 = 0.21032 \times 10^{-6}$
$A8 = -0.95868 \times 10^{-8}$
$A10 = 0.14680 \times 10^{-9}$
$A12 = 0.16682 \times 10^{-12}$
$A14 = -0.95748 \times 10^{-15}$
$A16 = 0.13103 \times 10^{-16}$ r19:

$\epsilon = 0.10000 \times 10$
$A4 = -0.49756 \times 10^{-4}$
$A6 = 0.64250 \times 10^{-6}$
$A8 = -0.16276 \times 10^{-7}$
$A10 = 0.26982 \times 10^{-9}$
$A12 = -0.15553 \times 10^{-11}$
$A14 = 0.17043 \times 10^{-15}$
$A16 = -0.31331 \times 10^{-17}$ TABLE 21B-continued Aspherical Coefficient of Nineteenth Embodiment r16:

$\epsilon = 0.10000 \times 10$
$A4 = -0.32114 \times 10^{-4}$
$A6 = 0.19507 \times 10^{-6}$
$A8 = 0.41842 \times 10^{-8}$
$A10 = -0.75382 \times 10^{-10}$
$A12 = 0.79392 \times 10^{-12}$
$A14 = -0.58510 \times 10^{-15}$
$A16 = 0.20482 \times 10^{-17}$

TABLE 22A

Lens Construction of Twenty-first Embodiment $f = 82.0 \sim 120.0 \sim 195.0$
$f\text{ No.} = 4.6 \sim 5.2 \sim 5.7$

| Radius of Curvature | Axial Distance | Refractive Index (Nd) | Abbe Number |
|---|---|---|---|
| r1 37.487 | | | |
| | d1 5.865 | N1 1.69350 | v1 50.29 |
| r2 −176.281 | | | |
| | d2 0.892 | | |
| r3 −195.347 | | | |
| | d3 1.500 | N2 1.80518 | v2 25.43 |
| r4 102.078 | | | |
| | d4 4.305 ~ 18.609 ~ 27.073 | | |
| r5 Stop | | | |
| | d5 1.500 | | |
| * r6 −213.618 | | | |
| | d6 0.956 | N3 1.48749 | v3 70.44 |
| r7 33.905 | | | |
| | d7 0.458 | | |
| r8 22.311 | | | |
| | d8 1.300 | N4 1.67339 | v4 29.25 |
| r9 27.186 | | | |
| | d9 4.406 | | |
| r10 126.750 | | | |
| | d10 0.664 | N5 1.68300 | v5 31.52 |
| r11 30.344 | | | |
| | d11 5.794 | N6 1.51728 | v6 69.43 |
| r12 −19.071 | | | |
| | d12 0.000 | | |
| r13 Flare | | | |

TABLE 22A-continued

Lens Construction of Twenty-first Embodiment $f = 82.0 \sim 120.0 \sim 195.0$
$f\text{ No.} = 4.6 \sim 5.2 \sim 5.7$

| Radius of Curvature | Axial Distance | Refractive Index (Nd) | Abbe Number |
|---|---|---|---|
| Cutter | d13 15.081 ~ 7.865 ~ 1.000 | | |
| r14 124.678 | | | |
| | d14 0.966 | N7 1.80750 | v7 35.43 |
| r15 19.012 | | | |
| | d15 1.979 | | |
| * r16 34.987 | | | |
| | d16 2.700 | N8 1.75690 | v8 29.69 |
| r17 −21.241 | | | |
| | d17 0.959 | | |
| r18 −15.594 | | | |
| | d18 0.900 | N9 1.78831 | v9 47.32 |
| * r19 212.741 | | | |
| | $\Sigma d = 50.225 \sim 57.313 \sim 58.912$ | | |

TABLE 22B

Aspherical Coefficient of Twenty-first Embodiment r6:

$\epsilon = 0.10000 \times 10$
$A4 = -0.46993 \times 10^{-4}$
$A6 = 0.26232 \times 10^{-6}$
$A8 = -0.10280 \times 10^{-7}$
$A10 = 0.14261 \times 10^{-9}$
$A12 = -0.88700 \times 10^{-12}$
$A14 = 0.10842 \times 10^{-14}$
$A16 = 0.65934 \times 10^{-17}$ r19:

$\epsilon = 0.10000 \times 10$
$A4 = -0.69557 \times 10^{-4}$
$A6 = 0.53709 \times 10^{-6}$
$A8 = -0.16549 \times 10^{-7}$
$A10 = 0.27094 \times 10^{-9}$
$A12 = -0.15055 \times 10^{-11}$
$A14 = 0.52740 \times 10^{-15}$
$A16 = -0.23824 \times 10^{-16}$

TABLE 22B-continued

Aspherical Coefficient of Twenty-first Embodiment r16:

$\epsilon = 0.10000 \times 10$
$A4 = -0.26837 \times 10{-4}$
$A6 = 0.81262 \times 10^{-7}$
$A8 = 0.33315 \times 10^{-8}$
$A10 = -0.79489 \times 10^{-10}$
$A12 = 0.77630 \times 10^{-12}$
$A14 = -0.74657 \times 10^{-15}$
$A16 = -0.97514 \times 10^{-18}$

TABLE 23A

Lens Construction of Twenty-second Embodiment $f = 153.7 \sim 225.0 \sim 296.2$
$f\text{ No.} = 4.6 \sim 5.2 \sim 5.7$

| Radius of Curvature | Axial Distance | Refractive Index (Nd) | Abbe Number |
|---|---|---|---|
| r1 46.686 | | | |
| | d1 11.100 | N1 1.75450 | v1 51.57 |
| r2 −345.999 | | | |
| | d2 3.200 | | |
| r3 −233.734 | | | |
| | d3 2.500 | N2 1.84666 | v2 23.82 |
| r4 130.104 | | | |
| | d4 16.776 ~ 22.304 ~ 25.867 | | |
| r5 Stop | | | |
| | d5 2.810 | | |
| * r6 −3000.030 | | | |
| | d6 1.500 | N3 1.48749 | v3 70.44 |
| r7 74.051 | | | |
| | d7 0.100 | | |
| r8 33.273 | | | |
| | d8 3.790 | N4 1.59270 | v4 35.45 |
| r9 36.365 | | | |
| | d9 4.360 | | |
| r10 −4379.242 | | | |

TABLE 23A-continued

Lens Construction of Twenty-second Embodiment $f = 153.7 \sim 225.0 \sim 296.2$
$f No. = 4.6 \sim 5.2 \sim 5.7$

| Radius of Curvature | Axial Distance | Refractive Index (Nd) | Abbe Number |
|---|---|---|---|
| r11 71.395 | d10 1.650 | N5 1.84666 | v5 23.82 |
| r12 −35.758 | d11 9.900 | N6 1.58144 | v6 40.89 |
| r13 Flare Cutter | d12 4.994 | | |
| r14 −72.870 | d13 14.403 ~ 6.548 ~ 1.875 | | |
| r15 20.034 | d14 1.500 | N7 1.87800 | v7 38.14 |
| * r16 20.584 | d15 0.130 | | |
| r17 −17.570 | d16 10.600 | N8 1.67339 | v8 29.25 |
| r18 −16.447 | d17 0.260 | | |
| * r19 −100.155 | d18 1.500 | N9 1.87800 | v9 38.14 |

$\Sigma d = 91.073 \sim 88.746 \sim 87.636$

TABLE 23B

Aspherical Coefficient of Twenty-second Embodiment

| r6: | r19: |
|---|---|
| $\epsilon = 0.10000 \times 10$ | $\epsilon = 0.10000 \times 10$ |
| $A4 = -0.88605 \times 10^{-5}$ | $A4 = -0.99933 \times 10^{-5}$ |
| $A6 = 0.59406 \times 10^{-8}$ | $A6 = 0.12268 \times 10^{-7}$ |
| $A8 = -0.10728 \times 10^{-9}$ | $A8 = -0.27224 \times 10^{-9}$ |
| $A10 = 0.52575 \times 10^{-12}$ | $A10 = 0.34258 \times 10^{-11}$ |
| $A12 = -0.90447 \times 10^{-15}$ | $A12 = 0.13922 \times 10^{-13}$ |
| $A14 = -0.28885 \times 10^{-18}$ | $A14 = -0.18280 \times 10^{-15}$ |
| $A16 = 0.53635 \times 10^{-21}$ | $A16 = -0.28732 \times 10^{-17}$ | r16:

$\epsilon = 0.10000 \times 10$
$A4 = -0.84751 \times 10^{-6}$
$A6 = -0.10095 \times 10^{-7}$
$A8 = 0.80736 \times 10^{-9}$
$A10 = -0.15887 \times 10^{-12}$
$A12 = -0.65737 \times 10^{-13}$
$A14 = -0.39966 \times 10^{-15}$
$A16 = 0.98706 \times 10^{-17}$ In Embodiments 1 through 4, the first lens unit comprises a negative meniscus lens having a concave surface on the object side and a positive lens having convex surfaces on both sides, the second lens unit comprises a negative meniscus lens having a concave surface on the image side and a positive meniscus lens having a convex surface on the image side, and the third lens unit comprises a positive meniscus lens having a convex surface on the image side and a negative meniscus lens having a concave surface on the object side.

In Embodiment 5, the first lens unit comprises a negative lens having concave surfaces on both sides and a positive lens having convex surfaces on both sides, the second lens unit comprises a negative meniscus lens having a concave surface on the image side and a positive meniscus lens having a convex surface on the image side, and the third lens unit comprises a positive meniscus lens having a convex surface on the image side and a negative meniscus lens having a concave surface on the object side.

In Embodiments 6 and 7, the first lens unit comprises a positive lens having convex surfaces on both sides and a negative lens having concave surfaces on both sides, the second lens unit comprises a negative lens having concave surfaces on both sides and a positive lens having convex surfaces on both sides, and the third lens unit comprises a positive meniscus lens having a convex surface on the image side and a negative lens having concave surfaces on both sides.

In Embodiment 8, the first lens unit comprises a positive lens having convex surfaces on both sides and a negative lens having concave surfaces on both sides, the second lens unit comprises a negative lens having concave surfaces on both sides and a positive lens having convex surfaces on both sides, and the third lens unit comprises a positive meniscus lens having a convex surface on the image side and a negative meniscus lens having a concave surface on the object side.

In Embodiments 9 and 10, the first lens unit comprises a positive lens having convex surfaces on both sides and a negative lens having concave surfaces on both sides, the second lens unit comprises a negative meniscus lens having a concave surface on the object side and a positive meniscus lens having a convex surface on the image side, and the third lens unit comprises a positive meniscus lens having a convex surface on the image side and a negative lens having concave surfaces on both sides. Focusing is performed using the second lens unit.

In Embodiment 11, the first lens unit comprises a positive lens having convex surfaces on both sides and a negative lens having concave surfaces on both sides, the second lens unit comprises a negative meniscus lens having a concave surface on the object side, a positive meniscus lens having a convex surface on the image side, a positive lens having convex surfaces on both sides and a negative meniscus lens having a concave surface on the object side, and the third lens unit comprises a positive meniscus lens having a convex surface on the image side and a negative lens having concave surfaces on both sides.

In Embodiment 12, the first lens unit comprises a positive lens having convex surfaces on both sides and a negative lens having concave surfaces on both sides, the second lens unit comprises a negative meniscus lens having a concave surface on the object side, a positive lens having convex surfaces on both sides and a negative meniscus lens having a concave surface on the object side, and the third lens unit comprises a positive meniscus lens having a convex surface on the image side and a negative lens having concave surfaces on both sides. Focusing is performed using the second lens unit.

In Embodiment 13, the first lens unit comprises a positive meniscus lens having a convex surface on the object side and a combination lens comprising a positive meniscus lens having a convex surface on the object side and a negative meniscus lens having a concave surface on the image side, the second lens unit comprises a negative lens having concave surfaces on both sides, a positive meniscus lens having a convex surface on the image side and a positive lens having convex surfaces on both sides, and the third lens unit comprises a negative lens having concave surfaces on both sides, a negative lens having concave surfaces on both sides and a positive lens having convex surfaces on both sides.

In Embodiment 14, the first lens unit comprises a positive meniscus lens having a convex surface on the object side and a combination lens comprising a positive meniscus lens having a convex surface on the object side and a negative meniscus lens having a concave surface on the image side, the second lens unit comprises a negative lens having concave surfaces on both sides, a positive meniscus lens having a convex surface on the image side and a positive lens having convex surfaces on both sides, and the third lens unit comprises a negative lens having concave surfaces on both sides, a negative lens having concave surfaces on both sides and a positive lens having convex surfaces on both sides.

In Embodiment 15, the first lens unit comprises a positive meniscus lens having a convex surface on the object side, a positive meniscus lens having a convex surface on the object side and a negative meniscus lens having a concave surface on the image side, the second lens unit comprises a negative lens having concave surfaces on both sides, a positive meniscus lens having a convex surface on the image side and a positive lens having convex surfaces on both sides, and the third lens unit comprises a negative lens having concave surfaces on both sides, a negative lens having concave surfaces on both sides and a positive lens having convex surfaces on both sides.

In Embodiment 16, the first lens unit comprises a positive meniscus lens having a convex surface on the object side and a combination lens comprising a positive meniscus lens having a convex surface on the object side and a negative meniscus lens having a concave surface on the image side, the second lens unit comprises a negative lens having concave surfaces on both sides, a positive meniscus lens having a convex surface on the image side and a positive lens having convex surfaces on both sides, and the third lens unit comprises a negative lens having concave surfaces on both sides, a negative lens having concave surfaces on both sides and a positive lens having convex surfaces on both sides.

In Embodiment 17, the first lens unit comprises a positive lens having convex surfaces on both sides and a negative lens having concave surfaces on both sides, the second lens unit comprises a negative meniscus lens having a concave surface on the image side and a positive lens having convex surfaces on both sides, and the third lens unit comprises a positive meniscus lens having a convex surface on the image side and a positive lens having a convex surface on the object side. During zooming, the first and third lens units move together.

In Embodiment 18, the first lens unit comprises a positive lens having convex surfaces on both sides and a negative lens having concave surfaces on both sides, the second lens unit comprises a negative meniscus lens having a concave surface on the object side, a positive meniscus lens having a convex surface on the image side and a combination lens comprising a positive lens having convex surfaces on both sides and a negative meniscus lens having a concave surface on the object side, and the third lens unit comprises a positive meniscus lens having a convex surface on the image side and a negative lens having concave surfaces on both sides.

In Embodiment 19, the first lens unit comprises a positive lens having convex surfaces on both sides and a negative meniscus lens having concave surface on the image side, the second lens unit comprises a negative meniscus lens having a concave surface on the object side, a positive meniscus lens having a convex surface on the image side and a combination lens comprising a positive lens having convex surfaces on both sides and a negative meniscus lens having a concave surface on the object side, and the third lens unit comprises a positive meniscus lens having a convex surface on the image side and a negative meniscus lens having a concave surface on the object side.

In Embodiment 20, the first lens unit comprises a positive lens having convex surfaces on both sides and a negative lens having concave surfaces on both sides, the second lens unit comprises a negative lens having concave surfaces on both sides, a positive meniscus lens having a convex surface on the object side and a combination lens comprising a negative meniscus lens having a concave surface on the image side and a positive lens having convex surfaces on both sides, and the third lens unit comprises a negative lens having concave surfaces on both sides, a positive lens having convex surfaces on both sides and a negative meniscus lens having a concave surface on the object side.

In Embodiment 21, the first lens unit comprises a positive lens having convex surfaces on both sides and a negative lens having concave surfaces on both sides, the second lens unit comprises a negative lens having concave surfaces on both sides, a positive meniscus lens having a convex surface on the object side and a combination lens comprising a negative meniscus lens having a concave surface on the image side and a positive lens having convex surfaces on both sides, and the third lens unit comprises a negative meniscus lens having a concave surface on the image side, a positive lens having convex surfaces on both sides and a negative meniscus lens having a concave surface on the object side.

In Embodiment 22, the first lens unit comprises a positive lens having convex surfaces on both sides and a negative lens having concave surfaces on both sides, the second lens unit comprises a negative lens having concave surfaces on both sides, a positive meniscus lens having a convex surface on the object side and a combination lens comprising a negative lens having concave surfaces on both sides and a negative lens having concave surfaces on both sides, and the third lens unit comprises a negative lens having concave surfaces on both sides, a positive lens having convex surfaces on both sides and a negative meniscus lens having a concave surface on the object side.

In all of the embodiments, the aperture is positioned on the object side or the image side of the second lens unit, or within the second lens unit. It moves together with the second lens unit or independently of the second lens unit during zooming. Focusing is performed using the second lens unit.

The relationships between the embodiments and the conditions are shown in the tables 24 and 25 below.

TABLE 24

| Condition | (1) | (2) | (3) | (4) | (5) |
|---|---|---|---|---|---|
| Lower Limit | 21.6 | 1.5 | 0.5 | 0.1 | 0.1 |
| Upper Limit | — | 20 | 30 | 10 | 5.0 |
| Emb. 1 | 35.5 | 3.34 | 1.34 | 1.58 | 0.76 |
| Emb. 2 | 36.5 | 3.31 | 1.34 | 1.58 | 0.74 |
| Emb. 3 | 35.4 | 3.34 | 1.34 | 1.58 | 0.76 |
| Emb. 4 | 35.5 | 3.34 | 1.34 | 1.58 | 0.76 |
| Emb. 5 | 36.0 | 3.33 | 1.34 | 1.62 | 0.75 |
| Emb. 6 | 29.6 | 9.49 | 0.85 | 1.24 | 0.52 |
| Emb. 7 | 29.6 | 9.05 | 0.85 | 1.19 | 0.53 |
| Emb. 8 | 29.0 | 3.92 | 0.97 | 1.12 | 0.60 |
| Emb. 9 | 29.5 | 15.40 | 1.18 | 1.88 | 0.57 |
| Emb. 10 | 29.0 | 30.3 | 1.29 | 2.08 | 0.60 |
| Emb. 11 | 29.1 | 5.45 | 0.92 | 1.14 | 0.57 |
| Emb. 12 | 29.3 | 5.43 | 1.12 | 1.56 | 0.59 |
| Emb. 13 | 29.1 | 9.74 | 1.48 | 4.41 | 0.46 |
| Emb. 14 | 28.7 | 7.30 | 1.19 | 3.35 | 0.44 |
| Emb. 15 | 29.0 | 5.03 | 1.42 | 4.70 | 0.41 |
| Emb. 16 | 31.1 | 11.67 | 1.56 | 5.26 | 0.41 |
| Emb. 17 | 29.0 | 4.10 | 1.03 | 1.28 | 0.59 |
| Emb. 18 | 27.6 | 9.76 | 0.94 | 1.20 | 0.59 |
| Emb. 19 | 29.8 | 7.13 | 0.94 | 1.09 | 0.59 |
| Emb. 20 | 28.1 | 6.71 | 0.85 | 1.23 | 0.51 |
| Emb. 21 | 27.6 | 5.80 | 1.08 | 1.64 | 0.51 |
| Emb. 22 | 28.8 | 2.85 | 0.67 | 0.87 | 0.49 |

TABLE 25

|  | (6) | (7) | (8) | (9) |
|---|---|---|---|---|
| Lower Limit | 1.6 | 0.1 | −5.0 | 6 |
| Upper Limit | 3.0 | 5.0 | −0.01 | 12 |
| Emb. 1 | 1.633 | −0.45 | 2.57 | 7.971 |
| Emb. 2 | 1.678 | −2.17 | 2.66 | 7.971 |
| Emb. 3 | 1.634 | −0.42 | 2.60 | 7.971 |
| Emb. 4 | 1.634 | −0.45 | 2.57 | 7.971 |
| Emb. 5 | 1.649 | −0.19 | 2.44 | 7.830 |
| Emb. 6 | 1.912 | 2.43 | −1.19 | 8.420 |
| Emb. 7 | 1.885 | 2.43 | −1.19 | 8.420 |
| Emb. 8 | 1.667 | 2.29 | −2.00 | 10.160 |
| Emb. 9 | 1.747 | 1.74 | −2.64 | 9.425 |
| Emb. 10 | 1.676 | 1.57 | −2.15 | 18.140 |
| Emb. 11 | 1.748 | 1.82 | −1.45 | 6.200 |
| Emb. 42 | 1.683 | 1.58 | −1.17 | 6.990 |
| Emb. 13 | 2.193 | 1.19 | −2.53 | 24.150 |
| Emb. 14 | 2.291 | 1.64 | −2.62 | 17.550 |
| Emb. 15 | 2.423 | 1.78 | −2.23 | 20.280 |
| Emb. 16 | 2.440 | 1.36 | −1.64 | 18.730 |
| Emb. 17 | 1.690 | 2.30 | −1.78 | 10.160 |
| Emb. 18 | 1.705 | 1.44 | −1.98 | 6.800 |
| Emb. 19 | 1.705 | 1.90 | −2.05 | 6.800 |
| Emb. 20 | 1.966 | 2.10 | −0.38 | 8.500 |
| Emb. 21 | 1.952 | 1.52 | −0.19 | 8.257 |
| Emb. 22 | 2.048 | 2.48 | −0.02 | 16.800 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A zoom lens system comprising from an object side to an image side:

a first lens unit of a positive refractive power;

a second lens unit of a positive refractive power, wherein a first area of empty space provided between the first and second lens unit is variable during a zooming operation; and a third lens unit of a negative refractive power, wherein a second area of empty space provided between the second and third lens unit is variable during the zooming operation;

wherein the zoom lens system fulfills the following condition:

$$BFL_W > DL/2$$

wherein $BFL_W$ represents a back focal length of the zoom lens system in the shortest focal length condition, and DL represents a diagonal length of an image frame.

2. A zoom lens system as claimed in claim 1, wherein the first lens unit has a convex surface toward the object side that is closest to the object.

3. A zoom lens system as claimed in claim 2, wherein the zoom lens system fulfills the following condition:

$$0.1 < \phi_{1-1}/\phi_W < 5.0$$

wherein $\phi_{1-1}$ represents a refractive power of the convex surface of the first lens unit that is closest to the object, and $\phi_W$ represents a refractive power of the zoom lens system in the shortest focal length condition.

4. A zoom lens system as claimed in claim 1, wherein the second lens unit has a concave surface toward the object side that is closest to the object.

5. A zoom lens system as claimed in claim 4, wherein the zoom lens system fulfills the following condition:

$$-5.0 < \phi_{2-1}/\phi_W < -0.01$$

wherein $\phi_{2-1}$ represents a refractive power of the convex surface of the second lens unit that is closest to the object, and $\phi_W$ represents a refractive power of the zoom lens system in the shortest focal length condition.

6. A zoom lens system as claimed in claim 1, wherein the zoom lens system fulfills the following condition:

$$0.1 < f_1/f_2 < 10$$

wherein $f_1$ represents a focal length of the first lens unit, and $f_2$ represents a focal length of the second lens unit.

7. A zoom lens system as claimed in claim 1, wherein the zoom lens system fulfills the following condition:

$$1.6 < \beta_{3W} < 3.0$$

wherein $\beta_{3W}$ represents a lateral magnification of the third lens unit in the shortest focal length condition.

8. A zoom lens system as claimed in claim 1, wherein the first and third lens units are moved in a body during the zooming operation.

9. A zoom lens system as claimed in claim 1, wherein the zoom lens system fulfills the following condition:

$$0.5 < f_1/f_W < 3.0$$

wherein $f_1$ represents a focal length of the first lens unit, and $f_W$ represents a focal length of the zoom lens system in the shortest focal length condition.

10. A zoom lens system as claimed in claim 1, wherein the zoom lens system fulfills the following condition:

$$6 < T_1 < 12$$

wherein $T_1$ represents an axial distance of the first lens unit.

11. A zoom lens system as claimed in claim 1, wherein the second lens unit is moved along an optical axis of the zoom lens system in order to execute a focusing operation.

12. A zoom lens system as claimed in claim 1, wherein the zoom lens system has at least one aspherical surface.

13. A zoom lens system as claimed in claim 1, wherein the zoom lens system further comprises a diaphragm aperture which is moved with the second lens unit in a body during the zooming operation.

14. A zoom lens system as claimed in claim 13, wherein the zoom lens system fulfills the following condition:

$$1.5 < E_{12W}/E_{23T} < 20$$

wherein $E_{12W}$ represents a distance of the first area of empty space in the shortest focal length condition, and $E_{23T}$ represents a distance of the second area of empty space in the longest focal length condition.

15. A zoom lens system comprising from an object side to an image side:
   a first lens unit of a positive refractive power;
   a second lens unit of a positive refractive power,
wherein a first area of empty space provided between the first and second lens unit is variable during a zooming operation; and
   a third lens unit of a negative refractive power, wherein a second area of empty space provided between the second and third lens unit is variable during the zooming operation;
   wherein the zoom lens system fulfills the following condition:

$$6 < E_{12W}/E_{23T} < 20$$

wherein $E_{12W}$ represents a distance of the first area of empty space in the shortest focal length condition, and $E_{23T}$ represents a distance of the second area of empty space in the longest focal length condition.

16. A zoom lens system as claimed in claim 15, wherein the zoom lens system fulfills the following condition:

$$BFL_W > DL/2$$

wherein $BFL_W$ represents a back focal length of the zoom lens system in the shortest focal length condition, and DL represents a diagonal length of an image frame.

17. A zoom lens system comprising from an object side to an image side:
   a positive first lens unit consisting of two lens elements;
   a positive second lens unit consisting of two lens elements, wherein a first area of empty space provided between the first and second lens unit is variable during a zooming operation; and
   a negative third lens unit consisting of two lens elements, wherein a second area of empty space provided between the second and third lens unit is variable during the zooming operation wherein the zoom lens system fulfills the following condition:

$$BFLw > DL/2$$

wherein BFLw represents a back focal length of the zoom lens system in the shortest focal length condition, and DL represents a diagonal length of an image frame.

18. A zoom lens system as claimed in claim 17, wherein the zoom lens system has at least three aspherical surfaces.

19. A zoom lens system as claimed in claim 18, wherein the second and third lens unit have aspherical surfaces.

* * * * *